(12) United States Patent
Ahn et al.

(10) Patent No.: US 11,966,840 B2
(45) Date of Patent: Apr. 23, 2024

(54) DEEP PROBABILISTIC DECISION MACHINES

(71) Applicant: Noodle Analytics, Inc., San Francisco, CA (US)

(72) Inventors: Hyungil Ahn, San Jose, CA (US); Santiago Olivar Aicinena, Oakland, CA (US); Hershel Amal Mehta, San Francisco, CA (US); Young Chol Song, Menlo Park, CA (US)

(73) Assignee: Noodle Analytics, Inc., San Francisco, CA (US)

( * ) Notice: Subject to any disclaimer, the term of this patent is extended or adjusted under 35 U.S.C. 154(b) by 1030 days.

(21) Appl. No.: 16/862,284

(22) Filed: Apr. 29, 2020

(65) Prior Publication Data

US 2021/0049460 A1 Feb. 18, 2021

Related U.S. Application Data

(60) Provisional application No. 62/887,457, filed on Aug. 15, 2019.

(51) Int. Cl.
*G06N 3/08* (2023.01)
*G06N 3/047* (2023.01)
*G06N 20/00* (2019.01)

(52) U.S. Cl.
CPC ............. *G06N 3/08* (2013.01); *G06N 3/047* (2023.01); *G06N 20/00* (2019.01); *B60L 2240/54* (2013.01)

(58) Field of Classification Search
CPC .......... G06N 3/08; G06N 3/047; G06N 20/00; G06N 5/045; G06N 3/044; G06N 3/004; H04L 67/5651; H04L 67/1097; A61B 5/4839; A61B 5/024; G08B 13/19647; B60Q 60/00; G05D 1/0038; G05D 1/0094; G06Q 30/0283; G06Q 50/06;
(Continued)

(56) References Cited

U.S. PATENT DOCUMENTS 8,209,218 B1 * 6/2012 Basu .................. G06Q 10/0637
705/7.38
8,332,249 B1 * 12/2012 Aykin ............. G06Q 10/06312
705/7.14
(Continued)

FOREIGN PATENT DOCUMENTS

AU 2010204729 A1 * 9/2011 ....... G06Q 10/06315
CA 2642458 A1 * 5/2010 ............. G06N 3/004
(Continued)

*Primary Examiner* — Steven P Sax
(74) *Attorney, Agent, or Firm* — Schwegman Lundberg & Woessner, P.A.

(57) ABSTRACT

A universal deep probabilistic decision-making framework for dynamic process modeling and control, referred to as Deep Probabilistic Decision Machines (DPDM), is presented. A predictive model enables the generative simulations of likely future observation sequences for future or counterfactual conditions and action sequences given the process state. Then, the action policy controller, also referred to as decision-making controller, is optimized based on predictive simulations. The optimal action policy controller is designed to maximize the relevant key performance indicators (KPIs) relying on the predicted experiences of sensor and target observations for different actions over the near future.

16 Claims, 54 Drawing Sheets

(58) Field of Classification Search
CPC .. G06F 16/3344; G06F 30/00; G06F 17/5009;
G06F 40/30; G06F 16/951; G03F 7/705;
G03F 7/70125; B62D 15/0215; B60L
2240/54; B60L 3/0038; B60L 58/27;
H01H 85/47; Y02T 10/64; B60W 10/02;
B60K 2006/4825; G08G 1/202; H02J
3/003; G01R 31/367
See application file for complete search history.

(56) References Cited

U.S. PATENT DOCUMENTS

| | | | |
|---|---|---|---|
| 9,874,923 B1* | 1/2018 | Brown | G06F 1/3234 |
| 10,131,341 B2* | 11/2018 | Shahverdi | B60W 20/11 |
| 10,311,058 B1* | 6/2019 | Kumar | G06N 3/08 |
| 10,601,232 B1* | 3/2020 | Wurmfeld | G07F 7/0853 |
| 10,783,442 B1* | 9/2020 | Torkkola | G06N 7/01 |
| 10,977,609 B1* | 4/2021 | Adulyasak | G06Q 10/087 |
| 11,132,211 B1* | 9/2021 | Tang | B60W 60/00 |
| 2011/0270646 A1* | 11/2011 | Prasanna | G06Q 10/00 706/46 |
| 2015/0066592 A1* | 3/2015 | Ehm | G06Q 30/0202 705/7.31 |
| 2016/0231725 A1* | 8/2016 | Carter | G05B 13/041 |
| 2017/0206464 A1* | 7/2017 | Clayton | G06N 3/044 |
| 2018/0026454 A1* | 1/2018 | Belkacem-Boussaid | H02J 7/0019 702/63 |
| 2018/0143035 A1* | 5/2018 | Ricci | G01C 21/3469 |
| 2019/0087529 A1* | 3/2019 | Steingrimsson | G06F 30/00 |
| 2019/0115753 A1* | 4/2019 | Sheehan | G05B 13/0265 |
| 2019/0259043 A1* | 8/2019 | Koneri | G06Q 10/087 |
| 2019/0347606 A1* | 11/2019 | Malecha | G06Q 30/0223 |
| 2019/0378061 A1* | 12/2019 | Cao | G06N 3/08 |
| 2020/0012930 A1* | 1/2020 | Kumar | G06F 16/3344 |
| 2020/0012984 A1* | 1/2020 | Mantryvong | G06N 5/025 |
| 2020/0075163 A1* | 3/2020 | Barkan | G06Q 30/0283 |
| 2020/0175441 A1* | 6/2020 | Sukhobokov | G06Q 10/06313 |
| 2020/0327470 A1* | 10/2020 | Trim | G06Q 10/0635 |
| 2020/0357000 A1* | 11/2020 | Levine | G06N 5/045 |
| 2020/0411170 A1* | 12/2020 | Brown | G06N 20/00 |
| 2021/0038163 A1* | 2/2021 | Agrawal | A61B 5/4839 |
| 2021/0116907 A1* | 4/2021 | Altman | G05D 1/0038 |
| 2021/0166159 A1* | 6/2021 | Rubenstein | G06N 3/08 |
| 2021/0209705 A1* | 7/2021 | England | G06N 20/00 |
| 2021/0274010 A1* | 9/2021 | Stein | H04L 67/5651 |
| 2022/0005332 A1* | 1/2022 | Metzler | G08B 13/19647 |

FOREIGN PATENT DOCUMENTS

| | | | | |
|---|---|---|---|---|
| CA | 3039481 A1 | * | 5/2018 | G01R 31/367 |
| CA | 2998274 A1 | * | 9/2018 | |
| CA | 2956214 C | * | 4/2019 | G05B 15/02 |
| CN | 209085657 U | * | 7/2019 | B62D 15/0215 |
| CN | 110110466 A | * | 8/2019 | G06F 17/5009 |
| CN | 110516998 A | * | 11/2019 | |
| CN | 110970015 A | * | 4/2020 | |
| CN | 112262512 A | * | 1/2021 | B60L 3/0038 |
| CN | 109523064 B | * | 2/2022 | G06Q 10/047 |
| DE | 102018131452 A1 | * | 6/2019 | B60L 53/66 |
| EP | 3242239 A1 | * | 11/2017 | |
| EP | 3471029 A1 | * | 4/2019 | G05B 13/0255 |
| FR | 2982935 A1 | * | 5/2013 | B60H 1/00278 |
| FR | 2986340 A1 | * | 8/2013 | B60K 6/46 |
| JP | 2004127259 A | * | 4/2004 | |
| JP | 7308262 B2 | * | 7/2023 | G06N 20/00 |
| KR | 20080072955 A | * | 3/2008 | |
| KR | 20180121317 A | * | 11/2018 | |
| KR | 102285079 B1 | * | 8/2021 | |
| TW | 201633193 A | * | 9/2016 | G03F 7/70125 |
| TW | 202113633 A | * | 4/2021 | G03F 7/705 |
| TW | I724279 B | * | 4/2021 | |
| WO | WO-2018189438 A1 | * | 10/2018 | B60L 53/11 |
| WO | WO-2019240426 A1 | * | 12/2019 | G01R 31/3646 |
| WO | WO-2020015830 A1 | * | 1/2020 | G06N 20/00 |
| WO | WO-2020088739 A1 | * | 5/2020 | G05D 1/0094 |

* cited by examiner

AGENT (DECISION MAKING) IS TYPICALLY NOT ALLOWED TO LEARN SIMPLY FROM REAL-PROCESS INTERACTIONS (EXPENSIVE AND DANGEROUS)

BASED ON OBSERVED SEQUENCES (CONDITIONS, ACTIONS, AND OBSERVATIONS OVER TIME), BUILD A PREDICTIVE SIMULATION MODEL PREDICTING EVOLUTION OF SYSTEM STATE RESULTING FROM ACTIONS TAKEN GIVEN THE CONDITIONS

DPDM USE CASES

1402

| | PRODUCT QUALITY | ENERGY CONSUMPTION | DEMAND AND SUPPLY |
|---|---|---|---|
| ACTIONS | RPM SETPOINTS, TEMPERATURE SETPOINTS | BATTERY DISCHARGING OR RECHARGING | PRICE AND PROMOTIONS INFLUENCING DEMAND, SAFETY STOCK LEVELS, EXPEDITES, INVENTORY REBALANCING, AND PRODUCTION CHANGES |
| CONDITIONS | STATIC: LINE LOCATION DYNAMIC: SCHEDULED CREW SEQUENCE, AIMED PRODUCT DIMENSIONS, PROCESS RUNS DATES | PROPERTIES OF HEATS (E.G., RAW MATERIAL, STEEL GRADE, TEMPERATURE) VARYING OVER HEATS OR BATCHED TASK | EXTERNAL SIGNALS, SUCH AS MARKET SIGNALS OR INTERNAL PLANNING INFORMATION |
| SENSORS | RPM MEASUREMENTS, TEMPERATURE MEASUREMENTS | ELAPSED DURATION TIMES SINCE DIFFERENT EVENTS (E.G., HEAT START, MELTDOWN START, LOAD AND TAP) | CURRENT INVENTORY LEVELS, PRODUCTION QUANTITIES, AND COMPETITORS' SALES TRENDS |
| TARGETS | PRODUCED DIMENSIONS OF PRODUCTS | TOTAL CONSUMED ENERGY PER UNIT TIME, OR A DEFINED PEAK USAGE PER PERIOD (E.G., MONTHLY PEAK USAGE OF ANY 15-MIN CUMULATIVE USED ENERGY) | VALUE AT RISK (E.G., LOST SALES, HOLDING COSTS, EXPEDITE COSTS, OBSOLESCENCE COSTS, CONTRACT PENALTIES, AND SALES) |

FIG. 14

(Step 1)
Select permutation

Product ID [ABC-123 ▽]

State [Ramping ▽]

Stage [Pre oven ▽]

(Step 2)
Select DP, DM and bench mark models

Simulation Model (DP)

| Model ID | Date Created | Select |
|---|---|---|
| DP 01 | 1/16/2019 | ○ |
| DP 18 | 4/25/2019 | ◎ |

Decision Machine Controller (DM)

| Model ID | Date Created | Select |
|---|---|---|
| DP 04 | 10/9/2018 | ◎ |
| DP 09 | 3/17/2019 | ○ |

Rule Based Benchmark

| Model ID | Date Created | Select |
|---|---|---|
| R 1 | 12/10/2018 | ◎ |
| R 2 | 2/28/2019 | ○ |

Generate AB Testing

FIG. 23

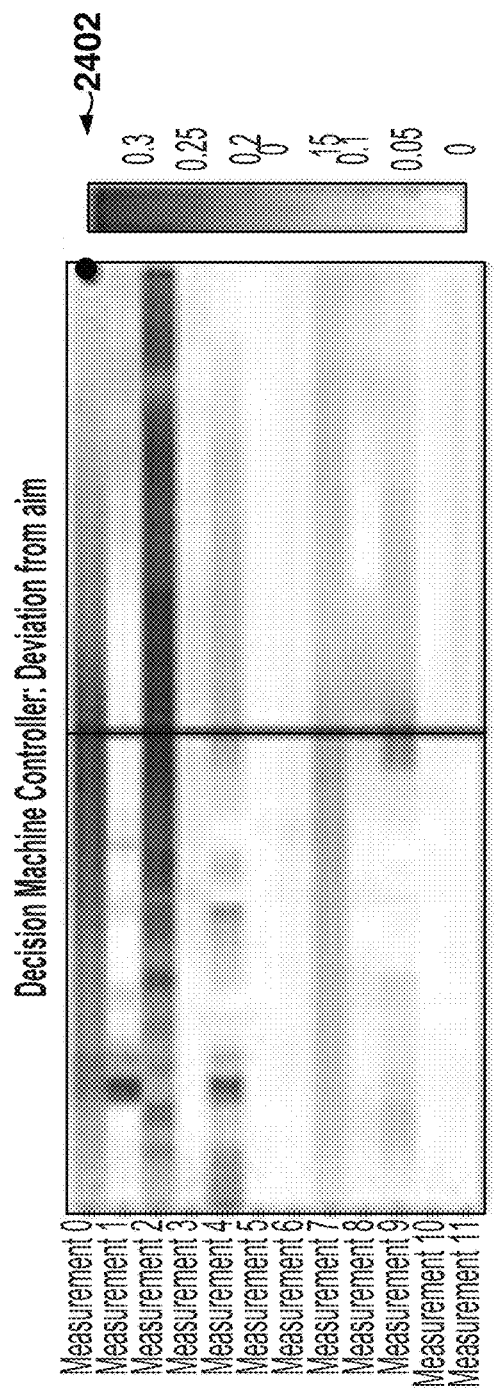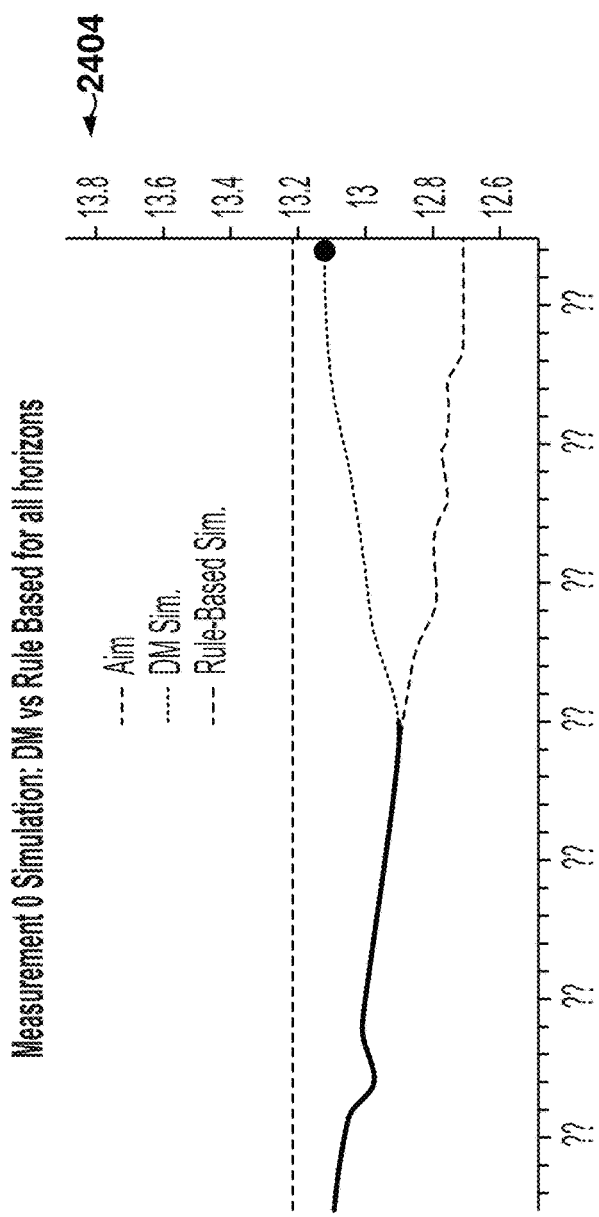
FIG. 24A

Simulation-based action recommendations & predicted widths

Reduction in overall mean and std. deviation of width error, reduction in coils out of range Result (across all - 138,000 coils)

|  | Actual | Model with Recommendation (Counterfactual) |
|---|---|---|
| Mean of Width Error (%) | 0.30 | 0.25 |
| SD of Width Error (%) | 0.28 | 0.24 |

Counterfactual simulations for the historical samples with our recommended inputs

DEEP PROBABILISTIC DECISION MACHINES

CLAIM OF PRIORITY

This application claims priority from U.S. Provisional Patent Application No. 62/887,457, filed Aug. 15, 2019, and entitled "Deep Probabilistic Decision Machines." This provisional application is herein incorporated by reference in its entirety.

TECHNICAL FIELD

The subject matter disclosed herein generally relates to methods, systems, and machine-readable storage media for automatically controlling enterprise and industrial processes.

BACKGROUND

One of the most important problems in enterprise and industrial artificial intelligence (AI) is to make optimal decisions and controls in dynamic processes. In many enterprise AI problems, a decision-making agent is not allowed to learn and optimize its decision-making, or control policy, through many trials using the real-life process. Generating the real-world experience data, when dealing with numerous actions and conditions, is very time-consuming, expensive, and even dangerous when input ranges are not properly set. For these reasons, it is very desirable to build a reliable predictive simulation model using the historical process data that companies have accumulated over time.

BRIEF DESCRIPTION OF THE DRAWINGS

Various ones of the appended drawings merely illustrate example embodiments of the present disclosure and cannot be considered as limiting its scope.

FIG. 14 is a table showing DPDM's parameters used for several use cases.

FIGS. 15-24C illustrate a use case for dimensional quality control, according to some example embodiments.

DETAILED DESCRIPTION

Figure 1A:
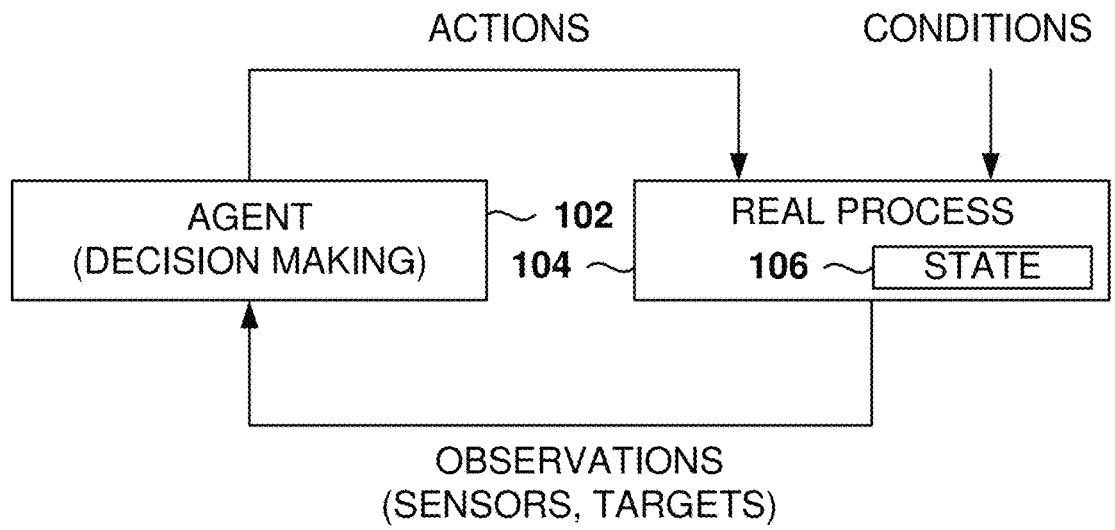
FIGS. 1A-1B illustrate processes for automatic decision making, according to some example embodiments.

Example methods, systems, and computer programs are directed to automated systems for controlling real-life processes using deep probabilistic decision machines (DPDM). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A variety of problems in enterprise and industrial AI deal with making optimal decisions and controls for dynamic processes. These real-life dynamic processes involve causal interactions that are represented as a set of dynamic stochastic variables, such as action inputs (controllable inputs to be planned under constraints), condition inputs (uncontrollable or exogenous inputs given by the process context and previous action selections), sensor outputs (measurement observations to be predicted by the process model), and target outputs (utility observations to be predicted by the process model and optimized by the action policy).

A universal deep probabilistic decision-making framework for dynamic process modeling and control, referred to as Deep Probabilistic Decision Machines (DPDM), is presented. The predictive model enables the generative simulations of likely future output sequences for any given future condition and action input sequences in the current process state. Then, the action policy controller, also referred to as the decision-making controller, is optimized based on predictive simulations. The optimal action policy controller is designed to maximize the relevant key performance indicators (KPIs) relying on the predicted values of sensor and target outputs for different actions and conditions over the near future.

For example, an industrial dynamic process, for making articles of manufacture, uses user-controllable actions and exogenous conditions as inputs. The process involves actions like controlling revolutions-per-minute (RPM) setpoints for rotating machines and temperature setpoints for heating equipment. Further, the process may occur in various conditions, e.g., static conditions such as different line locations, and dynamic conditions such as scheduled crew sequence, aimed dimensions of products changing over batches, and date of process runs. Sensor measurements related to the observed process state (e.g., actual measured RPMs and temperatures that change over time) may also be factors that alter the outcome. In addition, there may be target observations related to the process performance-measured by the relevant KPIs-such as the actual produced dimensions of products.

Further, using an example from predictive control for energy consumption in a steel mill with rechargeable batteries, the targets may be the total consumed energy per unit of time and a defined peak-usage per period (e.g., monthly peak usage of any 15-minute cumulative consumed energy that affect the electricity cost). These targets are optimized using the controllable actions of battery discharging and recharging. With predictions of future peak energy consumption, the batteries are set to discharge during peak usage to reduce the direct energy consumption from the electricity supplier. On the other hand, predicting periods of low-energy consumption enable recharging the batteries during these periods that have lower electricity cost.

Sample sensor observations include the elapsed duration times of some processes and the timing of events, such as heat start, meltdown start, and load and tap. Further, the conditions specific to the properties of heats (e.g., raw material, steel grade, temperature) would vary when there are transitions in heats or batched tasks.

The system presented builds the generative model of the dynamic process using historical process data and explicitly known causal relationships between inputs and outputs, and the system makes the control policy to optimize the corresponding KPIs. The system provides a data-driven and domain-knowledge-augmented method of building deep probabilistic process simulation models by defining sets of variables of actions, conditions, sensors, and targets. This process simulation model enables model-based decision making and control.

Another use case is for production scheduling. The objective is to produce the aimed total number of slab products in each product category (which is a combination of target width, target thickness, target finishing temperature, and target grade) for a given constrained number of total batches in a continuous caster in a steel mill. In this context, the actions involve the top-of-copper (TOC) width and the amounts of raw materials over sequential batches. The observations related to the target objective are the actual numbers of slab products made for each product category (determined by a combination of the actual width, the actual thickness, the actual finishing temperature, and the actual grade) in each batch. Other sensor observations include the remained material weight after a transition to the next batch, and a condition could involve different caster IDs and time of batch runs.

Another use case is for the demand prediction and supply management. The framework is utilized for a business dynamic process in demand prediction and supply chain management involving different and hierarchical regional, temporal, channel, and product sales conditions. For example, the model predicts the inventory and demand levels for a wide variety of stock-keeping units (SKUs) that belong to certain families or categories at a variety of sales or distribution centers belonging to specific regions within the global supply chain. The temporal nature of these variations, as well as external signals, are taken into account, such as market signals or internal planning information. The process involves dynamic control actions, e.g., price and promotions influencing the demand, safety stock levels, expedite shipments, inventory rebalancing, and production changes influencing the supply. There are sensor observations related to the process state, such as inventory quantities, sales quantities, production quantities, and competitors' sales trends over time. Some target observations to be predicted and optimized include the value at risk that estimates a composite of lost sales, inventory holding costs, expedite costs, obsolescence costs, contractual penalties, and sales order volume over time.

Figure 1B:
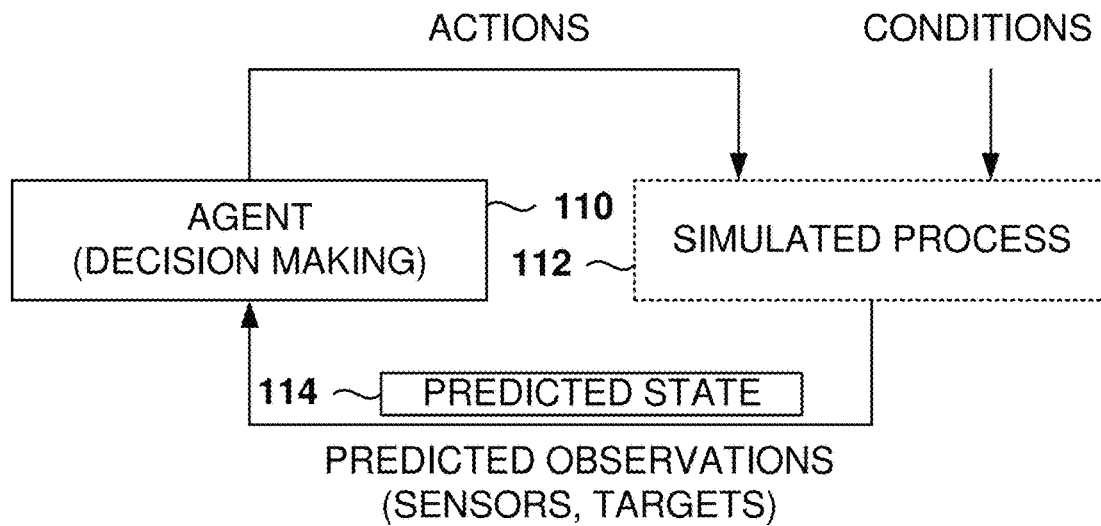

FIGS. 1A-1B illustrate processes for automatic decision making, according to some example embodiments. In a real-life system, an agent 102 for decision making uses observations (e.g., sensor readings and performance targets) that come from a real process 104 (e.g., manufacturing process). The real process is driven by a true but unknown latent state 106 that affects the observations. Further, conditions in the environment affect the performance of the real process 104.

The actions from the agent control the real process in order to meet the desired performance targets. The best action depends on the state 106 of the real process. Further, taking an action changes the state 106, which is reflected in the observations from the real process 104.

Some AI solutions (e.g., robotics, self-driving cars, games) begin with separately-developed rich and accurate physical-world simulators or have the ability to experiment at low cost in real-world scenarios. In many real-life scenarios, the agent is not allowed to simply learn from real-process interactions because bad decisions on real-life processes could be very expensive and potentially dangerous (e.g., an explosion or melting of a machine or a product). Learning a generative process simulation model based on the historical process data is very critical in enterprise and industrial AI applications.

FIG. 1B illustrates the DPDM model, where the simulated process 112 is used for decision making. The simulated process 112 generates a predicted state that, together with the predicted observations, are used to make decisions by the agent 110.

At a high-level, DPDM predicts the next state $s_{t+1}$, based on a current state $s_t$, an action $a_t$ at the current state, and a condition $c_t$ at the current state, where $s_t$ is the latent slate which is to be learned by the model. Further, DPDM predicts the sensor observation $x_{t+1}$ at the next state and the target observation $y_{t+1}$ at the predicted next state $s_{t+1}$.

DPDM predicts how the state of the system will evolve as a result of the actions taken based on observed sequences (conditions, actions, and observations over time). Based on defined KPIs, also referred to as targets, DPDM constructs a decision-making engine that suggests a "next best action" for the current state. In some example embodiments, the agent's initial action policy is learned from simulated experiences, or a model predictive control (MPC) approach is considered using Monte-Carlo simulations at every timestep.

DPDM provides "self-driving processes" that have similarities with self-driving cars. For example, a self-driving car includes states that have images from the environment, actions (e.g., steering, braking, accelerating), and utility functions (e.g., collision avoidance, route mapping). The self-driving process includes sensors (e.g., industrial sensors), actions (e.g., control switches, setpoints for machinery), conditions (e.g., different grades of produced products, different product lines), and utility functions (e.g., throughput, yield, energy consumption). Both processes predict future states and utility based on actions and conditions and use reinforcement-learning-based optimizers for control.

One advantage of DPDM is that it allows the user to define a set of dynamic stochastic variables such as actions, conditions, sensor outputs (e.g., measurements to be predicted), and target outputs to describe causal interactions in business or industrial dynamic processes. Traditional state-space models define only input and output variables, whereas DPDM utilizes the four different types of variables: actions, conditions, sensors, and targets. The predictive model enables the generative simulations of the likely future sensor and target sequence for any given future (or counterfactual) condition and action sequence at a process state. Further, based on predictive simulations of sensors and targets for different actions and conditions over the future time horizon, the action policy or decision-making controller is trained for selecting optimal actions to achieve the maximum KPI for future conditions.

A second advantage of DPDM is that it infers the dynamic latent slates by predicting all observations (both sensors and targets) provided conditions and actions over the input sequence. A better latent state representation improves the quality of the simulated dynamic process over multiple predicted steps. The latent states represented from predicting all the sensor and target observations are more advantageous than those that only predict the target measurements. The target prediction alone is often insufficient to identify the latent states for modeling the overall dynamic process. However, predicting all sensors and targets enables the latent states to capture the essential causal relationships of all actions, conditions, sensors and targets. The latent states compress experiences to automatically obtain key features for interpreting sensors and predicting targets.

Another advantage of DPDM is that the represented latent state of the model relies on the philosophy of the dual-process theory. We assume that the process state at each step t is represented by an explicit probabilistic latent state (driven by Bayesian learning) and the other implicit deep deterministic hidden state (driven by deep learning). That is, the latent state $s_t$ at timestep t is defined as a pair $(z_t, h_t)$, where $z_t$ is the probabilistic state and $h_t$ is the deterministic state, which corresponds to the Bayesian learning prior or posterior state and the deep learning hidden state.

The probabilistic state $z_t$ is useful to represent the stochastic and partially observable process, whereas the deterministic state $h_t$ is powerful in extracting key patterns and features from high-dim inputs and observations. Further, the probabilistic state $z_t$ serves as the compressed representation of the deterministic state $h_t$ over time, so the probabilistic state $z_t$ provides interpretable representations capturing the key causal relationships among actions, conditions, sensors and targets.

It is often difficult to make stable multistep-ahead predictions since predicted errors are accumulated over the predicted timesteps. DPDM includes a technique to stably represent the latent states over multistep predicted sequence by constraining the predicted prior and posterior distributions of the latent states to be very similar to the true posterior distribution of those in terms of the Kullback-Leibler (KL) divergence over the predicted timesteps.

Furthermore, another advantage of DPDM is that it is possible to include any explicitly known form of equations (e.g., physics-driven equations) mapping action and condition inputs to observations. If the equation parameters are unknown, the parameters are factored as latent variables to be inferred. For example, when the exact physics-driven equation of a battery charging/discharging operation is known, this knowledge is incorporated into the simulation of predicted observations.

Figure 2:
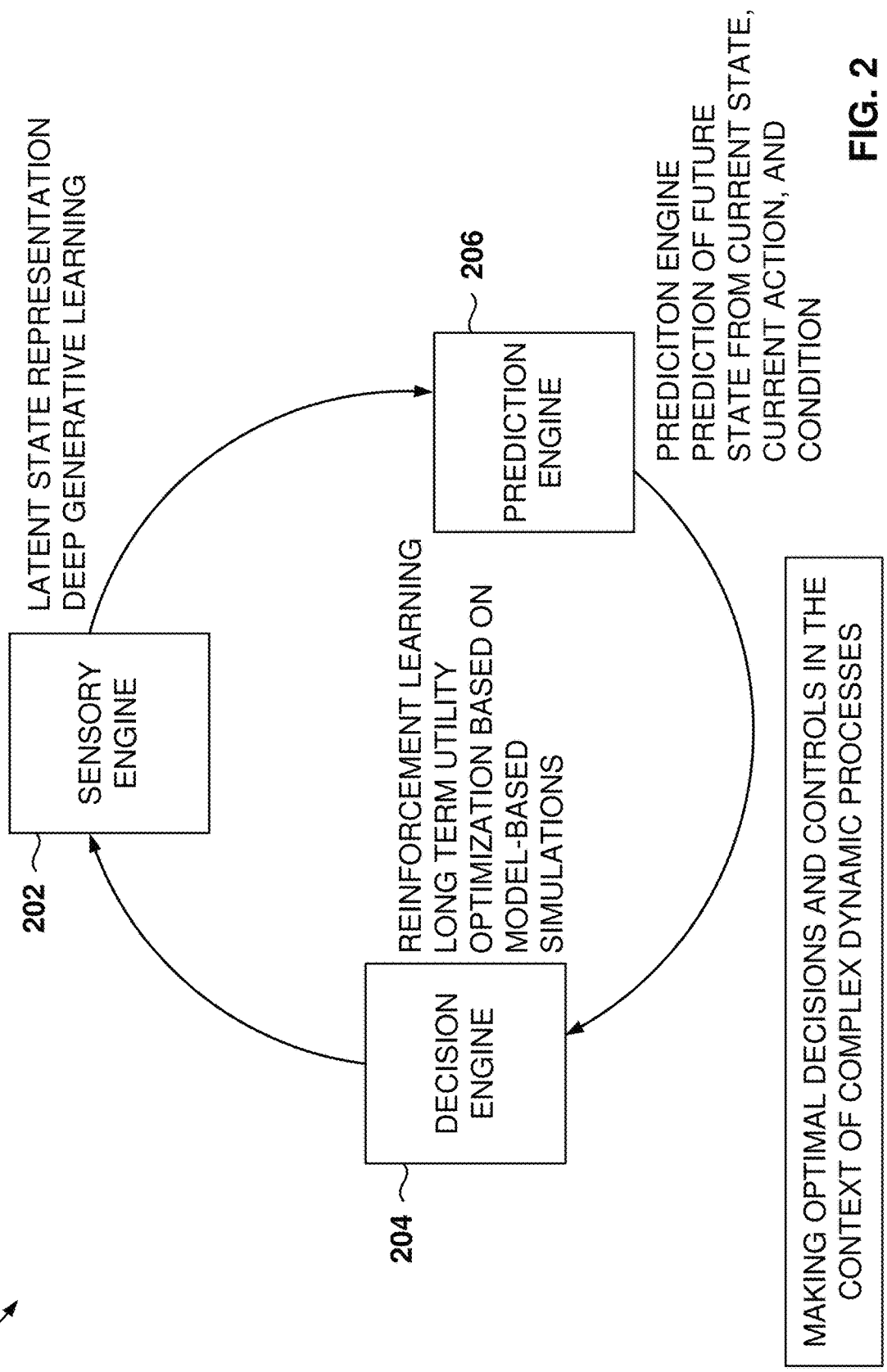
FIG. 2 illustrates the components of deep probabilistic decision machines (DPDM), according to some example embodiments.

FIG. 2 illustrates the components of DPDM, according to some example embodiments. DPDM includes three interacting elements: a sensory engine 202, a prediction engine 206, and a decision engine 204.

The sensory engine 202 provides information on the experience accumulated over time and includes the latent state representation, from temporal observations, for deep generative learning. In some example embodiments, the sensory engine includes Bayesian generative models or representational learning like Variational AutoEncoder (VAE) and Variational Information Bottleneck (VIB).

The prediction engine 206 enables the generative simulations of the likely future observation sequence for any given future (or counterfactual) condition and action sequence at a process state. The decision engine 204 provides the reinforcement learning based on predictive simulations in model-based reinforcement learning (RL) or model-predictive control (MPC) approaches. That is, the optimal action policy or controller can be designed to maximize the given KPIs, relying on the predicted experiences of sensor and target observations for different actions over the future time horizon.

In summary, DPDM includes deep learning, Bayesian probabilistic learning, and reinforcement learning. DPDM senses the current state of the business process, predicts what is likely to happen and why, and recommends decisions for improving outputs of the process.

In some example embodiments, the prediction engine 206 includes deep probabilistic dynamic models, Bayesian hierarchical models, causal models incorporating prior knowledge or business logic. The state prediction includes predicting the future state from the current state and the current action and condition, the predicted observation simulates the future paths of observations from the predicted states over time, and the state update is for updating the current state given the actual observation.

Figure 3:
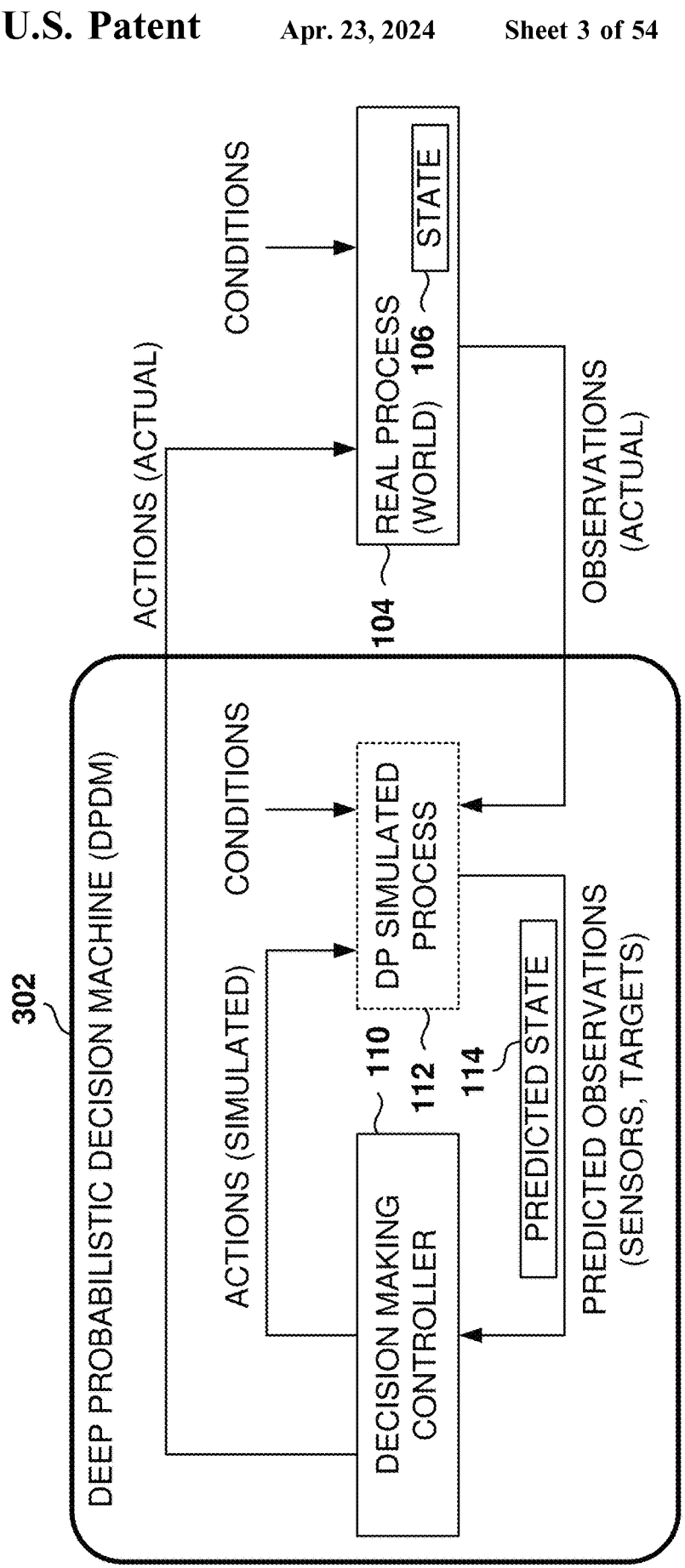
FIG. 3 illustrates a decision-making process for DPDM, according to some example embodiments.

FIG. 3 illustrates a decision-making process for DPDM, according to some example embodiments. By defining targets (e.g., performance KPIs), DPDM is used to make a decision-making engine that suggests the "next best action" for a given current state.

One goal of DPDM 302 is to make optimal decisions and controls in the context of complex dynamic processes, by analyzing dynamic causal interactions of a set of actions (controllable inputs to be planned under constraints), conditions (uncontrollable inputs), sensors (observable measurements to be predicted) and targets (observable utilities to be predicted and optimized).

DPDM 302 builds deep probabilistic (DP) generative models of dynamic industrial/enterprise processes for predictive simulations and optimizes the decision-making (DM) policy through model-based reinforcement learning and control.

DPDM 302 interacts with the real processes 104 (having current state 106) by setting actual actions for the real process 104, and by receiving actual observations from the real processes 104.

DPDM includes the decision-making controller 110 that generates simulated actions and the deep probabilistic (DP) simulated process 112. The decision-making controller 110 utilizes the predicted state 114 from the DP simulated process 112 as well as the predicted observations for sensors and targets.

The DP simulated process 112 receives the simulated actions from the decision-making controller 110 and conditions from the environment to generate the predicted state 114. Further, the DP simulated process 112 receives the actual observations from the real processes 104, and the actual observations are used to update the simulation process.

The decision-making controller 110 suggests the next best action for the predicted state and conditions based on the defined performance of the predicted targets.

Figure 4:
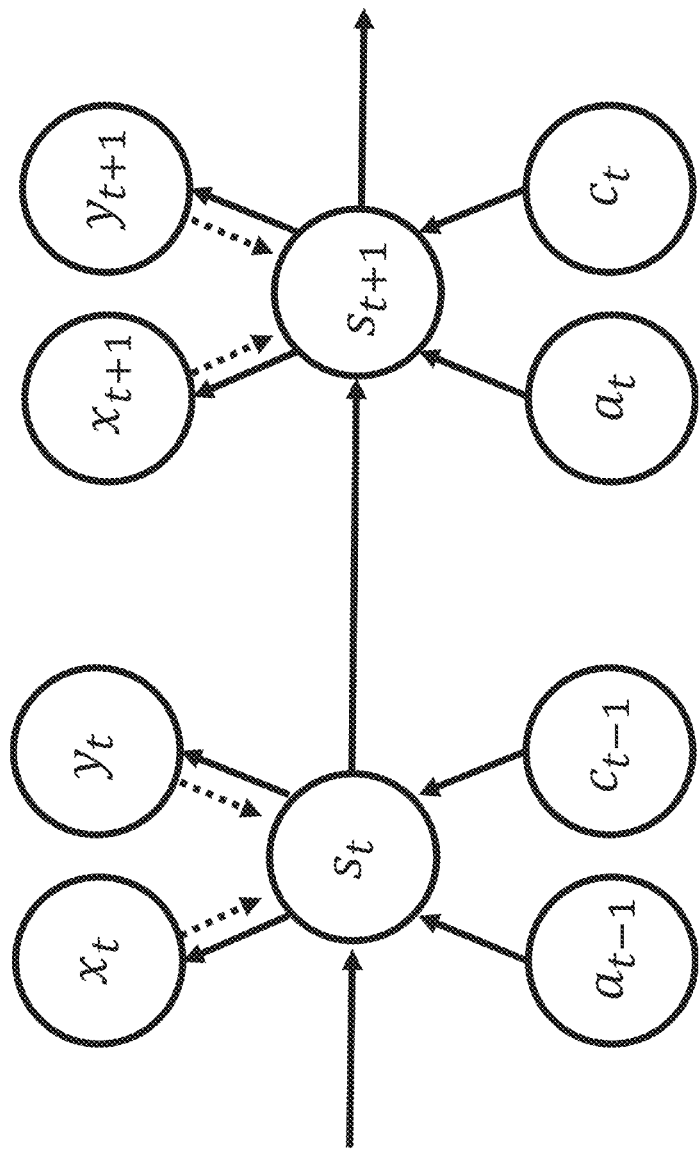
FIG. 4 illustrates states transitions and the basic building blocks for DPDM, according to some example embodiments.

FIG. 4 illustrates states transitions and the basic building blocks for DPDM, according to some example embodiments. In general, the dynamic process model is unknown, and the model is inferred from the data.

The inputs u include actions a and conditions c, and the outputs o include sensors x and targets y. The actions a are controllable inputs that may be set by the user or DPDM.

The state $s_t$ at the current time is the latent state representation of the dynamic process at time t. Thus, the inputs at time t include $a_t$ and $c_t$ and the outputs include $x_t$ and $y_t$. The targets y are the values to be optimized for the process, and the targets are also referred to herein as utilities or costs. It is noted that $a_t$, $c_t$, $x_t$, and $y_t$ are represented as vectors that may include multiple values, e.g., multiple inputs from sensors, multiple targets, etc.

DPDM handles a chain of states that occur in time. This sequence of states is represented using the value of the time period as an index, e.g., state $s_t$ is followed by state $s_{t+1}$, which is followed by state $s_{t+2}$, etc.

DPDM uses historical data to build the predictive process simulation, which is different from traditional machine-learning models. For example, if a machine-learning model is trained with historical data of past sales, the machine-learning model will learn to predict future sales based on the historical data. However, this model does not take into consideration possible current and future actions taken by the user or the change in current and future conditions. DPDM is able to predict future sales, based on hypothetical current and future conditions and actions, such as levels of inventory and planned actions to accommodate the inventory to demand. In a sense, DPDM is able to estimate for possible what-if scenarios, such as what would be the impact of sales if we take one action or another action?

In a process environment, vector-valued sensor measurements $x_t$ are observed at timestep t and vector-valued target measurements $y_t$ at each timestep t. That is, each of $\{x_t|t=1, 2, \ldots\}$ and $\{y_t|t=1, 2, \ldots\}$ is a multivariate time series. The timestep t denotes the time interval from the physical time t−1 to t. It is noted that $x_t$ and $y_t$ would be average or representative values from the timestep t. The sensors $x_t$ are the observed variables for measuring the unknown latent process state at timestep t. The targets $y_t$ are the observed variables for measuring utilities or KPIs. For simpler notations, observations $o_t$ are used for indicating both sensor and target observations $(x_t, y_t)$.

It is assumed that actions $a_t$ (controllable inputs from the agent's decision making) and conditions $c_t$ (uncontrollable and exogenously given inputs) are effective right after timestep t, and they are applied over the timestep t+1. That is, $a_t$ and $c_t$ are actions and conditions during the time interval from the physical time t to t+1. Provided with actions $a_t$ and conditions $c_t$, the latent state of the process $s_t$ at timestep t transits to the next latent state $s_{t+1}$ at timestep t+1 that will be used to predict or generate $\hat{o}_{t+1} = (\hat{x}_{t+1}, \hat{y}_{t+1})$.

Here, $u_{<t}$ (or $u_{\leq t}$) denote the time sequence of variables u up to and excluding (or including) $u_t$. Further, series $u_{j:k} = \{u_j, u_{j+1}, \ldots, u_k\}$ is the sequence from j to k, where k>j.

The joint distribution of both observed and latent variables at timestep t+1 is described as:

$$p(o_{t+1}, s_{t+1}|s_t, a_t, c_t) = p(o_{t+1}|s_{t+1})p(s_{t+1}|s_t, a_t, c_t)$$

The predictive distribution of $\hat{o}_{t+1}$ for a given previous posterior state $s_t$ is $\hat{o}_{t+1} \sim p(o_{t+1}|o_{\leq t}, a_{\leq t}, c_{\leq t}) = \int p(o_{t+1}|s_{t+1}) p(s_{t+1}|s_t, a_t, c_t) ds_{t+1}$ where $s_{t+1}$ is a prior state.

Multistep-ahead observation predictions are defined, where the model predicts the observation sequence of the next J timesteps at the current timestep T, given all previous experience tuples of $\{a_{0:T-1}, c_{0:T-1}, o_{1:T}\}$ and the future action and condition sequence of $\{a_{T:T+J-1}, c_{T:T+J-1}\}$. That is, DPDM aims to build a predictive simulation model $p(o_{T+1:T+J}|o_{\leq T}, a_{\leq T+J-1}, c_{\leq T+j-1})$ of the process for the next J timesteps.

Multistep-ahead observation predictions for $\hat{o}_{T+1:T+J}$, given the state $s_T$, are defined as follows:

$$\hat{o}_{T+1:T+J} \sim p(o_{T+1:T+J}|o_{\leq T}, a_{\leq T+J-1}, c_{\leq T+j-1}) =$$
$$\int p(o_{T+1:T+J}, s_{T+1:T+J}|o_{\leq T}, a_{\leq T+J-1}, c_{\leq T+j-1})$$
$$ds_{T+1:T+J} = \int p(o_{T+1:T+J}|s_{T+1:T+J}) p(s_{T+1:T+J}|$$
$$o_{\leq T}, a_{\leq T+J-1}, c_{\leq T+j-1}) ds_{T+1:T+J} = \int \Sigma_{j=1}^{J} p(o_{T+j}|s_{T+j})$$
$$p(s_{T+j}|s_{T+j-1}, a_{T+J-1}, c_{T+j-1}) ds_{T+1:T+J}.$$

With this predictive model, $a_{T:T+J-1}$ is optimized to maximize the cumulative utility derived from target outputs $y_{T+1:T+J}$. It is noted that conditions $c_{T:T+J-1}$ are exogenously known and given before predictions.

Further, the prior and posterior distributions of the latent state variable $s_t$ are obtained. The prior sample of $s_t$ is calculated before seeing the true observation $o_t$ and is defined as $s_t^{prior} \sim p(s_t|o_{\leq t-1}, a_{\leq t-1}, c_{\leq t-1})$. The posterior sample of $s_t$, calculated after observing the belief update with the true observation $o_t$, is defined as $s_t^{post} \sim q(s_t|o_{\leq t}, a_{\leq t-1}, c_{\leq t-1})$, where q refers to the posterior probabilistic distribution.

The prior state distribution of $s_t$ is described as the state transition dynamics model $s_t^{prior} \sim p(s_t|s_t^{post}, a_{t-1}, c_{t-1})$, given the previous posterior state $s_{t-1}^{post}$, action $a_{t-1}$, and condition $c_{t-1}$. The generative distribution of $o_t$ for a given prior state $s_t^{prior}$ follows $\hat{o}_t \sim p(o_t|s_t^{prior})$.

To summarize: the prior state distribution of $s_t$ is $s_t^{prior} \sim p(s_t|o_{\leq t-1}, a_{\leq t-1}, c_{\leq t-1}) = p(s_t|s_{t-1}^{post}, a_{t-1}, c_{t-1})$;
the posterior state distribution of $s_t$ is $s_t^{post} \sim q(s_t|o_{\leq t}, a_{\leq t}, c_{\leq t}) = q(s_t|s_{t-1}^{post}, a_{t-1}, c_{t-1}, o_t) = q(s_t|s_t^{prior}, o_t)$;
and the generative distribution of $\hat{o}_t$ is $\sim p(o_t|s_t^{prior})$.

Figure 5:
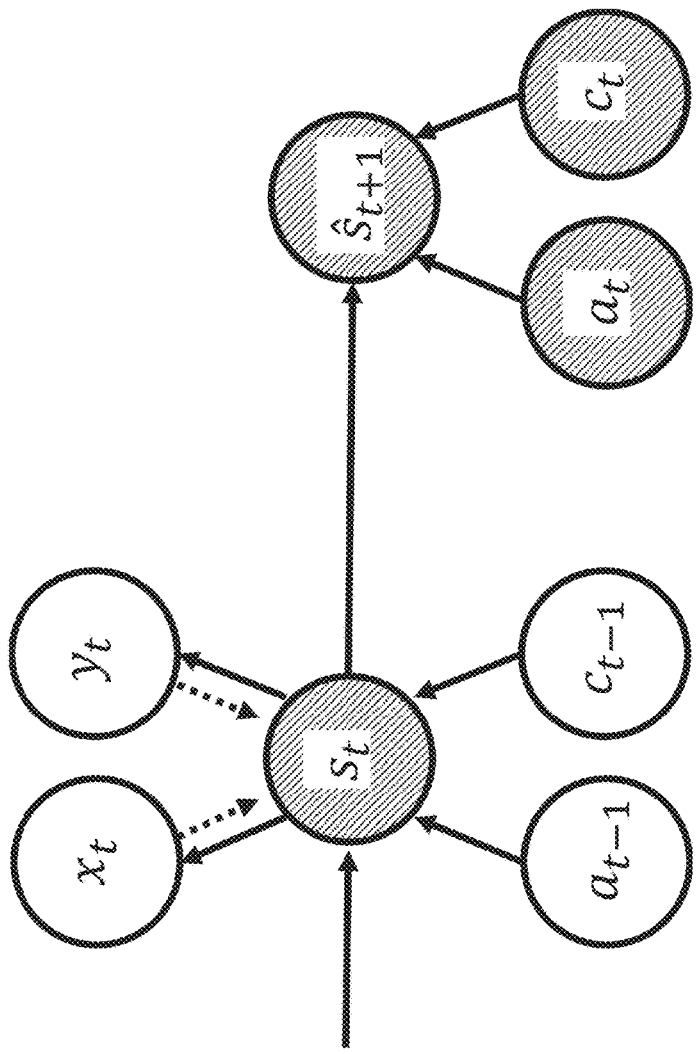
FIG. 5 illustrates predicting state from the prior state distribution, according to some example embodiments.

FIG. 5 illustrates the predictive state $\hat{s}_{t+1}$ from the prior state distribution, according to some example embodiments. The hat notation is used to denote prior or predicted values. The next predictive state $\hat{s}_{t+1}$ is predicted based on the current action $a_t$ and the current condition $c_t$ and the current posterior state $s_t$, which is expressed as:

$$\hat{s}_{t+1} \sim p(\hat{s}_{t+1}|x_{\leq t}, y_{\leq t}, a_{\leq t}, c_{\leq t}) = p(\hat{s}_{t+1}|s_t, a_t, c_t)$$

Figure 6:
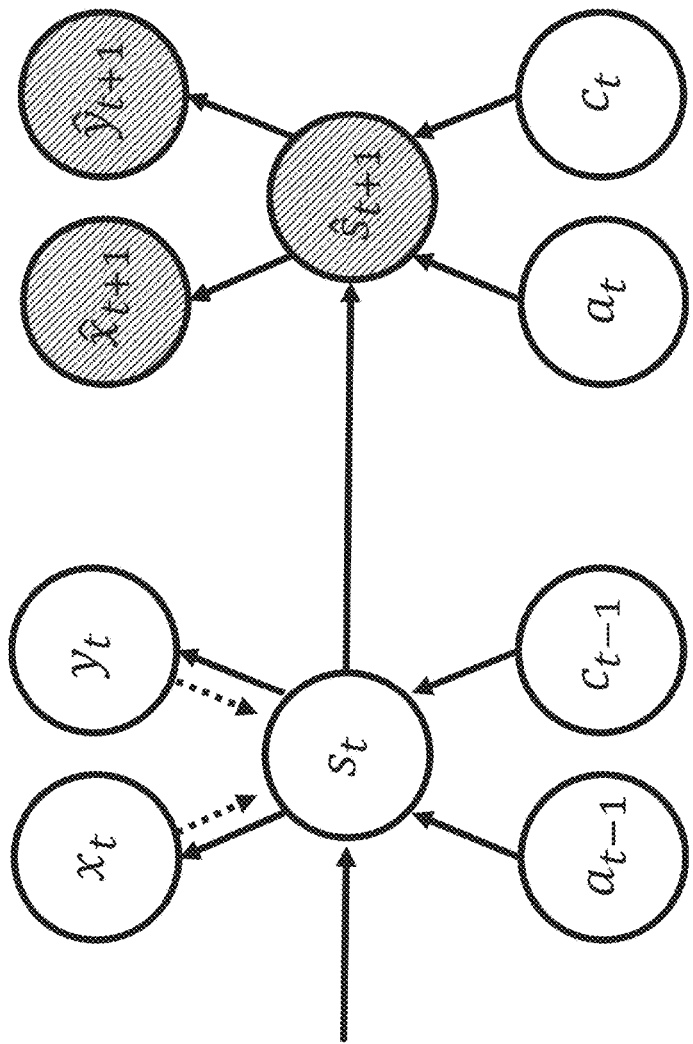
FIG. 6 illustrates the prediction of the next sensor and the next target given the next predictive state, according to some example embodiments.

FIG. 6 illustrates the prediction of the next sensor and the next target given the next predictive state, according to some example embodiments. After observing the actual outputs, the state of the posterior is updated.

Thus, given the next predictive state $\hat{s}_{t+1}$, the next sensor $\hat{x}_{t+1}$ and next target $\hat{y}_{t+1}$ are also predicted, which may be expressed as follows:

$$\hat{o}_{t+1} = (\hat{x}_{t+1}, \hat{y}_{t+1}) \sim p(\hat{o}_{t+1}|\hat{s}_{t+1})$$

The process may be repeated in multiple iterations to make multistep-ahead predictions over future states and observations. Predicting both sensors and targets helps representing the interpretable and predictive future states in order to make decisions.

Figure 7:
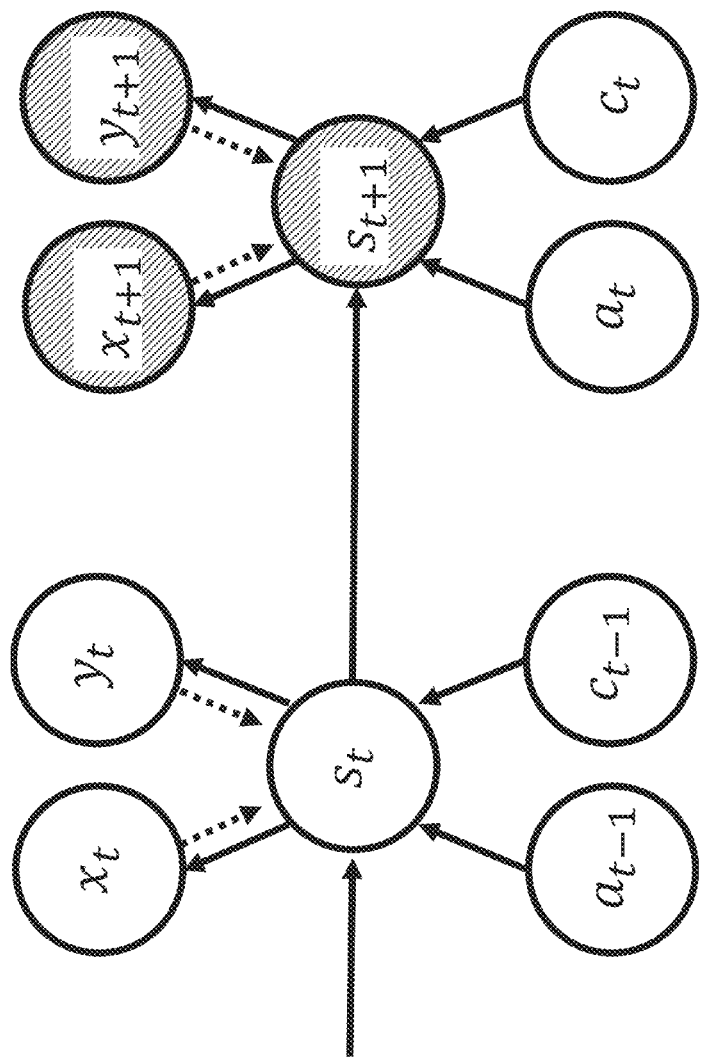
FIG. 7 illustrates updating the prior state to the posterior state after observing the actual outputs, according to some example embodiments.

FIG. 7 illustrates updating the prior state $\hat{s}_{t+1}$ to the posterior state $s_{t+1}$ after observing the actual outputs $o_{t+1}$, according to some example embodiments. After observing the actual outputs $o_{t+1}=(x_{t+1},y_{t+1})$, the prior state $\hat{s}_{t+1}$ is updated to the posterior state $s_{t+1}$, expressed as follows:

$$s_{t+1} \sim p(s_{t+1}|x_{\leq t+1},y_{\leq t+1},a_{\leq t},c_{\leq t}) = p(s_{t+1}|\hat{s}_{t+1},x_{t+1},y_{t+1})$$

Thus, the posterior state $s_{t+1}$ is based on the actual outputs $o_{t+1}$ instead of the predictive outputs $\hat{o}_{t+1}$. Further, the posterior state $s_{t+1}$ is based on the history of inputs from previous states $(a_{\leq t}, c_{\leq t})$ and outputs from the current and previous states $(x_{\leq t+1}, y_{\leq t+1})$.

The history of event observations are used to predict future event observations. By having a process simulation model for predicting the future event observations, it is possible to apply the optimization planning algorithms based on the performance of the predicted targets for any planned future actions. DPDM provides information on possible scenarios if the user decides to change the actions. For example, by using battery power at certain times, it is possible to determine cost savings in energy use when the batter power is used to avoid going over energy usage limits that trigger higher energy costs.

The step-by-step methodology allows to provide better prediction by considering the multiple steps that lead to a final outcome, such as the quality of a product. Instead of focusing on just the end product, inputs are evaluated at each of the different steps in order to reach an optimal output.

Figure 8:
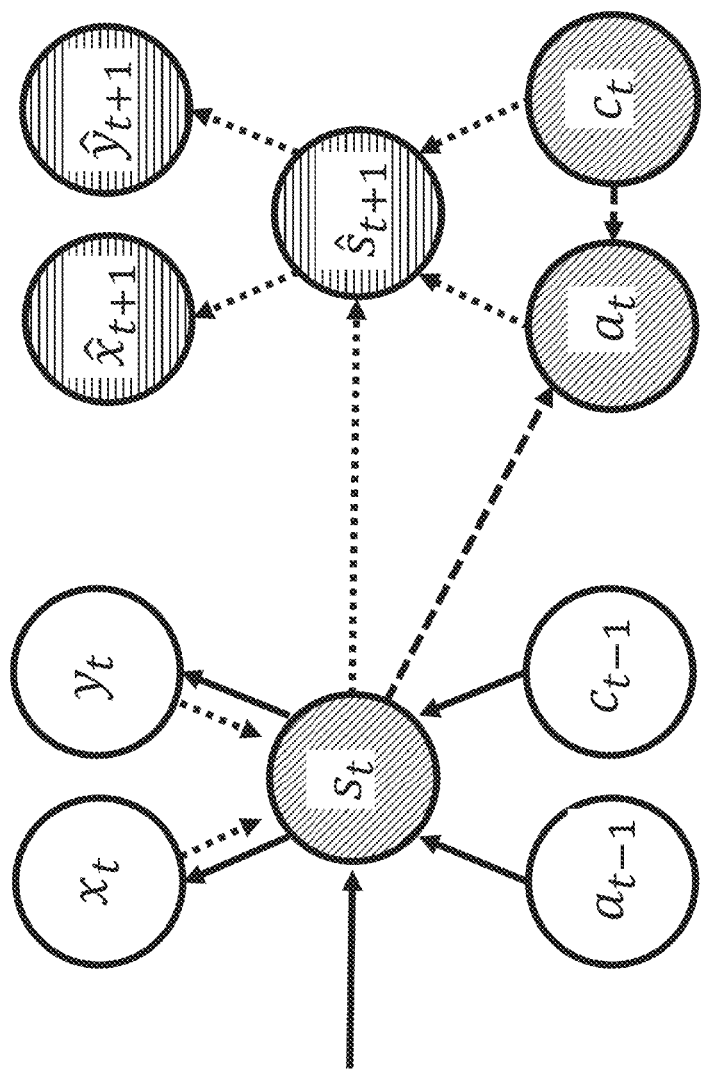
FIG. 8 illustrates the selection of the action given the current condition and the current state, according to some example embodiments.

FIG. 8 illustrates the selection of the action $o_t$ given the current condition $c_t$ and the current state $s_t$, according to some example embodiments. That is, given the current condition $c_t$ and the current state $s_t$, $a_t$ is determined, which is expressed at as $a_t \sim p(a_t|s_t,c_c)$.

In the planning process, the current state $s_t$ is known; DPDM searches for the action $a_t$ that would be the best for the current condition $c_t$ to maximize the cumulative utility derived from the predicted target outputs $\hat{y}_{T+1:T+J}$. The best action (or actions since $a_t$ is a vector) is the action that achieves the best cumulative utility.

Figure 9:
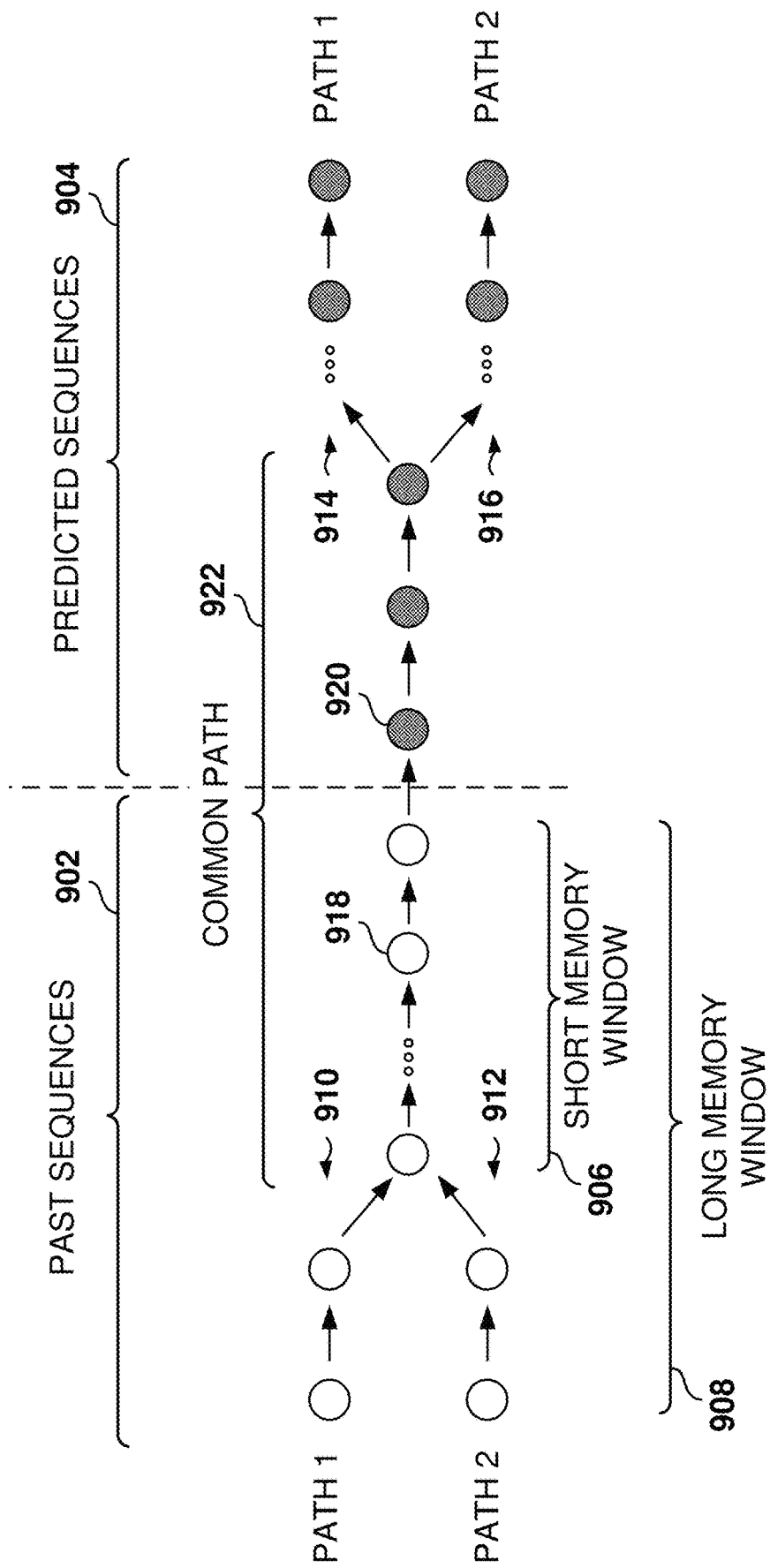
FIG. 9 illustrates the effect of the memory window size on the predicted sequence, according to some example embodiments.

FIG. 9 illustrates the effect of the memory window size on the predicted sequence, according to some example embodiments. Two sequences of events are illustrated that follow path 1 and path 2, respectively. The sequences have some past states, referred to as past sequences 902, and some predicted states, referred to as predicted sequences 904.

The first sequence path 1 includes states 910, followed by states in the common path 922, and followed by states 914. The common path 922 includes past states (e.g., state 918) and predicted states (e.g., 920). The second sequence path 2 includes states 912, followed by states in the common path 922, and followed by states 916.

An observation window, also referred to herein as memory window, is used for predicting future states. The size of the memory window affects how much history is considered before predicting the state. A long memory window 908 requires more computer resources to establish the predictions, while a short memory window 906 will consider fewer historic events and will be faster for making predictions.

However, if the memory window is short (e.g., memory window 906), the observation of the divergence of paths 1 and 2 in the future will appear stochastic, that is, random. The short memory window 906 is not able to explain the different paths.

On the other hand, the long memory window 908 considers path 1 910 and path 2 912 and is able to explain and predict the divergence of the paths in the future. However, it is not possible for the agent to decide which input size is a perfect input size in all situations, or if the agent should consider all the past historical input. The long memory window may not be computationally feasible for complex processes. Thus, a memory size is chosen, which dictates the need to represent the future as stochastic rather than deterministic.

The unknown latent process state of the DPDM model relies on the philosophy of the dual-process theory. It is assumed that the process state at each step t is represented by an explicit probabilistic latent state (driven by Bayesian learning) and the other implicit deep deterministic hidden state (driven by deep learning).

There are also interplays between the probabilistic states $z_{\leq t}$ and the deterministic states $h_{\leq t}$ of the process over time. The deterministic hidden states can be modeled as the hidden state of the recurrent neural network (RNN) such as long short-term memory (LSTM) or gated recurrent units (GRU).

The partially observability associated with the memory window, requires a stochastic state representation defined by probability distributions. Many real-world sequential decision-making problems are partially observable by nature, and the environment model is typically unknown. Consequently, there is a need for reinforcement learning methods that can tackle such problems given only a stream of incomplete and noisy observations.

Figure 10:
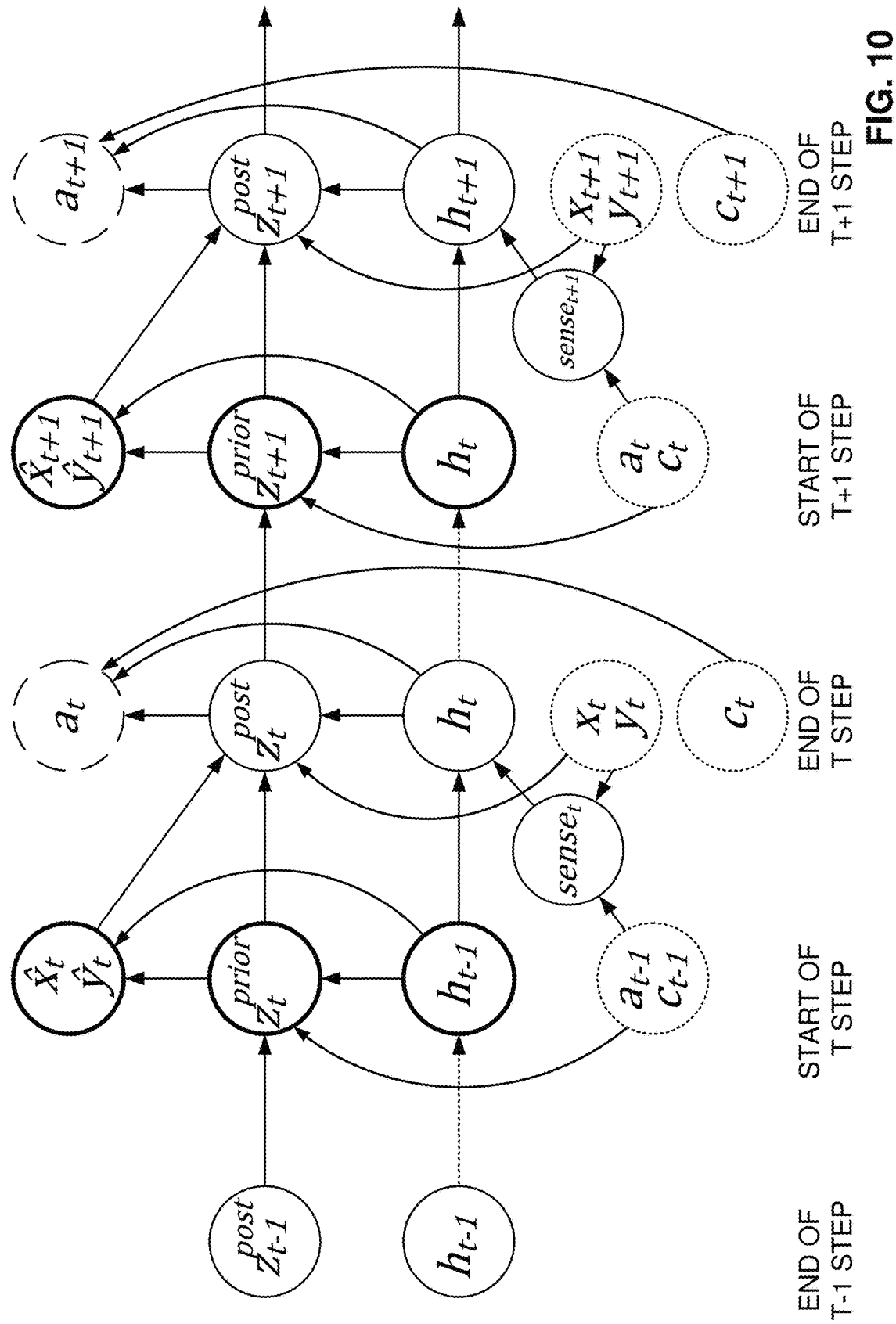
FIG. 10 illustrates the latent state representation, according to some example embodiments.

FIG. 10 illustrates the latent state representation, according to some example embodiments. Dynamic stochastic processes often involve high-dimensional causally-correlated relationships among actions, conditions, sensors, and target observations. Thus, modeling representative latent states that capture temporally-varying nonlinear relations is a key problem DPDM combines probabilistic states in Bayesian probabilistic learning (e.g., probabilistic prior and posterior state updates) and deterministic states in deep learning (e.g., recurrent neural networks such as RNN LSTM and GRU) for the latent state representation.

The latent state representation is divided into a probabilistic state $z_t$ and a deterministic state $h_t$, that is, $s_t=(z_t,h_t)$. In some example embodiments, the probabilistic state $z_t$ utilizes Bayesian learning and the deterministic state $h_t$, uses a deep-learning hidden state.

The deterministic state $h_t$, in some example embodiments, is equal to $f(h_{t-1},c_{t-1},a_{t-1},o_t)$ where function $f$ is a type of recurrent neural network (RNN), such as LSTM or GRU.

In this model, $z_t$ is similar to the $s_t$ discussed above with reference to t, but here the state $s_t$ has added the deterministic state $h_t$ from deep learning. The probabilistic state $z_t$ has a prior and a posterior, as discussed above, as well as a mean and a standard deviation. In addition, the probabilistic state $z_t$ incorporates the previous deterministic state $h_{t-1}$ from deep learning.

Additionally, there is another layer of reinforcement learning for making decisions and control. For example, $a_t$, is calculated based on $z_t^{post}, h_t, x_t, y_t$, and $c_t$, that is, based on the probabilistic state $z_t$ and the deterministic state $h_t$.

Deep learning extracts and represents key sensory features from the sequence of past experience tuples (observations, actions, conditions). Bayesian learning constructs probabilistic state dynamics with implicitly learned features from deep learning. Since the deterministic states (or hidden-layer outputs) in deep learning tend to have much higher dimensionality than the probabilistic states in Bayesian learning, probabilistic states are helpful for the overall model interpretability. Probabilistic states can be considered sequentially-learned variational auto-encoded features with the inputs of deterministic hidden states from deep learning.

The latent states represented from predicting all the sensor and target measurements is more advantageous than those states obtained from predicting only the target measurements. The target measurement prediction alone is often insufficient to identify the latent states for modeling the overall dynamic process. This predictive learning of all the sensor and target measurements could be viewed as modeling both the state transition function and the reward function in the model-based reinforcement learning. Note that predicting the temporal sequences of all sensor and target measurements given the temporal sequences of actions and conditions may capture the causally-correlated structure among variables over time and also enable the latent states to capture the relationships.

Basically, the probabilistic state $z_t$ and the deterministic state $h_t$ feeds state and output to the reinforcement layer, which makes decisions and sends the actions back to them.

Deep Probabilistic AI (DPAI) combines scalable and data-driven deep learning with generative and predictive model-based Bayesian learning framework. It learns from the data and reasons about the model structure and prediction uncertainty. Deep probabilistic programming (DPP) combines deep learning and Bayesian learning in a unified framework.

The probabilistic programming for the Bayesian framework is used to solve AI/ML problems and provides a language to define generative probability models and perform the automatic inference over a model given the data. The generative probability models specify the stochastic data generating (or simulation) process with the likelihood function, the prior distribution and the error distribution involving model parameters (e.g., latent state) as probabilistic random variables.

Compared to the statistical approach where only the observation variables (data) are assumed to be probabilistic, the Bayesian approach views everything (both observation data and model parameters) as random variables. The Bayesian inference requires updating the probabilistic distribution of model parameters after seeing the data. This updated distribution is called the posterior distribution of model parameters. This inference is mostly intractable and needs efficient approximation methods, such as sampling from the unknown posterior mass distribution. The benefit of the Bayesian framework is not it is feasible to use for decision-making if the inference can be automatically done for the defined model.

Deep learning and Bayesian learning are two mainstreams of AI and ML. Deep learning is data-driven (associative function-based learning), and Bayesian learning is probabilistic model-driven (structured and generative learning). They are complementary.

Deep learning requires a large amount of experience data to be learned. However, once the model is learned from the data, the model detects patterns and associations fast. Deep learning may behave like our fast intuitive or emotion brain. Further, deep learning uses differential optimization (stochastic gradient ascent) to find the deterministic point-estimate that maximizes the likelihood or minimizes the specified loss function for a given data. One advantage of DL frameworks is the scalability and non-linear modeling that can be achieved with heterogeneous inputs. DL supports good feature representation learning and universal function approximators but tends to be less interpretable and likely to be overfit in a high-dimensional parameter space.

Compared to Deep learning, Bayesian probabilistic learning allows to explicitly represent knowledge and uncertainty about the data generating process in terms of causal, hierarchical, sequential model structures and probabilistic parameters. The Bayesian approach views everything (including both observations and model parameters) as probabilistic random variables.

The key in Bayesian modeling is to approximate this integrated likelihood to calculate the model evidence over uncertain parameters. This can be computationally difficult, so Monte-Carlo, or other approximate inference technique, is used to estimate the likelihood expectation over uncertain parameters. Bayesian inference involves "numerical integral," and the reason why Bayesian is difficult is because the numerical integral is harder than the numerical differential. But this integrated likelihood calculation is important in high dimensional parameter space, where the maximum likelihood estimate is not representative.

Since DL models usually have a large number of parameters (often more than the data size), DL may use Bayesian for Occam's razor. One of the key links between DL and Bayesian learning frameworks is to use variational inference. Variational inference transforms intractable Bayesian inference problems into tractable optimization. This allows capturing the parameter uncertainty. MCMC, variational inference, or Bayesian Approximation methods are all about how to approximate this problem better and more efficiently. Also, this means that we have a "generative" model (data simulation model).

Qualitatively speaking, as the sample size gets larger, a more complicated model is needed as the optimal model for explaining and predicting the data. The epistemic error or modeling error (the sum of model bias and variance error), distinguished from irreducible error from the system itself, tends to be higher with a small sample size, so the model may be less generalizable. With a high sample size, it is possible to reduce the epistemic error and achieve a generalizable model.

However, before the DL used GPU computational power, simple linear models were often applied for big data due to the computational constraint. However, the model may be too simple and gel a significant bias error.

In contrast, if the model is too complex, the variance error is increased of the model overfits. A DL model can learn any randomized labels that do not have any underlying rule at all. Often the number of parameters in a deep learning model is greater than the number of data samples. Thus, DL models need adjustments, such as Dropout or BatchNorm, to be regularized for better generalization.

Bayesian ML and Bayesian DL naturally do this regularization to find optimal model complexity in terms of integrating prior and looking into the likelihood expectation over all uncertain parameters. Model Complexity is not only about the number of features, but it also depends on the model structure like whether the model is hierarchical or sequential.

Since the deep probabilistic models for state transition, to approximate posterior and generation, are shared across timesteps in the input sequence and the output sequence, learning from self-predicting input sequences is valuable to predict the output sequences well. The self-predictions of the observations (both the sensor measurements and the target measurements) in input sequences enables representing the temporally-varying latent states and a better representation of the initial latent state immediately before prediction steps. The better latent state representation improves the quality of the simulated dynamic process over multiple predicted steps. Since predictions are iteratively made, the latent states are well represented over the entire predicted steps.

FIG. 10 illustrates how the probabilistic state $z_t$ is updated from the prior to the posterior as additional inputs are received, based on the differences between predictions and actuals. Once the $z_t^{post}$ and $h_t$ are obtained and the condition $c_t$ is known, the best action $a_t$ is determined based on $c_t$, $z_t^{post}$, and $h_t$. It is noted, that since a sequence of states is utilized, multiple states are considered to reach the ultimate overall target (e.g., KPI).

The deep probabilistic (DP) model training is separated from the decision-making (DM). Thus, decision-making steps happen after the DP model is trained based on the historical data. Once the DP model is built for the process simulation, the DP model may be used to check the outcomes for multiple actions and then decide on the best action.

With reference to DPDM's algorithm, the process simulation model is learned to self-generate the input observation sequence of total T steps of sensor measurements and target measurements $(x_{1:T}, y_{1:T})$ and predict the output observation sequence of total J step observations $(x_{T+1:T+J}, y_{T+1:T+J})$, given the input observation sequence $(x_{1:T}, y_{1:T})$ and all the T+J step condition and action sequences $(c_{0:T+J-1}, a_{0:T+J-1})$. Here, the input sequence size T, also referred to as the memory window, should be a sufficiently long input sequence size for representing the process state to capture the essential causal relationship of all associated variables.

Since the deep probabilistic models for state transition are shared across the timesteps in the input sequence and the output sequence, learning from self-predicting input sequences is used to predict the output sequences well. Note that the self-predictions of all observations (both the sensor measurements and the target measurements) in input sequences enable representing the temporally-varying latent states and the initial latent state immediately before the prediction steps. A better latent state representation would improve the quality of the simulated dynamic process over multiple predicted steps. Since predictions are iteratively made, the latent states should be well represented over the entire sequence of predicted steps.

The probabilistic latent state at timestep t has the prior distribution before observing the true measurements $o_t$ and the posterior distribution after observing $o_t$. The prior latent state $z_t^{prior}$ $p(z_t|o_{\leq t-1}, c_{\leq t-1}, a_{\leq t-1})$ is employed to predict the measurements before actual observations, combined with the last hidden state $h_{t-1}$. In contrast, the posterior latent state $z_t^{post} \sim p(z_t|o_{\leq t}, c_{\leq t-1}, a_{\leq t-1})$, represented after the update with the true measurements $o_t$, is involved in making the agent's decisions, combined with the hidden state $h_t$.

In some example embodiments, the prior distribution of the latent state is posited to be a Gaussian distribution with a diagonal covariance matrix, whose mean and standard deviation are multi-layer neural network functions of the last posterior state $z_{t-1}^{post}$, the last hidden state $h_{t-1}$, actions $a_{t-1}$, and conditions $c_{t-1}$ known at the start of the timestep t. It is noted that actions $a_{t-1}$ and conditions $c_{t-1}$ are defined to be effective over the timestep t.

The $z_t^{prior}$ is defined as follows:

$$z_t^{prior} \sim p(z_t|o_{\leq t-1}, c_{\leq t-1}, a_{\leq t-1}) \approx p_{\theta_z}(z_t|z_{t-1}^{post}, h_{t-1}, c_{t-1}, a_{t-1}) = \mathcal{N}(z_t; \mu_t^{prior}, \sigma_t^{prior})$$

Here, $\mathcal{N}$ is a Gaussian distribution and $[\mu_t^{prior}, \log \sigma_t^{prior}] = NN(z_{t-1}^{post}, h_{t-1}, c_{t-1}, a_{t-1})$, where NN is a multi-layer neural network used to parameterize the Gaussian conditional prior.

The dual-process prior state $s_t^{prior}$ is defined as $s_t^{prior} = (z_t^{prior}, h_{t-1})$, and is used to make the prior-based predicted measurements $\hat{o}_t$, which is equal to $(\hat{x}_t, \hat{y}_t)$. That is, the prior-based predicted measurements $\hat{o}_t$ are now generated as follows:

$$\hat{o}_t \sim p(o_t|o_{\leq t-1}, a_{\leq t-1}, c_{\leq t-1}) \approx p_{\theta_o}(o_t|z_t^{prior}, h_{t-1}) = \mathcal{N}(o_t; \mu_t^{obs}, \log \sigma_t^{obs})$$

Here, $[\mu_t^{obs}, \sigma_t^{obs}] = NN(z_t^{prior}, h_{t-1})$. Empirically we often find the model tends to be trained better and faster when it does not learn $\log \sigma_t^{prior}$ explicitly. That is, we simply assume that $\hat{o}_t^{prior} = \mu_t^{o,prior}$ and $\log \sigma_t^{o,prior} = 1$.

Given the prior sample of probabilistic latent state $z_t^{prior}$ and the experience tuple $(c_{t-1}, a_{t-1}, o_t)$ at the timestep t, the last hidden state $h_{t-1}$ is updated to $h_t = f(h_{t-1}, c_{t-1}, a_{t-1}, o_t)$.

Once the true measurements $o_t$ at the end of the timestep t is observed, it is assumed that the prior latent state $z_t^{prior}$ is updated to the posterior latent state $z_t^{post}$ relying on the difference between the predicted and true observations $\hat{o}_t - o_t$, the hidden state $h_t$ and the observation $o_t$. That is, $z_t^{post} \sim p(z_t, o_{\leq t}, c_{\leq t}, a_{\leq t-1}) \approx q_{\Phi_z}(z_t|z_t^{prior}, h_t, \hat{o}_t - o_t, o_t) = \mathcal{N}(z_t; \mu_t^{post}, \sigma_t^{post})$, where $[\mu_t^{post}, \log \sigma_t^{post}] = NN(z_t^{prior}, h_t, \hat{o}_t - o_t, o_t)$.

Since $\hat{o}_t - o_t$ is the prediction error in the observed measurement and it is used for approximating the posterior, a larger prediction error may lead to a greater update in the posterior. The posterior distribution $z_t^{post}$ is assumed to be a Gaussian distribution whose mean and standard deviation are parameterized by multi-layer neural networks. In our dual-process model, the deterministic hidden state $h_{t-1}$ as a historical memory of past experiences influences the probabilistic posterior latent state $z_t^{post}$. This means that the deep deterministic state $h_{t-1}$ from the past and the current outputs $o_t$ are probabilistically compressed into the posterior latent state $z_t^{post}$. That is, the implicit processing mode affects the explicit processing modes in the agent's mind.

Once the posterior state $z_t^{post}$ is obtained, the prior-based predicted measurements can be updated to the posterior-based predicted measurements: (for notational convenience, we use the same notation $\hat{o}_t$ for both prior-based and posterior-based predictions)

$$\hat{o}_t \sim p_{\theta_o}(o_t|z_t^{post}, h_{t-1}) = \mathcal{N}(o_t; \mu_t^{obs}, \log \sigma_t^{obs}),$$

where $[\mu_t^{obs}, \sigma_t^{obs}] = NN(z_t^{post}, h_{t-1})$

Figure 11:
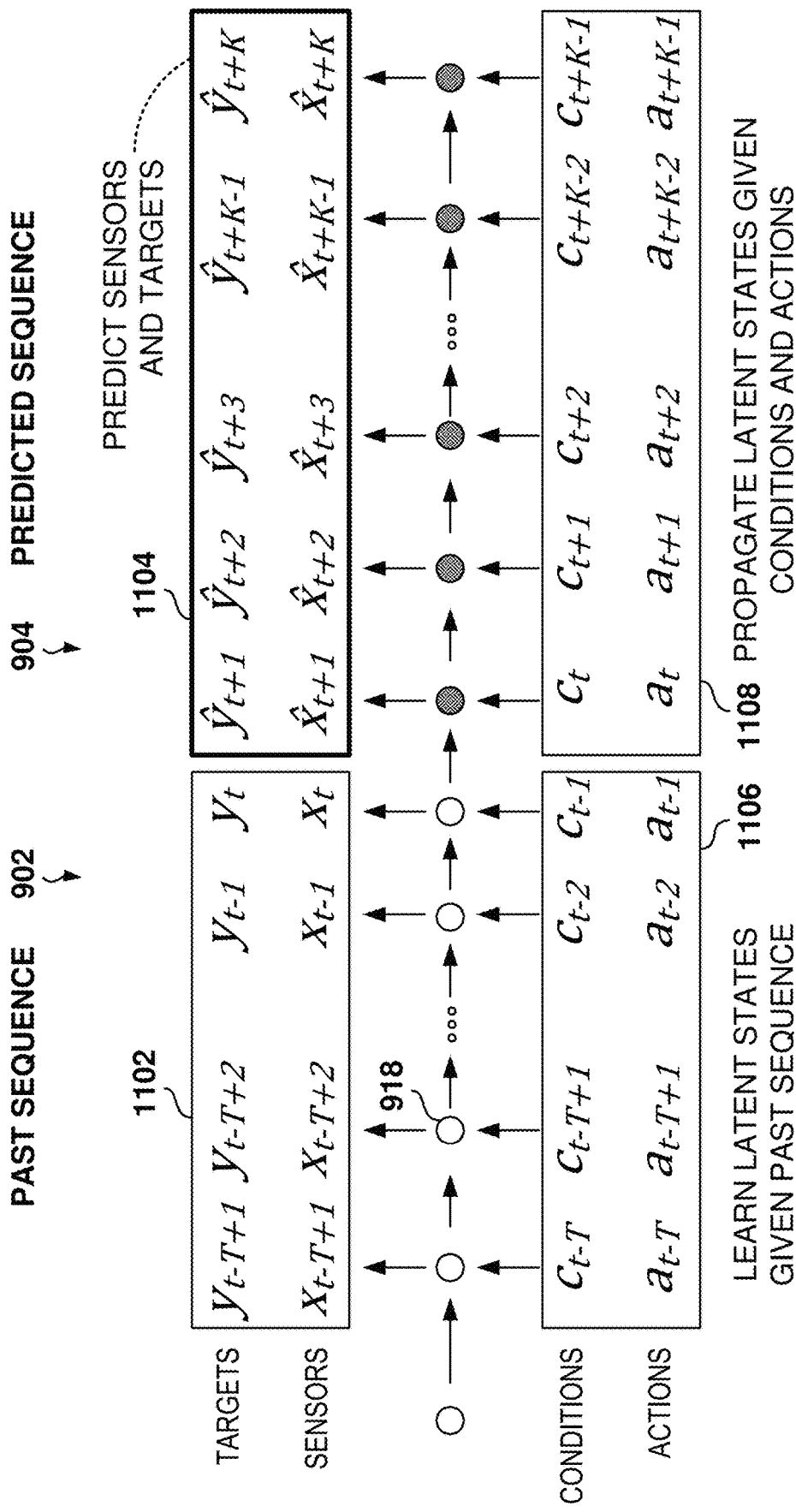
FIG. 11 illustrates the deep probabilistic (DP) process model that predicts the sensors and targets given the conditions and actions over the future horizon, according to some example embodiments.

FIG. 11 illustrates the process for calculating the predicted sequence, according to some example embodiments. The DP process model (state prediction, state update, observation prediction) is trained to learn the latent states to reduce the overall prediction error.

Given the past sequence 902 of experience tuples (which includes targets and sensors 1102 plus conditions and actions 1106), the DP process model learns the latent states 918.

Further, given the predicted conditions and actions 1108 over the future horizon (e.g., predicted sequence 904), the latent states 918 are propagated over the predicted sequence. Additionally, the target and sensors 1104 over the predicted sequence are predicted over the future horizon.

In the example illustrated in FIG. 11, the defined future window for optimization includes K values: targets $\hat{y}_{t+1}$ to $\hat{y}_{t+K}$, sensors $\hat{x}_{t+1}$ to $\hat{x}_{t+K}$, conditions $c_t$ to $c_{t+K-1}$, and actions $a_t$ to $a_{t+K-1}$. For example, to predict inventory levels over two-month horizon, weekly states are predicted that means a K value of 8.

During the past sequence 1102, the outputs are known, so it is possible to update priors to posteriors. However, during the future sequence 1104, the outputs are unknown, so the model keeps evolving the priors $\hat{x}$ and $\hat{y}$.

The optimal policy is identified for the process and the DP model is trained for this policy. Then, at every step of the future horizon, the actions are predicted, and a scenario is developed that identifies the future actions in the future conditions to show the final outcome. This final outcome may be adjusted by the user if the final outcome does not meet the desired goals, such as by sending inventory ahead of schedule to a distribution center in order to better meet forecasted demand and avoid loss of sales.

The evidence lower bound (ELBO), also referred to as variational lower bound, is the difference between the distribution of a latent variable and the distribution of the respective observed variable. ELBO is calculated over the input sequences and to learn the different NN parameters $\theta_o$, $\theta_z$, and $\phi_z$, the evidence lower bound (ELBO) over all input sequences is considered as follows:

$$\log \prod_{t=1}^{T} p(o_t \mid o_{<t}, a_{0:t-1}, c_{0:t-1}) =$$

$$\sum_{t=1}^{T} \log \int p(o_t \mid z_t, h_{t-1}) p(z_t \mid z_{t-1}^{post}, h_{t-1}, a_{t-1}, c_{t-1}) dz_t =$$

$$\sum_{t=1}^{T} \log E_{p(z_t \mid z_{t-1}^{post}, h_{t-1}, a_{t-1}, c_{t-1})}[p(o_t \mid z_t, h_{t-1})] = \sum_{t=1}^{T} \log$$

$$E_{q(z_t \mid z_{t-1}^{post}, h_{t-1}, a_{t-1}, c_{t-1}, o_t)} \left[ p(o_t \mid z_t, h_{t-1}) \frac{p(z_t \mid z_{t-1}^{post}, h_{t-1}, a_{t-1}, c_{t-1})}{q(z_t \mid z_{t-1}^{post}, h_{t-1}, a_{t-1}, c_{t-1}, o_t)} \right] \geq$$

$$\sum_{t=1}^{T} E_{q(z_t \mid z_{t-1}^{post}, h_{t-1}, a_{t-1}, c_{t-1}, o_t)} \left[ \log \left( p(o_t \mid z_t, h_{t-1}) \frac{p(z_t \mid z_{t-1}^{post}, h_{t-1}, a_{t-1}, c_{t-1})}{q(z_t \mid z_{t-1}^{post}, h_{t-1}, a_{t-1}, c_{t-1}, o_t)} \right) \right] = \sum_{t=1}^{T} [E_{q_{\phi_z}(z_t)}[\log p_{\theta_o}(o_t \mid z_t, h_{t-1})] -$$

$$KL(q_{\phi_z}(z_t \mid z_{t-1}^{post}, h_{t-1}, a_{t-1}, c_{t-1}, o_t) \| p_{\theta_z}(z_t \mid z_{t-1}^{post}, h_{t-1}, a_{t-1}, c_{t-1}))]$$

The last equation is defined as ELBO, and $q_{\phi_z}(z_t)$ is defined as:

$q_{\phi_z}(z_t) \equiv q_{\phi_z}(z_t \mid z_{t-1}^{post}, h_{t-1}, a_{t-1}, c_{t-1}, o_t)$ where $z_t^{post} \sim q_{\phi_z}(z_t)$.

Further, $q_{\phi_z}(z_t)$ is approximated as $q_{\phi_z}(z_t) \approx q_{\phi_z}(z_t \mid z_t^{prior}, h_t, \hat{o}_t, o_t)$, where $z_t^{prior} \sim p_{\theta_z}(z_t \mid z_{t-1}^{post}, h_{t-1}, a_{t-1}, c_{t-1})$.

To better make predictions, the best models of prediction are estimated, the prior and the posterior. In predictions over the predicted sequence 904, T+1 to T+J (J is the window size), the sequential prior and posterior distributions of the latent states over timesteps are calculated, and $z_t^{prior}$, $z_t^{post}$, $\hat{z}_t^{prior}$ and $\hat{z}_t^{post}$ are defined as follows:

$z_t^{prior} \sim p_{\theta_z}(z_t) \equiv p_{\theta_z}(z_t \mid z_{t-1}^{post}, h_{t-1}, a_{t-1}, c_{t-1}) = \mathcal{N}(z_t; \mu_t^{prior}, \sigma_t^{prior})$, where $[\mu_t^{prior}, \log \sigma_t^{prior}] = NN(z_{t-1}^{post}, h_{t-1}, a_{t-1}, c_{t-1})$ $z_t^{post} \sim q_{\phi_z}(z_t) \equiv q_{\phi_z}(z_t \mid z_t^{prior}, h_t, \hat{o}_t - o_t, o_t) = \mathcal{N}(z_t; \mu_t^{post}, \sigma_t^{post})$, where $[\mu_t^{post}, \log \sigma_t^{post}] = NN(z_t^{prior}, h_t, \hat{o}_t - o_t, o_t)$ $\hat{z}_t^{prior} \sim \hat{p}_{\theta_z}(z_t) \equiv \hat{p}_{\theta_z}(z_t \mid \hat{z}_{t-1}^{post}, \hat{h}_{t-1}, c_{t-1}, a_{t-1}) = \mathcal{N}(z_t; \hat{\mu}_t^{prior}, \hat{\sigma}_t^{prior})$, where $[\hat{\mu}_t^{prior}, \log \hat{\sigma}_t^{prior}] = NN(\hat{z}_{t-1}^{post}, \hat{h}_{t-1}, c_{t-1}, a_{t-1})$ $\hat{z}_t^{post} \sim \hat{q}_{\phi_z}(z_t) \equiv \hat{q}_{\phi_z}(z_t \mid \hat{z}_t^{prior}, \hat{h}_t, 0, \hat{o}_t) = \mathcal{N}(z_t; \hat{\mu}_t^{post}, \hat{\sigma}_t^{post})$, where $[\hat{\mu}_t^{post}, \log \hat{\sigma}_t^{post}] = NN(\hat{z}_t^{prior}, \hat{h}_t, 0, \hat{o}_t)$, where 0 is the zero vector of output size.

Further, $p_{\theta_z}(z_t)$ is modeled by $\mathcal{N}$, a Gaussian distribution, and $\mu_t^{prior}, \sigma_t^{prior}$ are the mean and the standard deviation. It is noted that $z_t$ is based on $z_{t-1}^{post}, h_{t-1}, a_{t-1}, c_{t-1}$. Also, $NN(z_{t-1}^{post}, h_{t-1}, c_{t-1}, c_{t-1})$ is a neural network that uses the listed parameters. The mean and the standard deviation are modeled by the neural network.

Further, the deterministic states h are defined as follows:

$h_{t-1} = f(h_{t-2}, a_{t-2}, c_{t-2}, o_{t-1})$, $h_t = f(h_{t-1}, a_{t-1}, c_{t-1}, o_t)$, $\hat{h}_{t-1} = f(\hat{h}_{t-2}, a_{t-2}, c_{t-2}, \hat{o}_{t-1})$, and $\hat{h}_t = f(\hat{h}_{t-1}, a_{t-1}, c_{t-1}, \hat{o}_t)$.

It is noted that $\hat{z}_t^{prior}$ and $\hat{z}_t^{post}$ (and also, $\hat{h}_t$ and $\hat{h}_{t-1}$) do not rely on true historical observations but on predicted observations from the previous steps. Since $\hat{z}_t^{prior}$, which doesn't rely on true historical observations, will be eventually used for predictions in testing given any unseen input sequence, the prior model of $\hat{z}_t^{prior} \sim \hat{p}_{\theta_z}(z_t)$ is constrained close to the posterior model of $z_t^{post} \sim q_{\phi_z}(z_t)$ in terms of KL divergence over the T+1:T+J horizon.

The likelihood function to be maximized is as follows:

$$\log \prod_{t=T+1}^{T+J} p(o_t \mid o_{1:T}, \hat{o}_{<t}, a_{<t}, c_{<t}) =$$

$$\sum_{t=T+1}^{T+J} \log \int p(o_t \mid z_t, \hat{h}_{t-1}) p(z_t \mid \hat{z}_{t-1}^{post}, \hat{h}_{t-1}, a_{t-1}, c_{t-1}) dz_t =$$

$$\sum_{t=T+1}^{T+J} \log E_{p(z_t \mid \hat{z}_{t-1}^{post}, \hat{h}_{t-1}, a_{t-1}, c_{t-1})}[p(o_t \mid z_t, \hat{h}_{t-1})] = \sum_{t=T+1}^{T+J} \log$$

$$E_{q(z_t \mid \hat{z}_{t-1}^{post}, \hat{h}_{t-1}, a_{t-1}, c_{t-1}, \hat{o}_t)} \left[ p(o_t \mid z_t, \hat{h}_{t-1}) \frac{p(z_t \mid \hat{z}_{t-1}^{post}, \hat{h}_{t-1}, a_{t-1}, c_{t-1})}{q(z_t \mid \hat{z}_{t-1}^{post}, \hat{h}_{t-1}, a_{t-1}, c_{t-1}, \hat{o}_t)} \right] =$$

$$\sum_{t=T+1}^{T+J} \log E_{\hat{q}_{\phi_z}(z_t)} \left[ p_{\theta_o}(o_t \mid z_t, \hat{h}_{t-1}) \frac{\hat{p}_{\theta_z}(z_t)}{q_{\phi_z}(z_t)} \frac{q_{\phi_z}(z_t)}{\hat{q}_{\phi_z}(z_t)} \right] \geq$$

$$\sum_{t=T+1}^{T+J} E_{\hat{q}_{\phi_z}(z_t)} \left[ \log \left( p_{\theta_o}(o_t \mid z_t, \hat{h}_{t-1}) \frac{\hat{p}_{\theta_z}(z_t)}{q_{\phi_z}(z_t)} \frac{q_{\phi_z}(z_t)}{\hat{q}_{\phi_z}(z_t)} \right) \right] =$$

$$\sum_{t=T+1}^{T+J} \left[ E_{\hat{q}_{\phi_z}(z_t)}[\log p_{\theta_o}(o_t \mid z_t, \hat{h}_{t-1})] + E_{\hat{q}_{\phi_z}(z_t)}\left[\log\left(\frac{\hat{p}_{\theta_z}(z_t)}{q_{\phi_z}(z_t)}\right)\right] \right] -$$

$$KL(\hat{q}_{\phi_z}(z_t) \| q_{\phi_z}(z_t)) = \sum_{t=T+1}^{T+J} \left[ E_{\hat{q}_{\phi_z}(z_t)}[\log p_{\theta_o}(o_t \mid z_t, \hat{h}_{t-1})] +$$

$$E_{q_{\phi_z}(z_t)}\left[\frac{\hat{q}_{\phi_z}(z_t)}{q_{\phi_z}(z_t)} \log\left(\frac{\hat{p}_{\theta_z}(z_t)}{q_{\phi_z}(z_t)}\right)\right] - KL(\hat{q}_{\phi_z}(z_t) \| q_{\phi_z}(z_t)) \approx$$

$$\sum_{t=T+1}^{T+J} \left[ E_{\hat{q}_{\phi_z}(z_t)}[\log p_{\theta_o}(o_t \mid z_t, \hat{h}_{t-1})] + E_{q_{\phi_z}(z_t)}\left[\log\left(\frac{\hat{p}_{\theta_z}(z_t)}{q_{\phi_z}(z_t)}\right)\right] -$$

$$KL(\hat{q}_{\phi_z}(z_t) \| q_{\phi_z}(z_t)) \right] \left(\text{assuming } \frac{\hat{q}_{\phi_z}(z_t)}{q_{\phi_z}(z_t)} \approx 1\right) = \sum_{t=T+1}^{T+J} \Big[$$

$$E_{\hat{q}_{\phi_z}(z_t)}[\log p_{\theta_o}(o_t \mid z_t, \hat{h}_{t-1})] - KL(q_{\phi_z}(z_t) \| \hat{p}_{\phi_z}(z_t)) - KL(\hat{q}_{\phi_z}(z_t) \| q_{\phi_z}(z_t)) \Big]$$

The $\theta_o$, $\phi_z$ and $\theta_z$ parameters are the parameters of the neural network. The prediction is for the complete predicted sequence and that is why there is a multiplication of all the outputs in the predicted sequence in order to maximize the function. The last equation is defined as ELBO related to output predicted sequences. It is desired to maximize the likelihood to predict $o_t$. The neural network is used to maximize the values of the similarity function.

As more states are predicted, prediction errors are accumulated. In some example embodiments, to reduce the amount of accumulated error, the three models are used:

$$E_{\hat{q}_{\phi_z(z_t)}}[\log p_{\theta_o}(o_t \mid z_t, \hat{h}_{t-1})],$$

$$-KL(q_{\phi_z}(z_t) \parallel \hat{p}_{\theta_z}(z_t)), \text{ and } -KL(\hat{q}_{\phi_z}(z_t) \parallel q_{\phi_z}(z_t)).$$

Kullback-Leibler (KL) divergence is a similarity measure. The mathematical scheme aims at making the predicted prior and posterior distributions be very similar to the true posterior distribution.

The first KL term, $KL(q_{\phi_z}(z_t) \parallel \hat{p}_{\theta_z}(z_t))$ makes the difference between the true posterior distribution q (relying on the true outputs) and the predicted prior distribution p (relying on no true outputs) be as small as possible to minimize the error.

The second KL term, $KL(q_{\phi_z}(z_t) \parallel \hat{q}_{\phi_z}(z_t))$ term makes the difference between the true posterior distribution q (relying on the true outputs) and the predicted posterior distribution $\hat{q}$ (relying on predicted outputs but on no true outputs) be as small as possible to minimize the error.

It is often difficult to make stable multistep-ahead predictions since predicted errors are accumulated or propagated over the predicted timesteps. The two KL terms help the DPDM stably represent the latent states over multistep predicted sequence. That is, since the predicted prior $\hat{p}$ and predicted posterior $\hat{q}$ are eventually used for predicting outputs over the predicted timesteps in model testing, the predicted prior and posterior distributions are trained to be very similar to the true posterior of those in terms of the Kullback-Leibler (KL) divergence over the predicted timesteps during the model training.

It is noted that for any two gaussian distributions q(z) and p(z), $$KL(q \parallel p) = -\int q(z) \log p(z) dz + \int q(z) \log q(z) dz$$

$$= \frac{1}{2} \log(2\pi\sigma_p^2) + \frac{\sigma_q^2 + (\mu_q - \mu_p)^2}{2\sigma_p^2} - \frac{1}{2}(1 + \log 2\pi\sigma_q^2)$$

$$= \log \frac{\sigma_p}{\sigma_q} + \frac{\sigma_q^2 + (\mu_q - \mu_p)^2}{2\sigma_p^2} - \frac{1}{2}$$

To learn the different NN parameters $\theta_o$, $\theta_z$, and $\phi_z$, the evidence lower bound (ELBO) sum over all input sequences and predicted output sequences is maximized. In some example embodiments, the stochastic gradient decent (SGD) technique is used to optimize the NNs.

Figure 12:
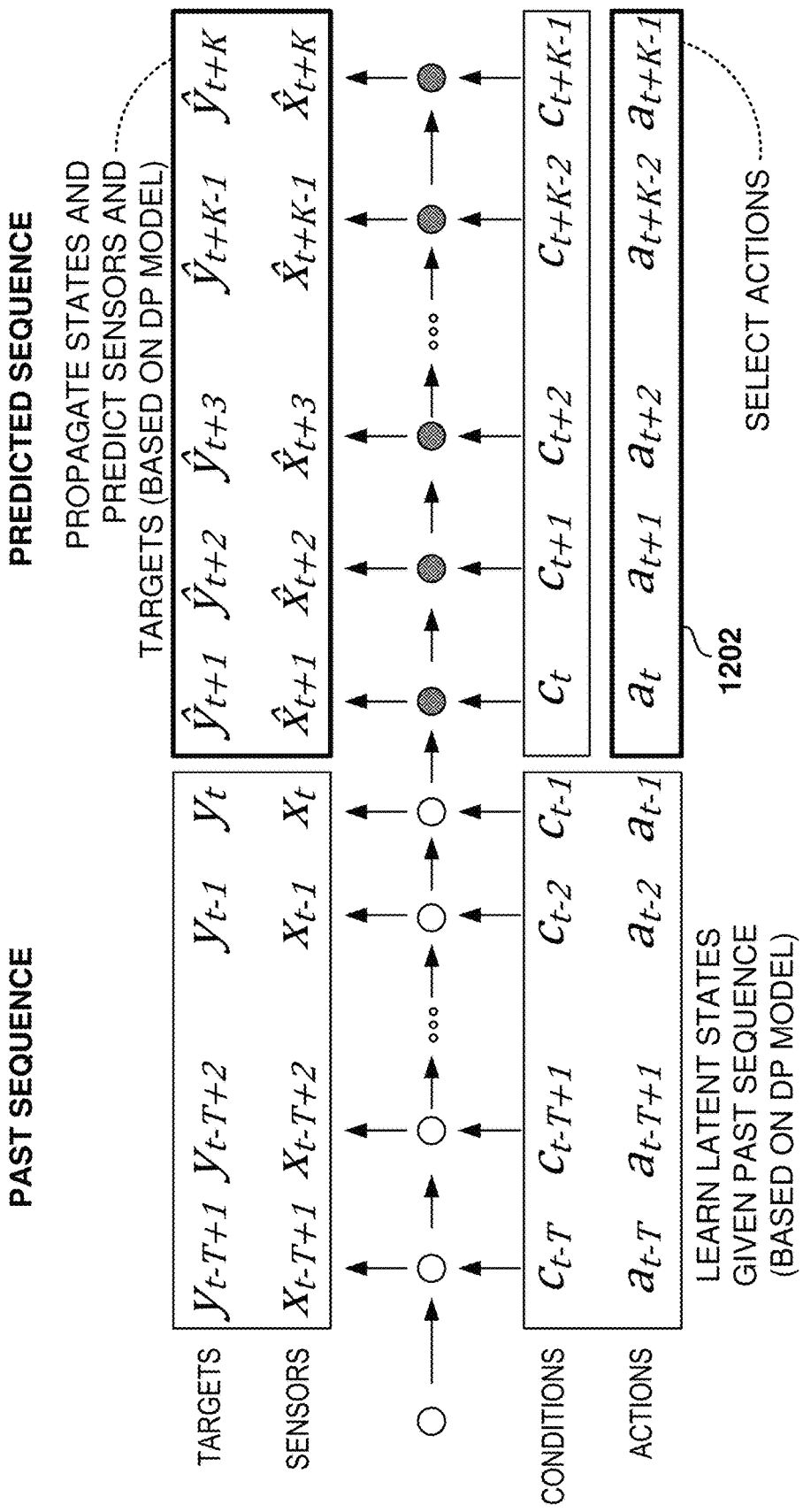
FIG. 12 illustrates the decision machines (DM) controller that optimizes the predicted targets by selecting the best actions given future conditions, relying on the trained DP process model, according to some example embodiments.

FIG. 12 illustrates the propagation of states based on the selected actions, according to some example embodiments. The DM controller is trained to select actions 1202 that optimize the KPIs associated with the targets.

With model-based reinforcement learning, the agent's actions $a_t$ rely on the dual-process posterior state $s_t^{post} = (z_t^{post}, h_t)$ and conditions $c_t$: $a_t \sim p(a_t \mid z_t^{post}, h_t, c_t)$.

There is a distinction between the descriptive action policy inferred from the observed actions in the historical data available for model training and the optimal action policy to maximize the defined KPIs. An RL approach using the process simulation model can make the optimal action policy to maximize a given long-term utility goal:

$$a^*_t \sim p_{\theta_{a^*}}(a_t \mid \hat{z}_t^{post}, \hat{h}_t, c_t) = \mathcal{N}(a_t; \mu_t^{a*}, \sigma_t^{a*}), \text{ where}$$

$$[\mu_t^{a*}, \log \sigma_t^{a*}] = NN_{\theta_{a^*}}(\hat{z}_t^{post}, \hat{h}_t, c_t).$$

Assuming that the utility function r is given as a function of the predicted target $\hat{y}_t$ in $\hat{o}_t = (\hat{x}_t, \hat{y}_t)$, the NN parameters $\theta_{a*}$, are learned by maximizing the cumulative utility $R = \sum_{t=T+1}^{T+J} r(\hat{y}_t)$. The algorithm below describes how to sample $r(\hat{y}_t)$ from performing $a^*_t \sim p_{\theta_{a^*}}(a_t \mid \hat{z}_t^{post}, \hat{h}_t, c_t)$ over the predicted timesteps.

For example, in a product quality control application whose goal is to make the produced dimensions precisely the same as the aimed dimensions, $\hat{y}_t$ would be the vector of the predicted dimension errors, that is, the differences between the predicted produced dimensions and the aimed dimensions. Further, $r(\hat{y}_t)$ would be the scalar reward or utility function defined over the vector, e.g., a weighted linear combination of components in $\hat{y}_t$. In an energy consumption control application, where the electricity cost depends on the monthly peak usage of any 15-minute cumulative consumed energy, $\hat{y}_t$ could be the predicted value of the cumulative consumed energy from the last 15 minutes before the lime t.

Given $\theta_0$, $\theta_z$, and $\phi_z$ (learned model parameters), $\hat{h}_T = h_T$, $\hat{z}_T^{post}$ (from the last iteration on the input sequence), $a^*_T = a_T$, $c_{T:T+J}$, a positive discount factor $\gamma(\leq 1)$, and a utility function r, for t=T+1 to T+J, the following equations are defined:

$$\hat{z}_t^{prior} \sim \hat{p}_{\theta_z}(z_t) = \mathcal{N}(z_t; \hat{\mu}_t^{prior}, \hat{\sigma}_t^{prior}), \text{ where}$$

$$[\hat{\mu}_t^{prior}, \log \hat{\sigma}_t^{prior}] = NN(\hat{z}_{t-1}^{post}, \hat{h}_{t-1}, c_{t-1}, a_{t-1}).$$

$$\hat{o}_t = (\hat{x}_t, \hat{y}_t) \sim p_{\theta_o}(o_t \mid \hat{z}_t^{prior}, \hat{h}_{t-1}) = \mathcal{N}(o_t; \mu_t^{obs}, \sigma_t^{obs}),$$
$$\text{where } [\mu_t^{obs}, \log \sigma_t^{obs}] = NN(\hat{z}_t^{prior}, \hat{h}_{t-1}).$$

$$r_t = r(\hat{y}_t).$$

$$\hat{h}_t = f(\hat{h}_{t-1}, a^*_{t-1}, c_{t-1}, \hat{o}_t).$$

$$\hat{z}_t^{post} \sim \hat{q}_{\phi_z}(z_t) = \mathcal{N}(z_t; \hat{\mu}_t^{post}, \hat{\sigma}_t^{post}) \text{ where } [\hat{\mu}_t^{post}, \log \hat{\sigma}_t^{post}] = NN(\hat{z}_t^{prior}, \hat{h}_t, 0, \hat{o}_t), \text{ where 0 is the zero vector of the size of outputs}$$

The predicted posterior-based measurement prediction is $$\hat{o}_t \sim p_{\theta_o}(o_t \mid \hat{z}_t^{post}, \hat{h}_{t-1}) = \mathcal{N}(o_t; \mu_t^{obs}, \log \sigma_t^{obs}),$$

where $[\mu_t^{obs}, \sigma_t^{obs}] = NN(\hat{z}_t^{post}, \hat{h}_{t-1})$

The simulated actions are:

$$a^*_t \sim p_{\theta_{a^*}}(a_t \mid \hat{z}_t^{post}, \hat{h}_t, c_t) = \mathcal{N}(a_t; \mu_t^{a*}, \sigma_t^{a*}),$$

where $[\mu_t^{a*}, \log \sigma_t^{a*}] = NN_{\theta_{a^*}}(\hat{z}_t^{post}, \hat{h}_t, c_t).$ Then, the total cumulative utility (temporally discounted) is $$R = \sum_{t=T+1}^{T+J} \gamma^{t-T} r_t.$$

The Monte-Carlo simulations can generate many sampled R values.

In model-predictive control (MPC) the locally best action at current timestep can be obtained from the averaged action leading to higher values of R. In reinforcement learning the averaged R can be used to optimize the policy parameters $\theta_{a*}$ via the stochastic gradient ascent.

It is also possible to include any explicitly known form of equations (e.g., physics-driven equations) mapping action and condition inputs to observations. If the equation parameters are unknown, the parameters are factored as latent variables to be inferred. This is expressed as follows:

$$\hat{o}_t = (\hat{x}_t, \hat{y}_t) \sim p_{\theta_0}(o_t \mid \hat{z}_{t-1}^{post}, \hat{h}_{t-1}, c_{t-1}, a^*_{t-1}) = \mathcal{N}(o_t; \mu_t^{obs}, \sigma_t^{obs}) \text{ where } [\mu_t^{obs}, \log \sigma_t^{obs}] = NN(\hat{z}_{t-1}^{post}, \hat{h}_{t-1}) + f_{\theta_{f(c^{t-1}, a^*_{t-1})}}.$$

Here, $f_{\theta_{f_t}}$ is a known form of equation with exact or unknown parameter values of fly. For example, when the exact physics-driven equation of a battery charging/discharging operation is known, the knowledge is incorporated into the simulation of predicted observations.

Further, when using feature-level probabilistic latent attention in the DP model, it is assumed that any categoric features from actions, conditions, measurements are appropriately NN-embedded or encoded (one-hot encoding or position encoding) at first.

Before updating from $h_{t-1}$ to $h_t$ at each timestep t in the RNN (LSTM or GRU), the method calculates the probabilistic distributions of feature attentions $\beta_t \in \mathbb{R}^K$ whose sampled values are used for weighting the variables in the experience vector $(c_{t-1}, a_{t-1}, o_t) \in \mathbb{R}^K$, where K is the total number of variables of the experience vector. The prior distribution of the feature attentions is described in a Gaussian with a diagonal covariance matrix whose mean is parameterized by a multi-layer neural network that depends on $h_{t-1}$ and the variance is a constant parameter. Then, $\beta_t^{prior} \sim p_{\theta_\beta}(\beta_t | h_{t-1}) = \mathcal{N}(\beta_t; \mu_t^{beta,p}, \sigma_0^{beta,p})$, where $\mu_t^{beta,p} = NN(h_{t-1})$ and $\sigma_0^{beta,p}$ is a constant parameter.

The posterior distribution of the feature attentions is also described in a Gaussian with a diagonal covariance matrix whose mean and variance are parameterized by a multi-layer neural network that depend not only on $h_{t-1}$ but also on the given experience tuple $(c_{t-1}, a_{t-1}, o_t)$:

$$\beta_t^{post} \sim q_{\phi_\beta}(\beta_t | h_{t-1}, c_{t-1}, a_{t-1}, o_t) = \mathcal{N}(\beta_t; \mu_t^{beta,q}, \sigma_t^{beta,q}),$$
$$\text{where } [\mu_t^{beta,q}, \log \sigma_t^{beta,q}] = NN(h_{t-1}, c_{t-1}, a_{t-1}, o_t).$$

With feature-level probabilistic latent attention, ELBO is calculated as follows:

$$ELBO = \sum_{t=1}^{T} \left[ E_{q_{\phi_z}(z_t)}[\log p_{\theta_o}(o_t | z_t, h_{t-1})] - \right.$$
$$KL(q_{\phi_z}(z_t | z_{t-1}^{post}, h_{t-1}, a_{t-1}, c_{t-1}, o_t) \| p_{\theta_z}(z_t | z_{t-1}^{post}, h_{t-1}, a_{t-1}, c_{t-1})) -$$
$$KL(q_{\phi_\beta}(\beta_t | h_{t-1}, a_{t-1}, c_{t-1}, o_t) \| p_{\theta_\beta}(\beta_t | h_{t-1}))] =$$
$$\sum_{t=1}^{T} [E_{q_{\phi_z}(z_t)}[\log p_{\theta_o}(o_t | z_t, h_{t-1}) + \log p_{\theta_z}(z_t | z_{t-1}^{post}, h_{t-1}, a_{t-1}, c_{t-1}) -$$
$$\log q_{\phi_z}(z_t | z_{t-1}^{post}, h_{t-1}, a_{t-1}, c_{t-1}, o_t) +$$
$$\log p_{\theta_\beta}(\beta_t | h_{t-1}) - \log q_{\phi_\beta}(\beta_t | h_{t-1}, a_{t-1}, c_{t-1}, o_t)]]$$

Here, $h_{t-1} = f(h_{t-2}, \beta_{t-1}^{prior} \circ (c_{t-2}, a_{t-2}, o_{t-2}))$ where $\circ$ denotes the element-wise vector multiplication.

In output predicted sequences, ELBO is calculated as:

$$ELBO = \sum_{t=T+1}^{T+J} [E_{\hat{q}_{\phi_z}(z_t)}[\log p_{\theta_o}(o_t | z_t, \hat{h}_{t-1})] -$$
$$KL(q_{\phi_z}(z_t) \| \hat{p}_{\theta_z}(z_t)) - KL(\hat{q}_{\phi_z}(z_t) \| q_{\phi_z}(z_t)) -$$
$$KL(q_{\phi_\beta}(\beta_t | h_{t-1}, c_{t-1}, a_{t-1}, o_t) \| \hat{p}_{\theta_\beta}(\beta_t | \hat{h}_{t-1})) -$$
$$KL(\hat{q}_{\phi_\beta}(\beta_t | \hat{h}_{t-1}, c_{t-1}, a_{t-1}, \hat{o}_t) \| q_{\phi_\beta}(\beta_t | h_{t-1}, c_{t-1}, a_{t-1}, o_t))]$$

Here, $h_{t-1} = f(h_{t-2}, \beta_{t-1}^{prior} \circ (c_{t-2}, a_{t-2}, o_{t-2}))$, and $\hat{h}_{t-1} = f(h_{t-2}, \hat{\beta}_{t-1}^{prior} \circ (c_{t-2}, a_{t-2}, \hat{o}_{t-2}))$.

Alternatively when using the deterministic feature-level attention, the feature attentions $\beta_t$ are parameterized by a multi-layer neural network that depend not only on $h_{t-1}$ but on the given experience vector $(c_{t-1}, a_{t-1}, o_t)$. That is, $\mu_t = NN(h_{t-1}, c_{t-1}, a_{t-1}, o_t)$ and $h_t = f(h_{t-1}, \beta_t \circ (c_{t-1}, a_{t-1}, o_t))$, where $\circ$ denotes the element-wise vector multiplication.

Figure 13:
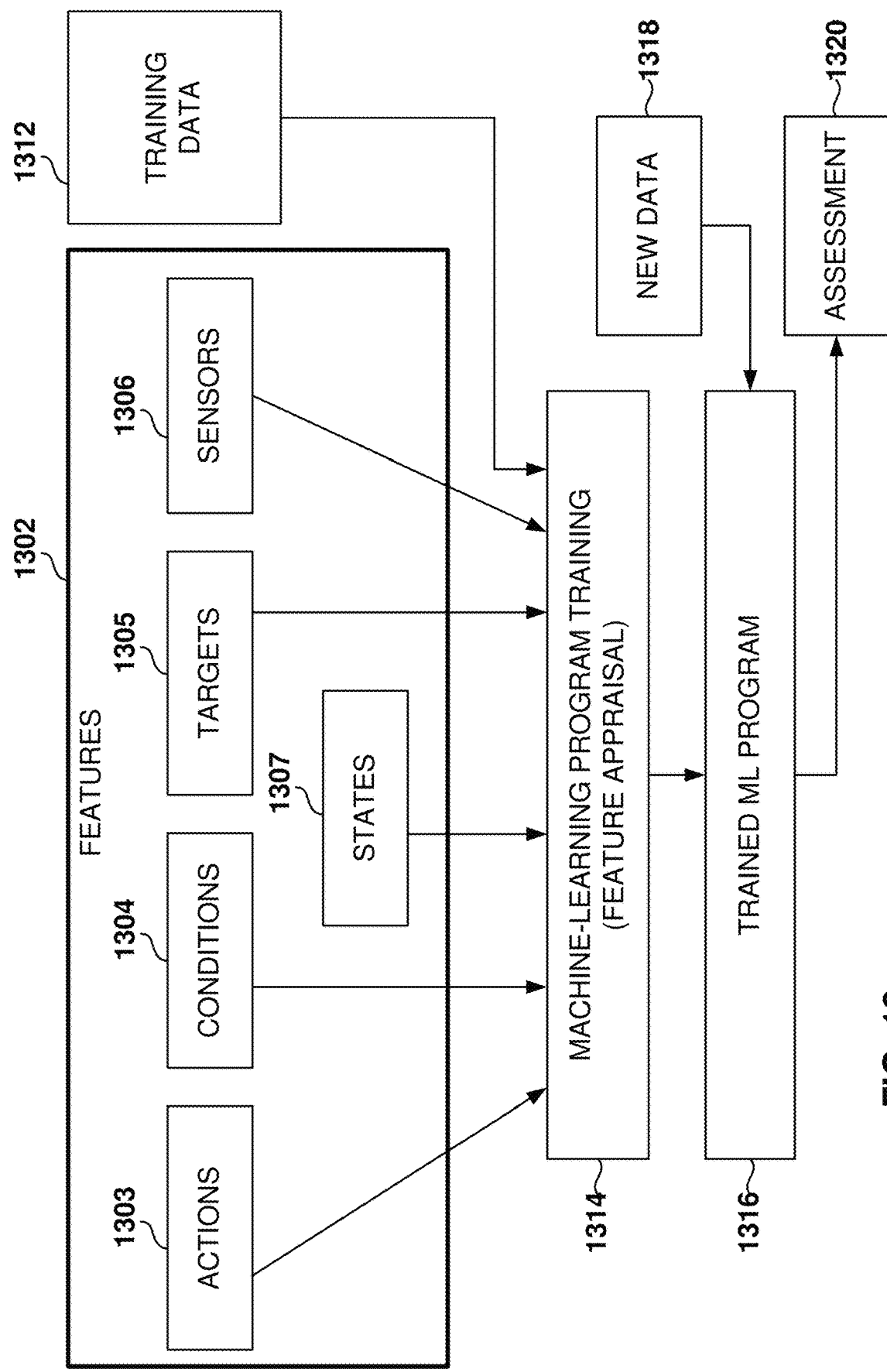
FIG. 13 illustrates the training and use of a machine-learning program, according to some example embodiments.

FIG. 13 illustrates the training and use of a machine-learning program, according to some example embodiments. In some example embodiments, machine-learning programs (MLPs), also referred to as machine-learning algorithms or models, are utilized to perform operations associated predictions, such as predicting an action.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 1312 in order to make data-driven predictions or decisions expressed as outputs or assessments 1320. Although example embodiments are presented with respect to a few machine-learning tools, the principles presented herein may be applied to other machine-learning tools.

In some example embodiments, different machine-learning tools may be used. For example. Logistic Regression (LR), Naive-Bayes, Random Forest (RF), gradient boosted trees, gradient boosting machines, neural networks (NN), matrix factorization, and Support Vector Machines (SVM) tools may be used for predictions and decision making.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). The machine-learning algorithms utilize the training data 1312 to find correlations among identified features 1302 that affect the outcome.

The machine-learning algorithms utilize features 1302 for analyzing the data to generate assessments 1320. A feature 1302 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 1302 may be of different types and may include one or more of actions 1303, conditions 1304, targets 1305, sensors 1306, and states 1307.

The machine-learning algorithms utilize the training data 1312 to find correlations among the identified features 1302 that affect the outcome or assessment 1320. In some example embodiments, the training data 1312 includes labeled data, which is known data for one or more identified features 1302 and their corresponding one or more outcomes, such as chosen actions in the past.

With the training data 1312 and the identified features 1302, the machine-learning tool is trained at operation 1314. The machine-learning tool appraises the value of the features 1302 as they correlate to the outcomes in the training data 1312. The result of the training is the trained machine-learning program 1316.

When the machine-learning program 1316 is used to perform an assessment, new data 1318 is provided as an input to the trained machine-learning program 1316, and the machine-learning program 1316 generates the assessment 1320 as output. For example, when a new production schedule is received, the durations of the different phases of each heat are calculated.

In some example embodiments, the features are represented as vectors that may comprise information from a plurality of items, such as a plurality of sensors or a plurality of targets. In some example embodiments, a compression algorithm is utilized to compress the data into vectors of smaller dimensions that may be used by the machine-learning models.

In DPDM, during the training, both past input sequences and predicted output sequences are appraised with the goal of taking historical information (e.g., past actions and conditions) to predict future events based on the historical information.

In summary, it is presented a data-driven and knowledge-augmented deep-probabilistic predictive simulation model of dynamic processes for decision making and control in a model-based RL/MPC framework. This generalizable solution framework for deep probabilistic decision-making AI is based on the concepts of actions, conditions, sensors, and targets for modeling actionable and hierarchical systems. Dynamic probabilistic and deterministic latent states compress experiences and obtain key sensory features for predictable and interpretable models. The predictive model can be used for simulating the likely future observation sequence for any given future (or counterfactual) condition and action sequence at a process state. This also enables model-based decision making and control.

FIG. 14 is a table showing DPDM's parameters used for several use cases. Table 1402 includes three columns for three sample use cases: product quality control, energy consumption management, and demand and inventory prediction and supply planning.

Each column shows some of the actions, conditions, sensors, and targets for the different use cases. It can be observed that, in some cases, actions may correspond with some of the sensors, such as the RPM setpoints for product quality are measured by one of the sensors. However, in other cases the sensors do not necessarily match the actions. For example, in energy consumption control, the sensors measure elapsed times between manufacturing events, but actions correspond to times when the batteries are discharged or recharging. More details are provided below for these and other use cases.

FIGS. 15-24 illustrate a use case for dimensional quality control, according to some example embodiments. The objective for dimensional quality control is to build a framework that enhances quality control over physical dimensions of extruded pans (e.g., rubber) and improves production yield in a dynamic process by enabling generative simulations and real-time optimal decisions and controls.

One of the most common problems in a production line is production waste, which is generated during the manufacturing process when a product's physical dimensions (e.g., x, y, and z plane measurements) do not meet the product's specifications. This waste becomes even more significant, from both the producer and ecological points of view, if we consider that the scrapped product oftentimes can neither be reused, recycled nor resold. Therefore, optimizing dimensional quality control on rubber products adds value, both financially and environmentally.

The technical problem to solve is to allow optimal decision-making and controls over time with the objective of enhancing quality control over physical dimensions of extruded parts (e.g., rubber). This is a highly complex problem to solve as it is a dynamic process that involves a complex system with multiple intercorrelated features. Multiple processes have causal interactions represented as a set of dynamic stochastic variables such as actions, conditions, sensor observations, and target observations. We apply the DPDM framework to the dynamic process modeling and control.

For example, the process may involve actions like controlling RPM setpoints for rotating machines and temperature setpoints for heating equipment over time. Also, the process may occur in various conditions, e.g., static conditions such as different line locations and batch types, as well as other dynamic conditions like scheduled crew sequence, aimed dimensions of products changing over batches, and date of process runs. Sensor measurements or observations related to the observed process state (e.g., actual measured RPMs, temperature changing over time) may also be informative. In addition, there may be target measurements or observations related to the process performance or KPIs such as the actually produced dimensions of products.

There may be other ways to try to solve this problem, such as: i) manually change the actions that control the dimensions of the product by using heuristics; ii) conduct multiple experiments by a rule-based controller; iii) build a simulation model and separately design a control system using a different programming environment. These options do not allow an automatic workflow for controller design applicable to different conditions, so they are not scalable, they are hard to expand across different products and plants within the same company, and they do not allow to iteratively improve the controller using enterprise AI.

Moreover, there are technical and business advantages of the proposed methodology over existing methods:

Our simulation model has better performance;

It can deal with high dimensionality;

It is possible to include as many actions, conditions, sensor, and target features as there are available;

Our controller can build the condition, state and outcome-based Reinforcement Learning controller;

Our simulation model and controller live in the same environment;

Our methodology internally simulates and gives an optimal controller for different conditions, so it is not required to perform expensive A/B testing experiments that require human-in-the-loop tuning;

Easy to retrain without human involvement;

Gets better as additional data becomes available;

Automatic workflow for the controller applies to all the different conditions; and The optimal action controller can be designed to maximize the given KPI's, relying on the predicted experiences of sensors and target observations for different actions over the future time horizons.

Using other methodologies to build the controller may only consider dimensional error as feedback for the controller, disregarding completely the state of the process, interactions between all the different features, temporal and spatial causality, etc.

The following table shows, according to some example embodiments, the components that comprise the rubber extrusion process.

TABLE 1

| Stage | Type | Components | Sensors and Actions | Conditions |
|---|---|---|---|---|
| Rubber skid | Physical | Rubber batch | | Rubber molecular properties |
| Extruder | Mass flow | Extruders Die head Die exit | RPM Temperature Pressure | Rubber age Room temperature |
| Oven | Heat transfer | Microwave oven Hot air oven | Power Air temperature Surface temperature Conveyor temperature Air velocity Fan speed Speed | Room humidity Line locations Scheduled crew Aimed dimensions Product/Profile Date |
| Puller | Mechanical | Cooler Pullers | Speed Load Torque | |
| Quality (optional) | Physical | Flocking Hot air oven Pullers | Speed Load Torque | |
| Cutter | Physical | Cutter | | |

Figure 15:
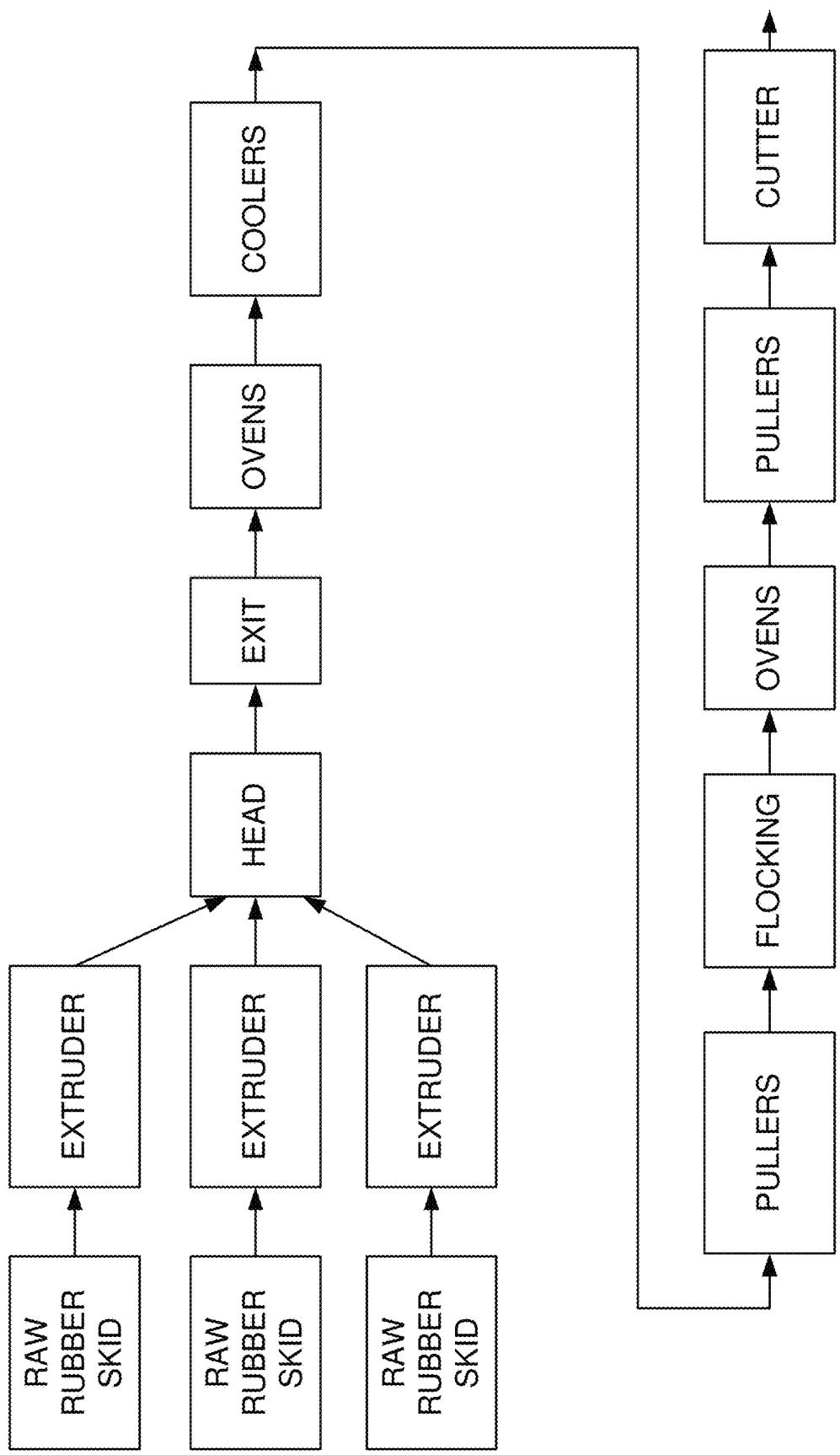

FIG. 15 illustrates the rubber extrusion process, according to some example embodiments. The product profile is measured along different locations of the process and those measurements are used as target features that the model will use as process performance metrics or KPIs to be optimized. This application focuses on training a model that can simulate the plant state and KPI measurements given the set of future action and conditions.

Figure 16:
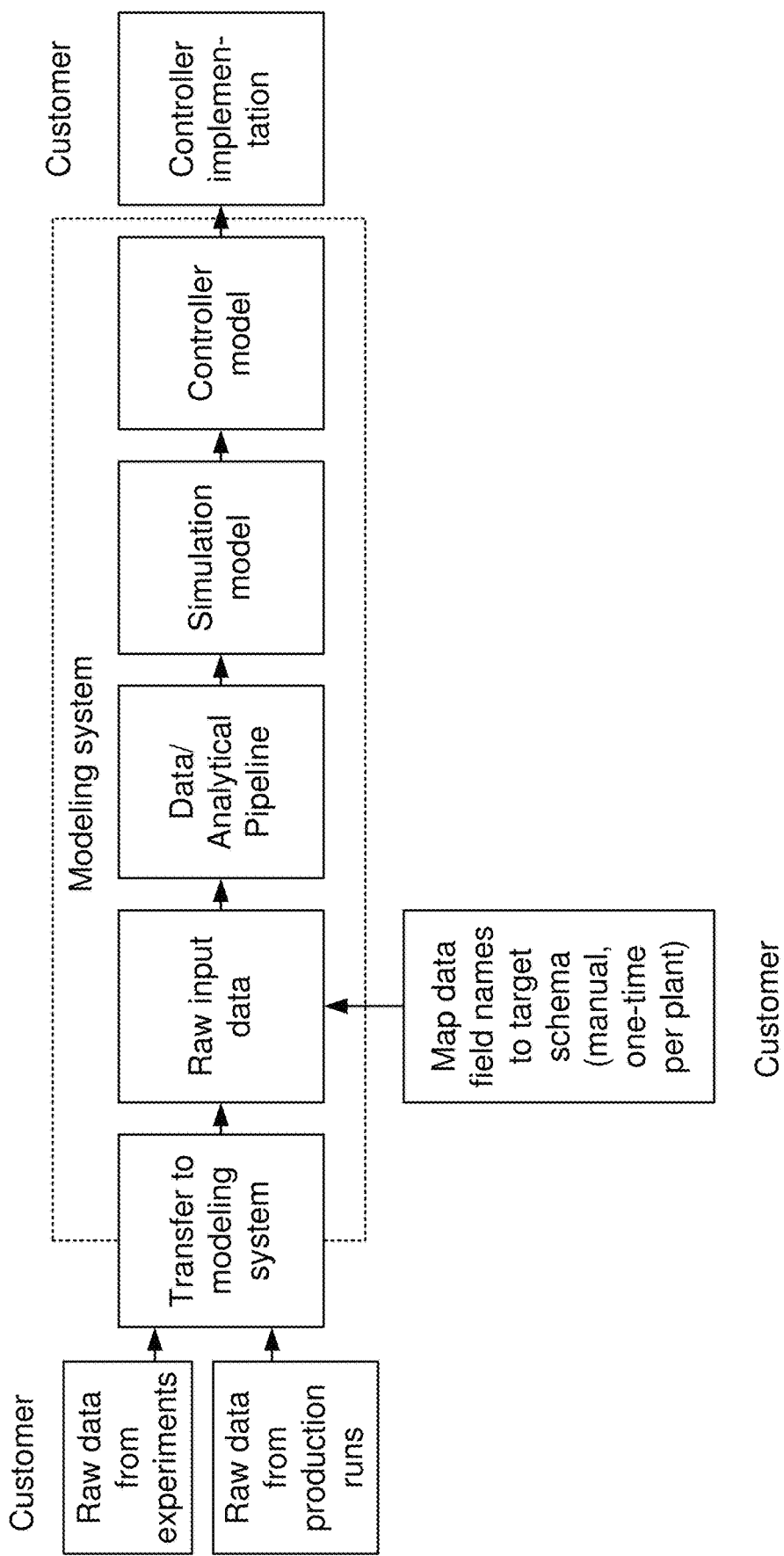

FIG. 16 shows the system architecture for the analytical pipeline, according to some example embodiments. The analytical pipeline is automated for scalability and ongoing improvement. In many enterprise processes such as rubber extrusion, the agent is not allowed to learn and optimize its decision-making or control policy through a lot of trials in the real environment. Generating the real-world experience data from executing numerous actions and conditions is very time-consuming, expensive, and even dangerous when the input ranges happen not to be properly set. For this reason, it is very desirable to build a predictive simulation model using the historical process data that companies have accumulated. Then, simulated experiences for hypothetical actions and conditions enable the agent to make optimal decisions.

Therefore, a predictive simulation model based on the historical process data available is the first task in enterprise and industrial AI applications. This is difficult to do with sufficient interpretability, probabilistic richness, and accuracy, given the kinds of data we encounter in enterprise and industrial AI. With this in mind, the presented methodology builds these predictive simulators and model-based control/decision engines in enterprise and industrial AI contexts.

The deep probabilistic (DP) dynamic model tells us how the state of the system will evolve as a result of the actions taken based on observed sequences (conditions, actions, observations over time). Defining performance KPIs, or "targets", it allows to use this model in an RL approach to construct a decision-making engine that suggests the "next best action" for any current state. The agent's initial action policy can be learned from simulated experiences, or a model predictive control (MPC) approach can be considered using Monte-Carlo simulations at every timestep.

Figure 17:
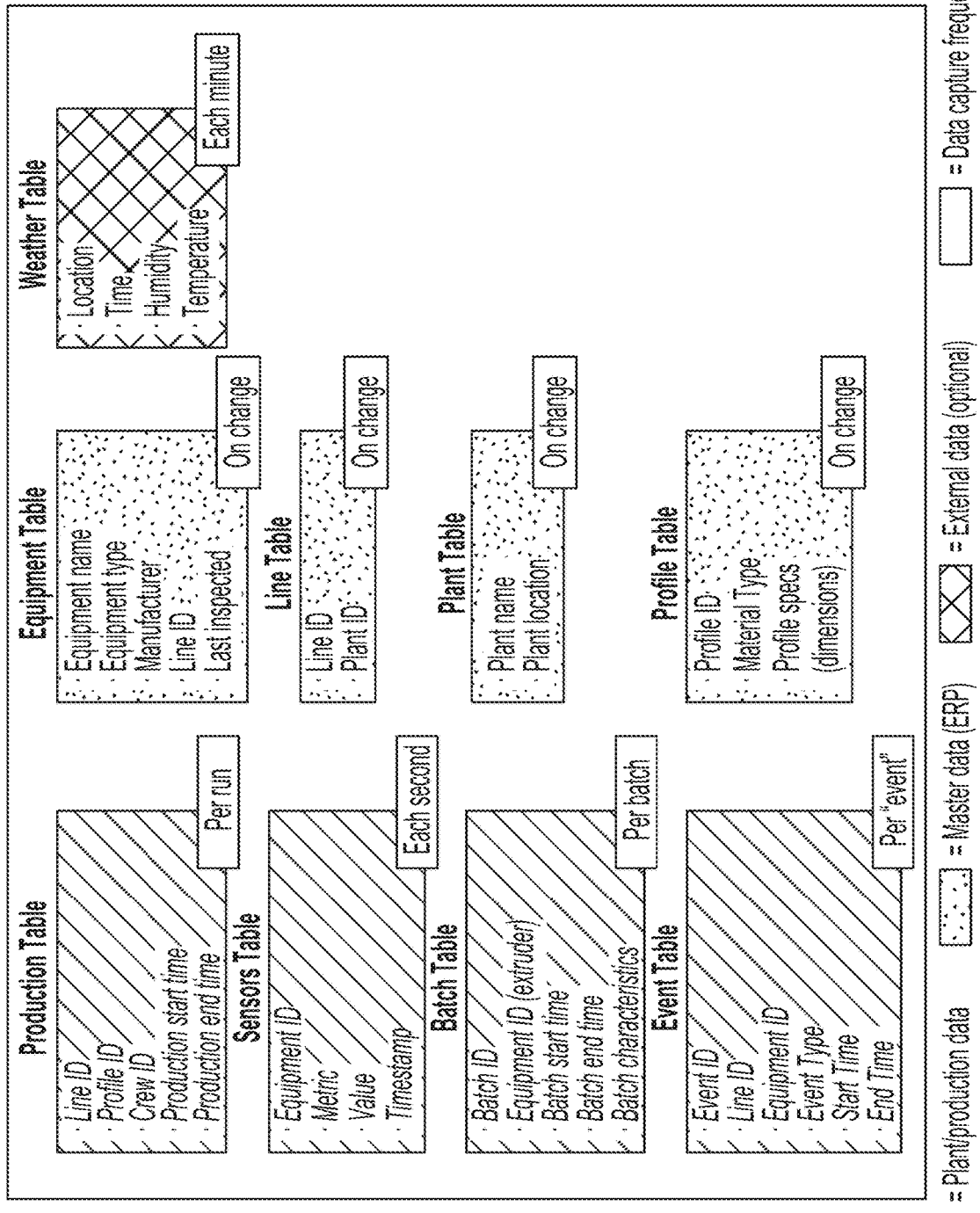

FIG. 17 shows the data structures for the model, according to some example embodiments. To train the model we will use the data of each of the different features discussed above. As a summary, there are four different categories of features:

Profile Measurements (y): Utilities/Targets to be predicted and optimized;
Sensors (JC): Measurements to be predicted;
Actions (a): Controllable inputs to be planned; and
Conditions (c): Uncontrollable/Exogenous features.

Along with this set of features, FIG. 17 shows the data strategy utilized with the objective of minimizing local data storage needs by reducing redundancy, according to some example embodiments. This is achieved by focusing on capturing elements that change frequently and provide unique identifiers that link to static details stored centrally.

Figure 18:
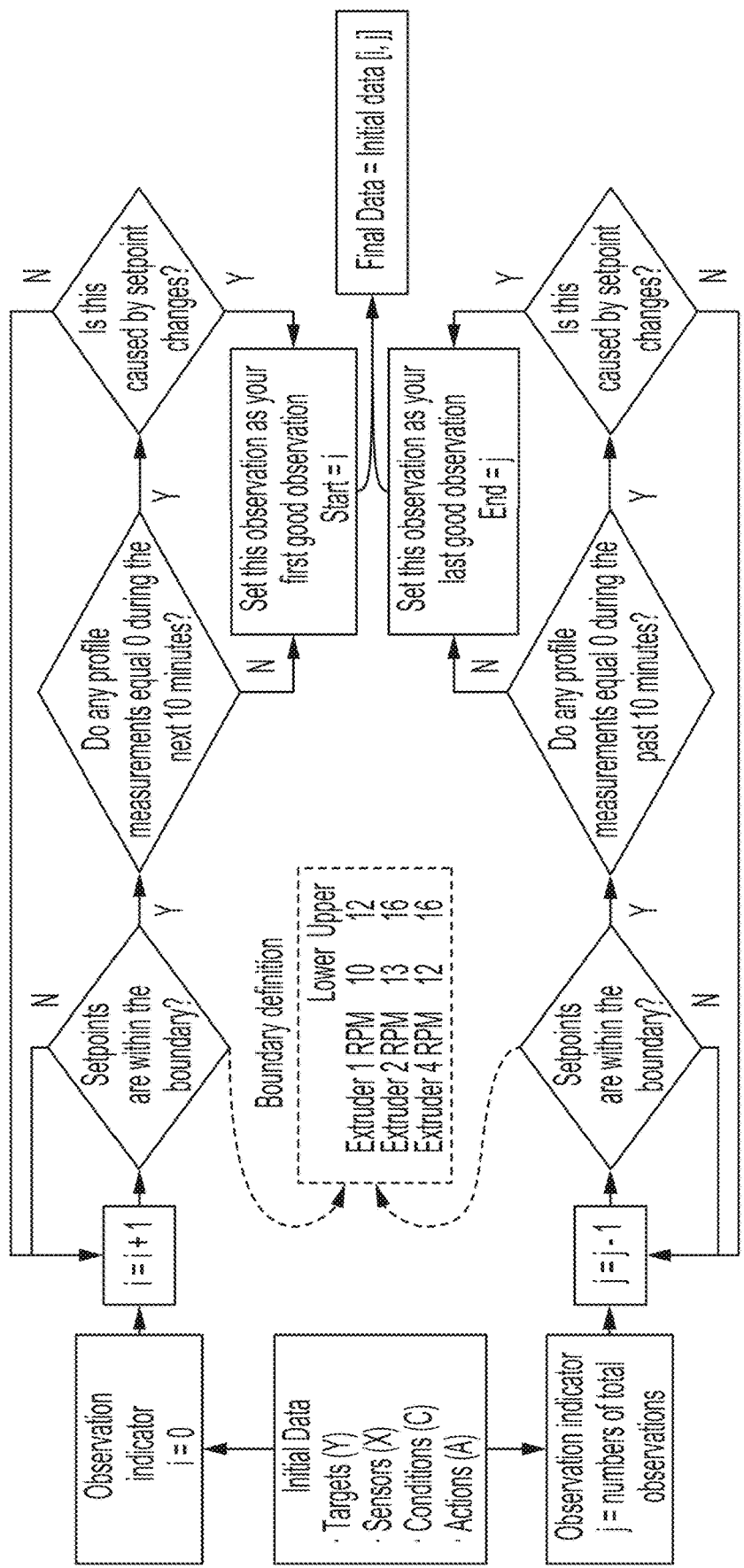

FIG. 18 illustrates an automated algorithm that removes unusable data at startup and end of each data table with the objective of performing data cleaning and regime detection. This results in fewer anomalous or wrong observations. In summary, this data preprocessing algorithm performs the following operations:

Condition-based on the observed action features;
If there is no change on the action features and we see profiles with zero values, drop those observations;
If profiles with zero values happen during an action feature ramp up, then we keep the observation; and
We avoid considering anomalous values by providing upper and lower thresholds for each variable.

Further transformations implemented by the algorithm include:

Replace outliers, e.g., forward-filling missing values help us keep continuous observations;
Smoothing by using exponentially weighted averages to filter unnecessary noise and let the model focus on general trends and less on small events that are generated by inherent noise of the process; and
Resampling observations, e.g., considering observations every five seconds (although other intervals are possible, such as in the range between one and 60 seconds) in order to be able to capture larger sequences with a smaller number of elements.

Figure 19:
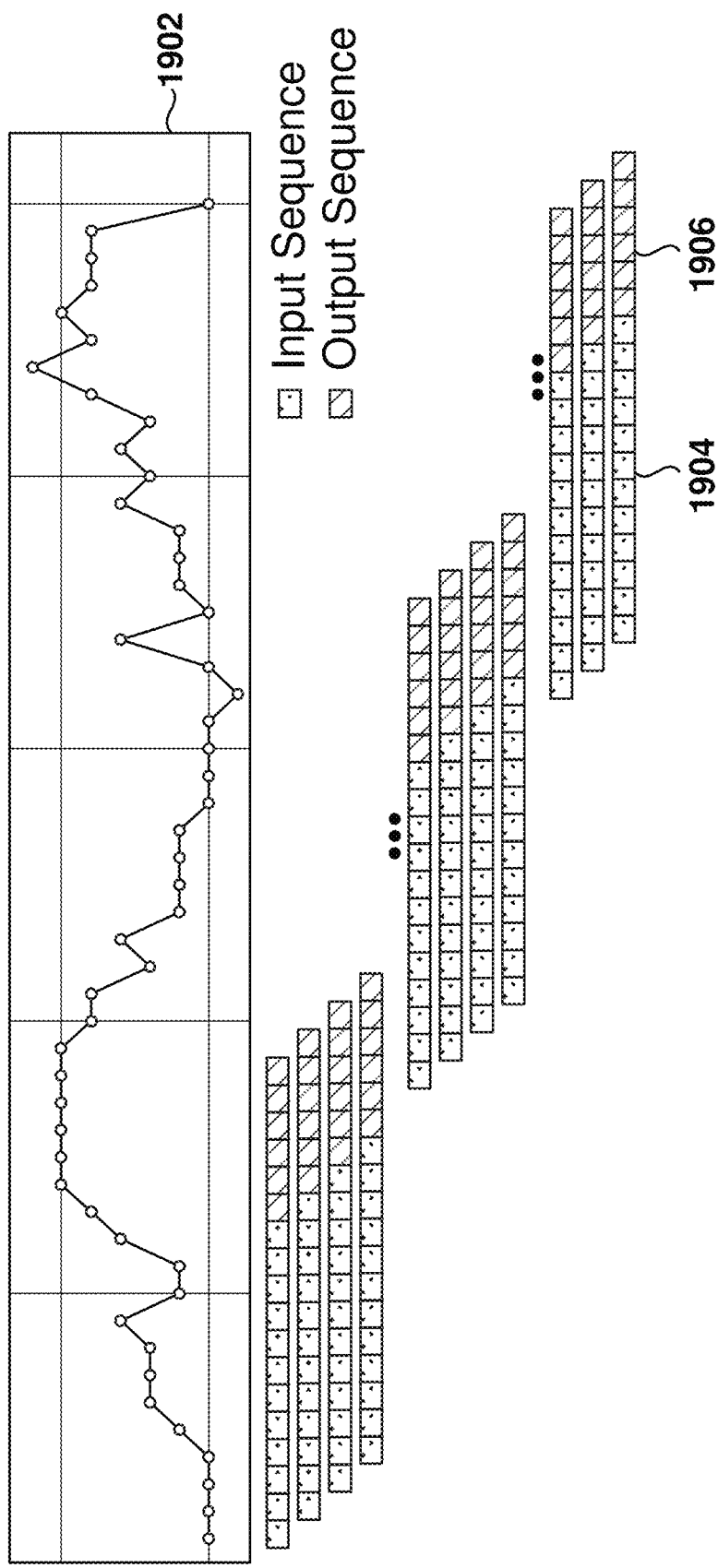

FIG. 19 illustrates the sequence-to-sequence data preprocessing, according to some example embodiments. Once we have the observations that are going to be considered, we then focus on the features. For each of the variables used, the information is prepared in a sequence of rolling arrays. Each array has a size equal to the number of past observations used plus the number of future observations that are going to be predicted. These numbers are selected considering both heuristics and the final objective of producing the best predictions possible.

FIG. 19 shows the plot 1902 of a random variable, considering that the past observations 1904 used per window is 12 and the number of steps to be predicted 1906 is 6.

Before using these sequences in the model, it is important to do further preprocessing. One of the steps is to normalize the data. This can be done across the whole time series, but it may also be implemented locally.

To perform the normalization, we took the median of every input sequence 1904 vectors and used that value to divide both input and output sequences. Notice that this is done for every window separately. By doing this, all sequences are leveled around 1 and each one of them is independent of each other. This technique allows the model to focus more on the general dynamics and trends of the plant and less on the level of each of the features, which help us to have better and more generalizable simulations.

As discussed earlier, the presented universal framework of the dynamic process modeling and control is mainly composed of two parts. First, we build the DPDM that enables the generative simulations of the likely future observation sequence for any given future (or counterfactual) condition and action sequence at a process state. Second, we optimize our action policy or Decision Machine Controller based on predictive simulations in model-based reinforcement learning or model-predictive control approaches. That is, the optimal action policy or controller can be designed to maximize the given KPIs, relying on the predicted experiences of sensor and target observations for different actions over the future time horizon.

Figure 20:
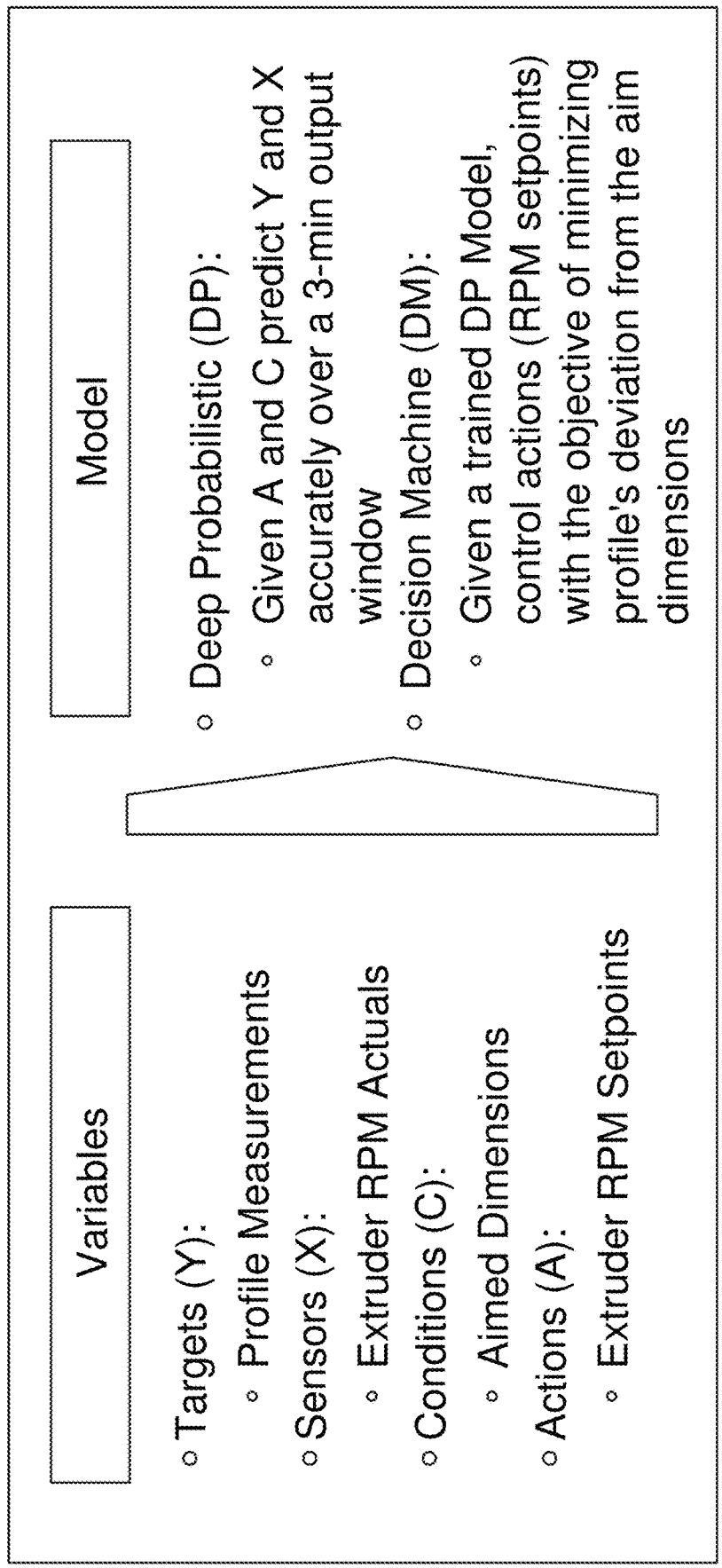

FIG. 20 shows the variables definition, according to some example embodiments. The modeling strategy includes the following:
1. Select different rubber extrusion experiments that were executed before to simulate a real plant scenario
2. Features used
   a. Y: Profile Measurements 0, 1, 2, . . . , 12
   b. X: Extruder RPM Sensors 1, 2 and 3
   c. A: Extruder RPM Setpoints 1, 2 and 3
   d. C: Aimed dimensions
3. Automated algorithm that removes unusable data at startup and end of each data table
4. Further data cleaning that involves missing value imputation using forward filling, exponential weighted smoothing (approximately using the average of the previous 10 seconds) and resampling of observations to 5 seconds each
5. Prepare data in sequences of total length equal to the sum of past steps used plus the number of steps to be predicted. In this case we used 36 for both past and future steps which means 72 total steps equivalent to 6 minutes (3 input seq+3 output seq)
6. Data normalization using the described rolling window methodology
7. Split train/validation/test sets
8. Hyperparameters used for ML model:
   a. hidden_size=100
   b. n_layers_mlp=3
   c. n_layers_rnn=2
   d. z_dim=2
   e. f_dim=1 #10
   f. model_option='gru'
   g. action_mode='do'
   h. feature_attention_mode=False
   i. difference_prediction_mode=True
   j. dp_ratio=0.30
   k. kld_loss_weighter=0.1#kl_beta
   l. mean_mode=True
   m. temporal_attention_mode=False
   n. layer_norm=True #batch norm
   o. residual=True#residual connection
9. Generate a prediction for all y, x, and a.
10. Loss Criterion: Mean Squared Error between the prediction and the real values
11. Calculate Loss (MSE) for all variables on every step of the sequence (both past and future sequences)
12. Calculate further losses regarding the KLD divergences
   a. kld_loss_tot=0.1*kld_loss_tot
   b. kld_att_loss_tot=0.001*kld_att_loss_tot
   c. kld_f=10000*kld_f
13. Clip gradients greater than 3
14. Back-propagate over entire sequences and use a triangular learning rate to update the learning rate
15. Run steps #8 to #13 for 25 epochs
16. Accuracy metrics used for the model are Mean Absolute Percentage Error (MASE), Symmetric Mean Absolute Percentage Error (sMAPE) and the Overall Weighted Average (OWA) of the two previous metrics.

Figure 21:
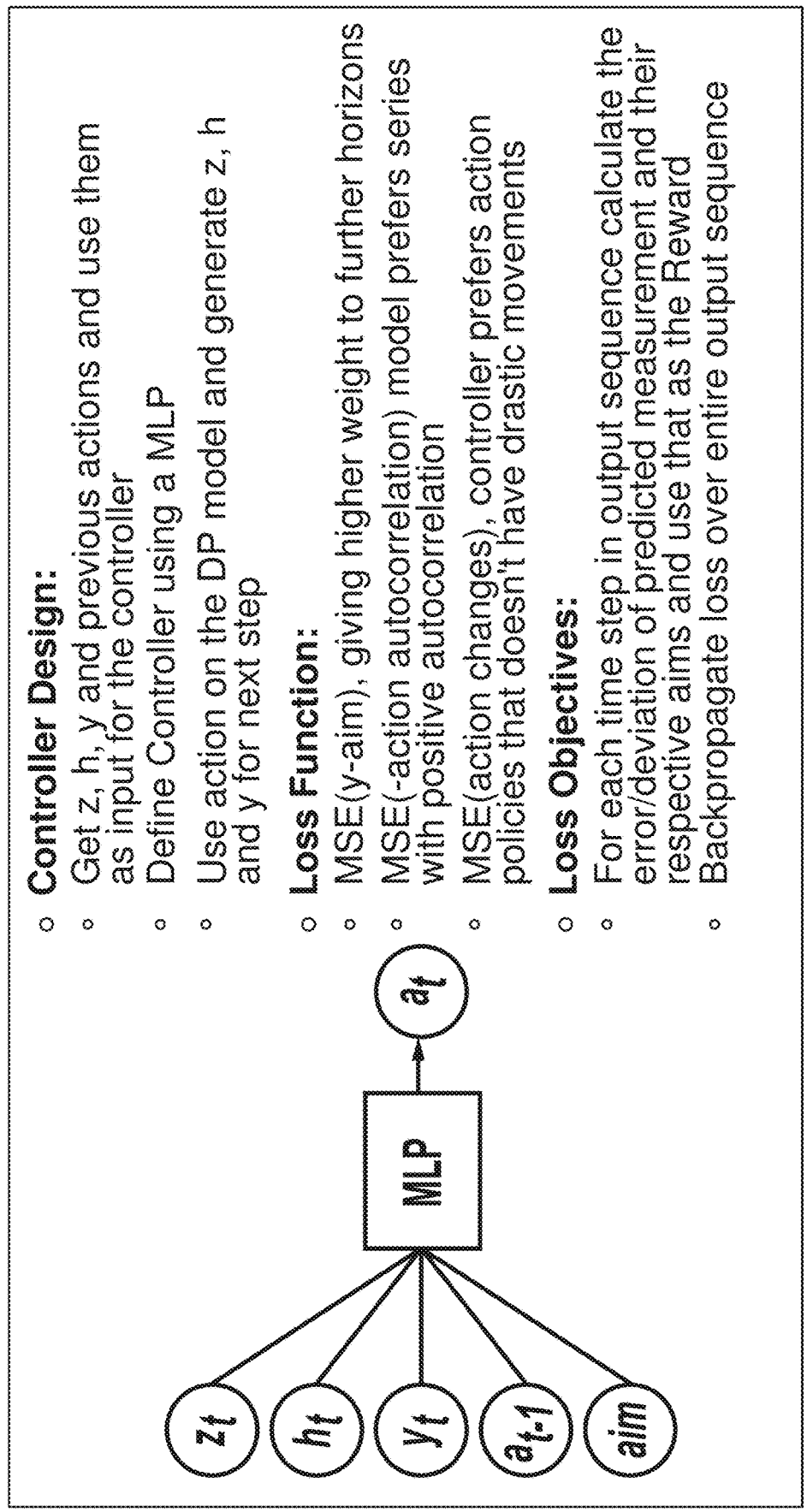

The previous steps are used to build the DPDM, which then is used as a Simulation Process (as illustrated in FIG. 4) to train the Decision Controller shown in FIG. 21.

Figure 22A:
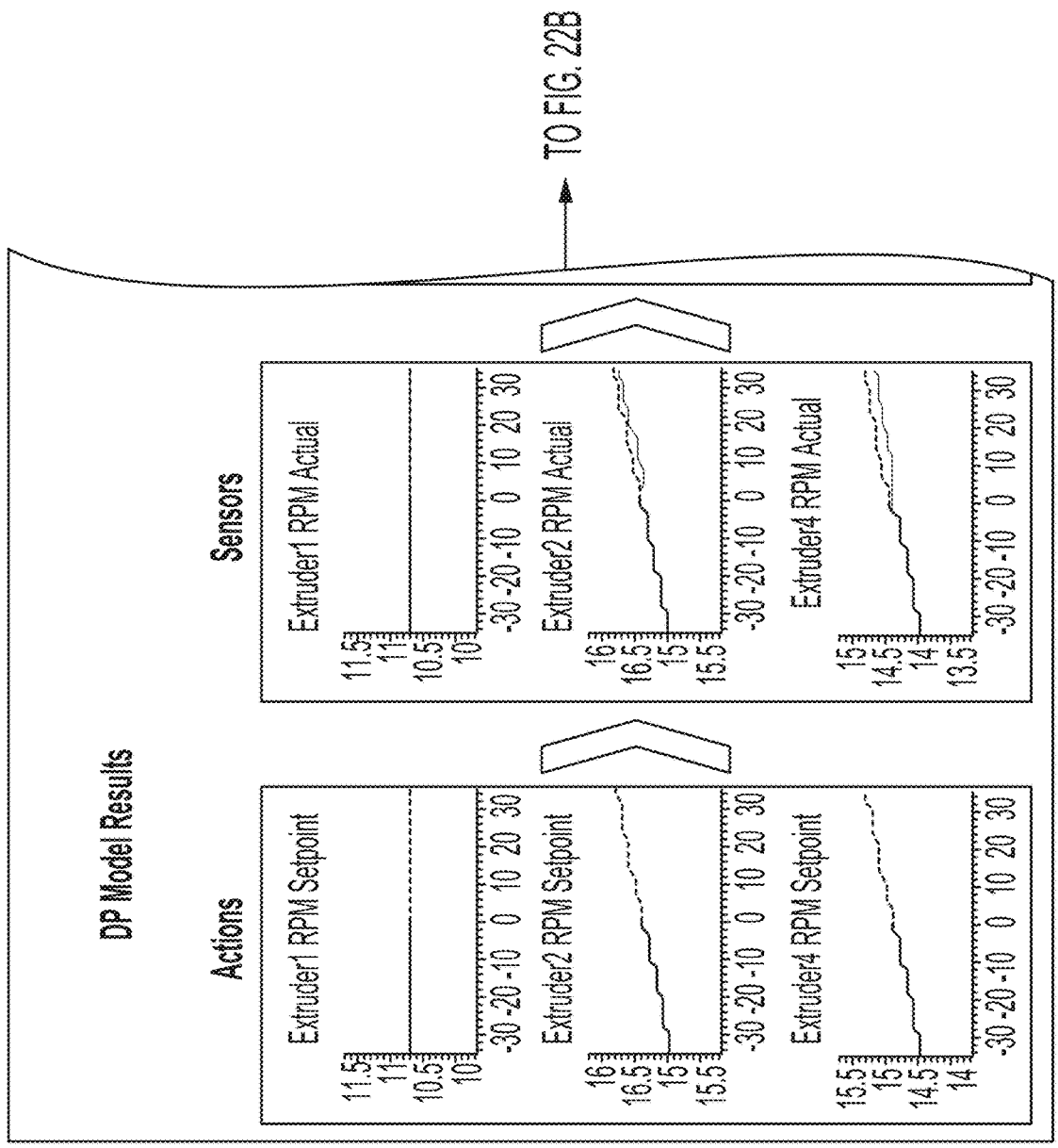
Figure 22B:
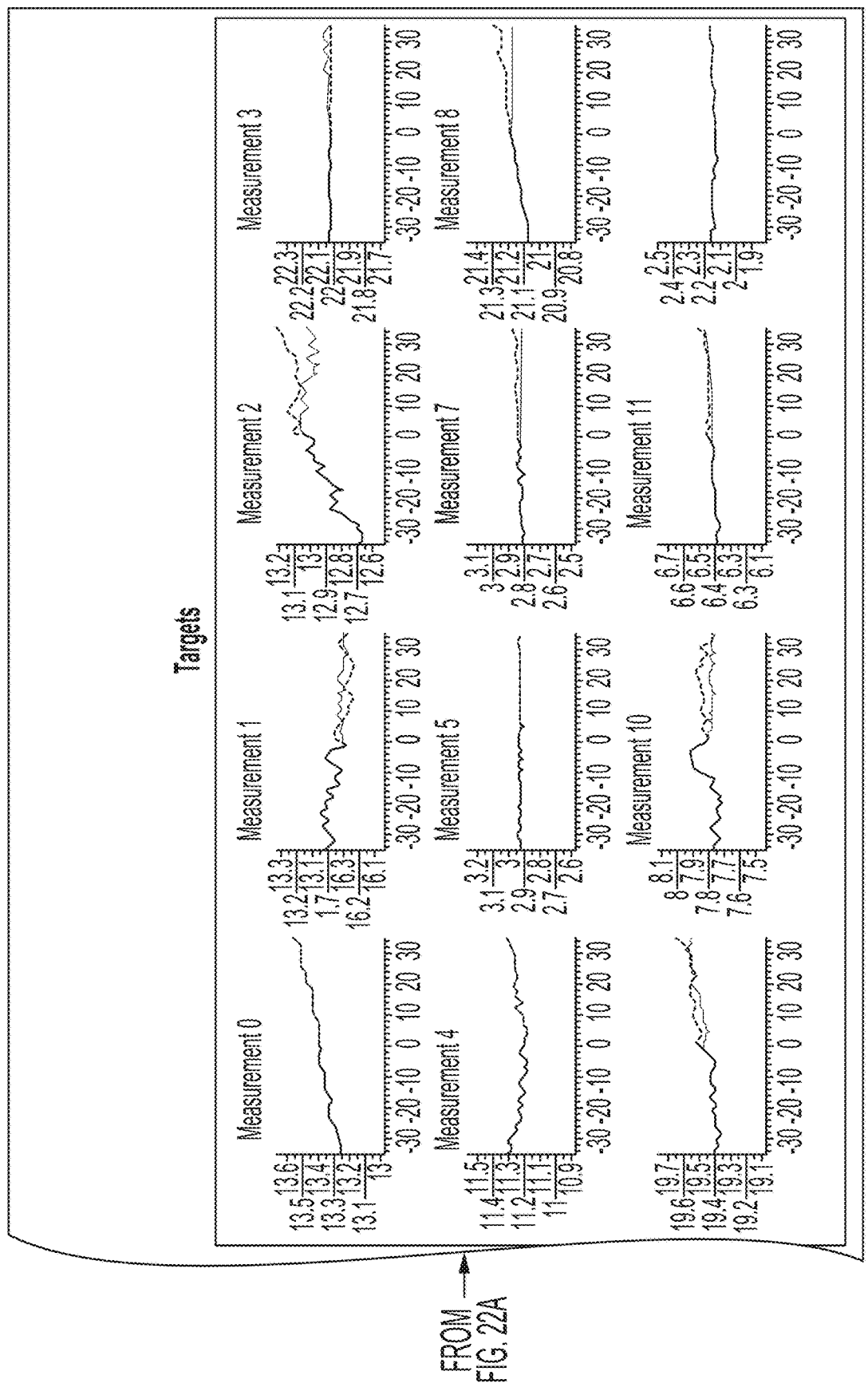

FIGS. 22A-22B show the DP model results, according to some example embodiments. The results show the DP model validations on the predictive simulation for sensors and targets, where the solid lines correspond to actual values up to the point where the solid lines become dotted lines, which represent future values. The solid lines covering the same time periods as the dotted lines correspond to the values predicted by the model and it can be seen by simple observation that the predicted models represent an improvement over the actual model without the use of DPDM.

FIG. 23 shows a user interface for selecting DPDM parameters, according to some example embodiments. As an output, the user has access to an AB testing interface. Possible ways of doing this testing include hardware-in-the-loop SIM and the actual environment.

For hardware-in-the-loop SIM, use the DP model to generate simulations for two different action policies: actions given by the DM controller, and benchmark action policy, which is, in some example embodiments, a rule-based controller or any other methodology used to compare against.

For the actual environment, use the real results gotten in the process line (actual environment) for two different action policies: actions given by the DM controller, and benchmark the action policy, which could be a rule-based controller, or another methodology used to compare against.

FIG. 23 shows the user interface generated for a hardware-in-the-loop AB testing. On the top section, user input fields are provided. The user can select the product or general permutation of interest.

Once the permutation is selected, the interface will display the set of DP, DM, and rule-based benchmark models available for that permutation. Out of these lists, the user will select the desired DP process model that will be used for generating the simulations. Then, the user chooses the DM controller that will be used to generate the optimal action policy and compare its performance against the selected rale-based benchmark.

Figure 24B:
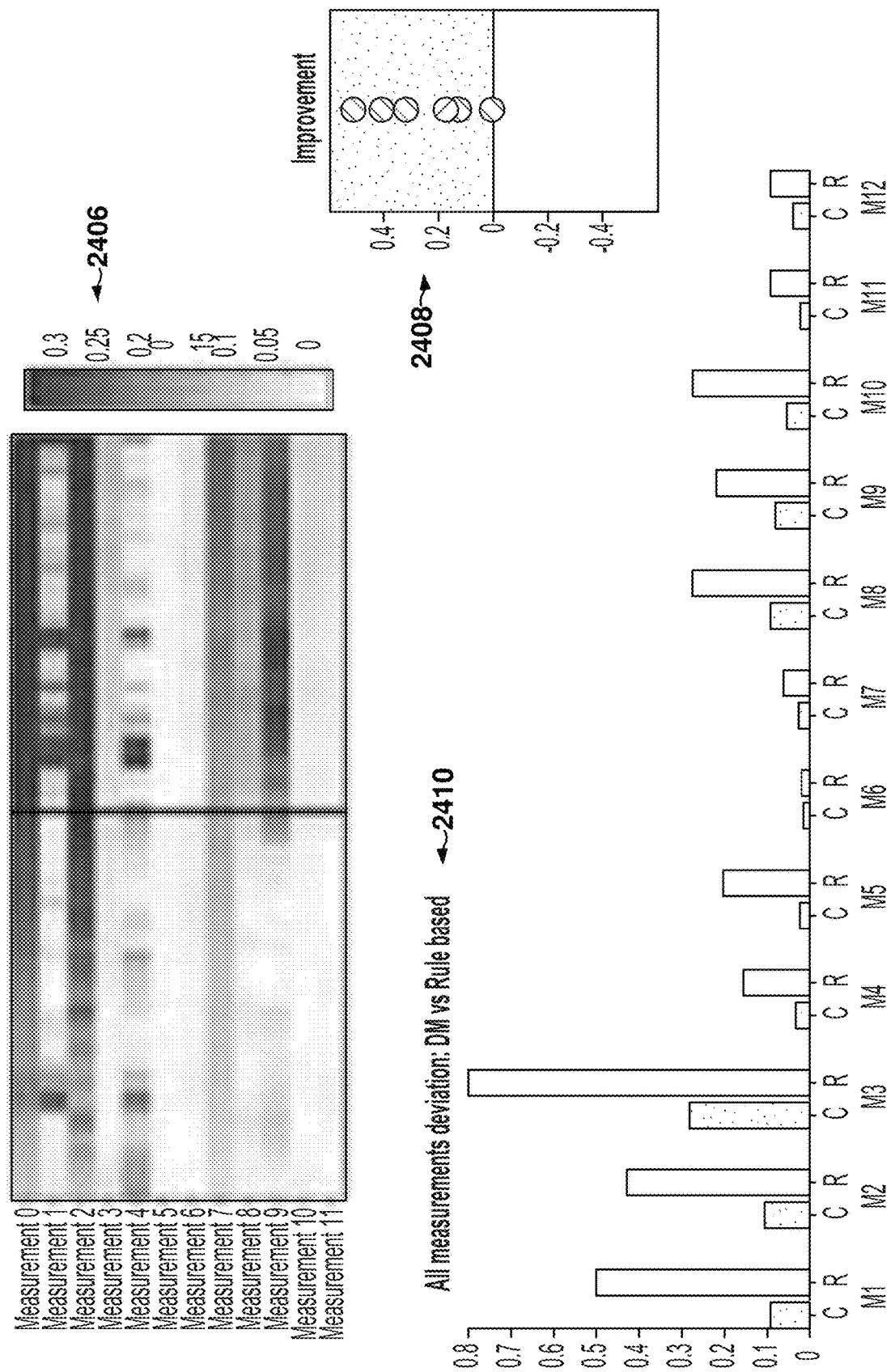
Figure 24C:
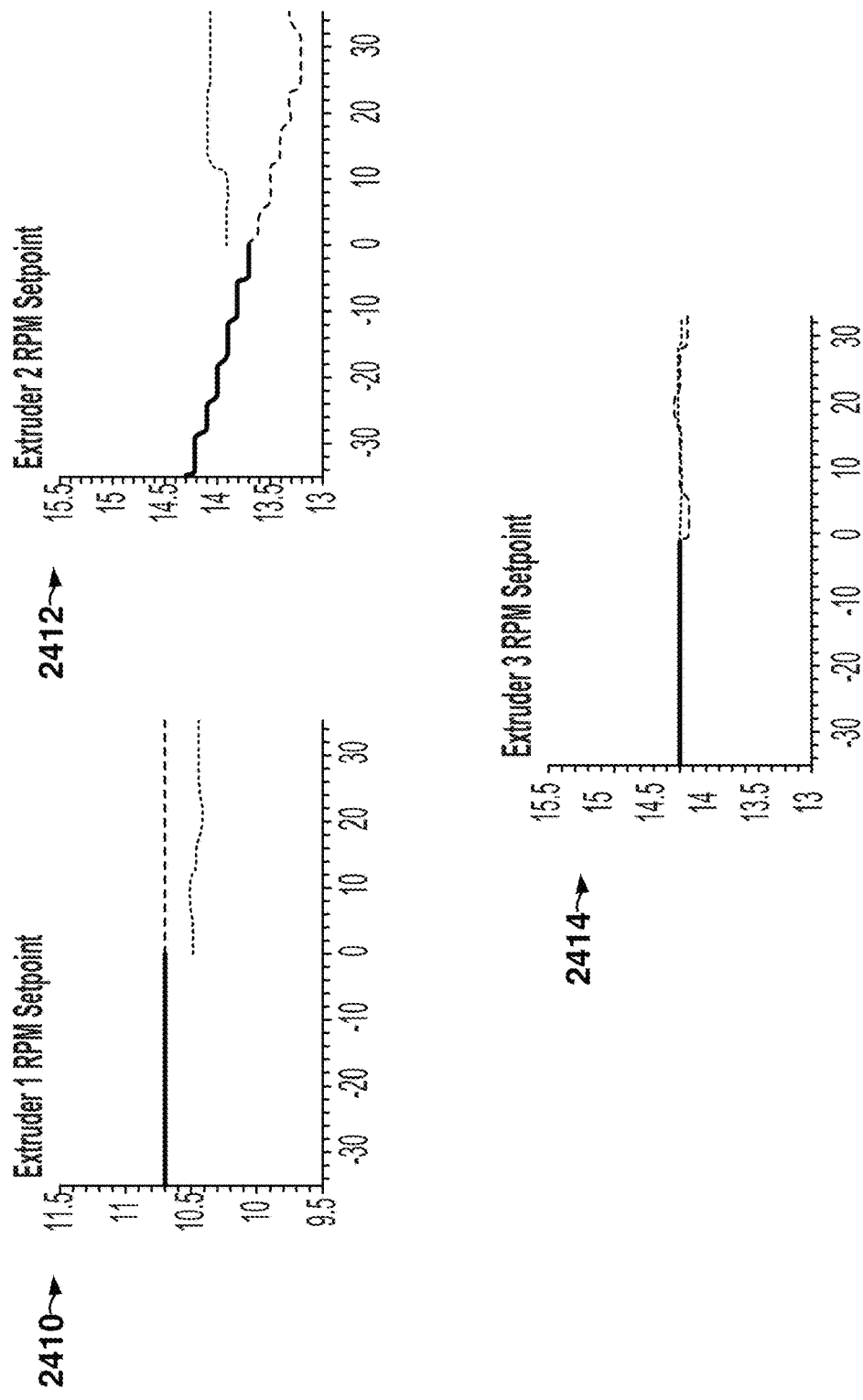

FIGS. 24A-24C show the AB testing output, according to some example embodiments. The heatmaps 2402 and 2406 show the deviation or error of the different possible product measurements (vertical axis) for different time horizons (horizontal axis). Darker colors in the heatmaps are related to higher errors.

The plot 2408 shows the improvement of the DM controller (left heatmap) compared to the rale-based actions (right heatmap) for each measurement according to the simulations generated by the DP process model. Each measurement is assigned to a black dot in the plot, and it is positioned higher if the improvement is bigger.

In this interface it is possible to choose among the different product measurements (by clicking on the vertical axis of the heatmaps) or different time horizons (by clicking on the horizontal axis of the heatmaps) to get a more detailed version of them. This generated detailed version is shown in plots 2404 and 2410. The plot 2404 shows the same information as one row of both heatmaps but as a time series plot, making it easier to understand the trends. The plot 2410 shows the same information as one column of both heatmaps. These bar plots illustrate the difference between the two action policies for the selected time horizon.

Charts 2410, 2412, and 2414 show the action policies of both DM and rule-based controllers for each of the different setpoints variables in the system, allowing to identify and assess what the DM controller is doing different compared to the rule-based benchmark.

Figure 25:
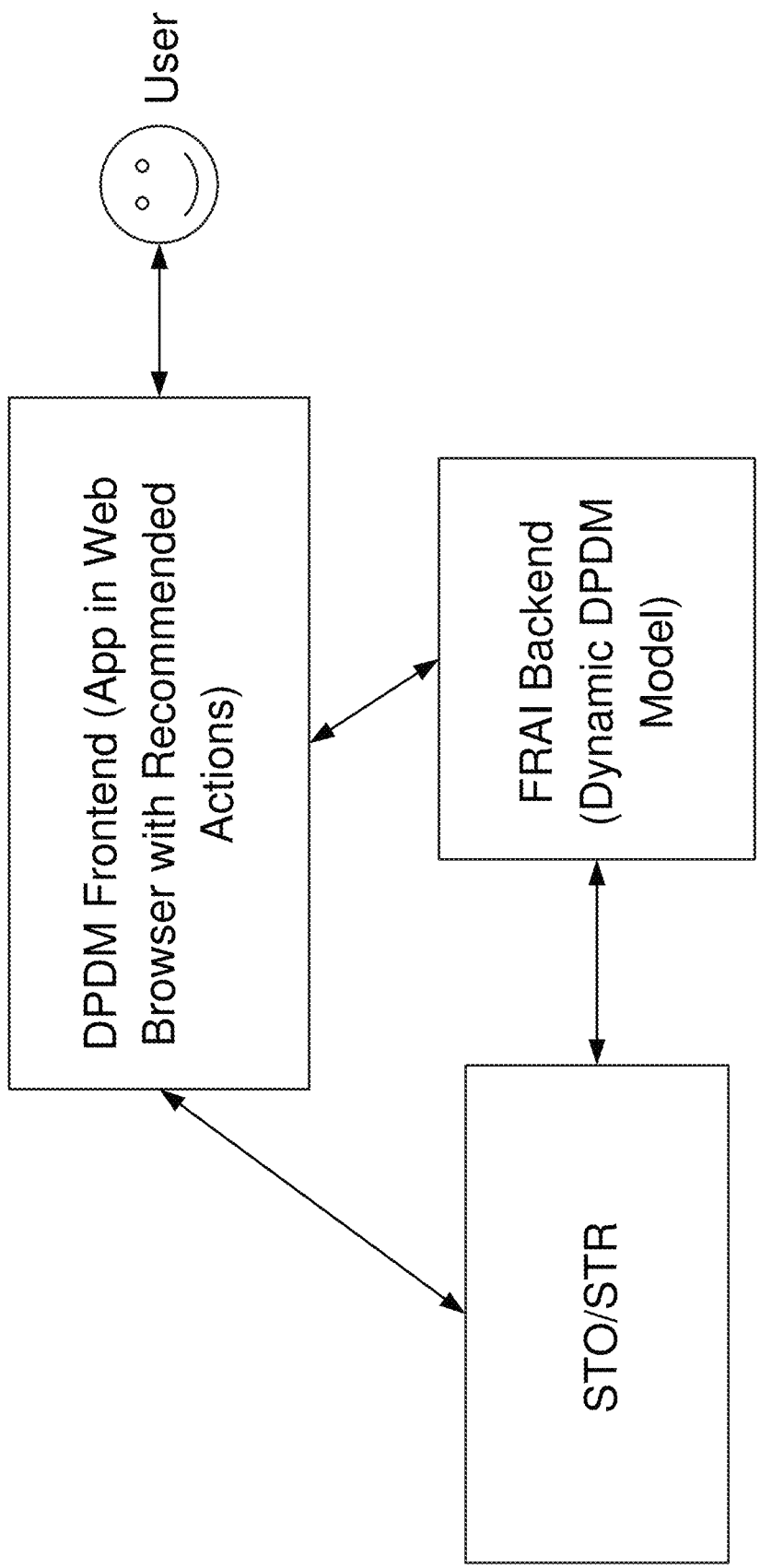
FIGS. 25-35 illustrate a use case for demand and inventory prediction and supply planning, according to some example embodiments.

FIGS. 25-35 illustrate a use case for demand and inventory prediction and supply planning, according to some example embodiments. FIG. 25 illustrates a Fill Rate Artificial Intelligence (RAI) system for demand and inventory prediction and supply planning, according to some example embodiments. The DPDM framework is used for a business dynamic process in demand forecasting and supply chain management involving different and hierarchical regional, temporal, channel, and product sales conditions. For example, we could model the inventory and demand levels for a wide variety of stock-keeping units (SKUs) that belong to certain families or categories at a variety of sales distribution centers belonging to specific regions within the global supply chain.

We consider the temporal nature of these variations as well as incorporate external signals, such as market signals or internal planning information. The process involves dynamic control actions, such as price and promotions influencing the demand, safety stock levels, expedites, inventory rebalancing, and production changes influencing the supply. There are sensor observations related to the process state, such as inventory quantities, sales quantities, production quantities, and competitors' sales trends over time.

Some of the target observations to be predicted and optimized could include value at risk (VAR), which may include a composite of lost sales, inventory holding costs, expedite costs, obsolescence costs, contractual penalties, and sales order volume over time.

The definition of variable sets forth DPDM includes defining the targets y, which are the value or values being optimized. We want this to be customer demand, inventory levels, and VAR. VAR is forward looking, but it relates to a cost on the business which includes lost sales, inventory holding costs, and expedite costs.

The following equation is used to predict and optimize the VAR:

$$VAR = \left(1 - \frac{I}{D}\right)DP \begin{cases} I \leq D \\ I > D \end{cases} + hI + c_e$$

Here, I is the inventory level for a particular SKU at a particular distribution center (DC), D is the demand for a particular SKU at a particular DC, P is the price of the SKU, h is the holding cost per unit, and $c_f$ is the cost of expediting a shipment (ahead of regularly scheduled shipments). In other example embodiments, the VAR also includes other costs, such as obsolescence costs.

The sensors x are measurements that we want to predict but not specifically optimized. This includes measurements like distributed demand, distributed receipts, etc. We do not know what these will be in the future but predicting them is important in predicting the targets.

The conditions c are the features that we know in the future but cannot control directly. Some examples include the month of year and plant location and the planning book data such as SAP-projected future demand and inventory quantities known at the current time. However, since certain parts of the plan can be changed, some of the planning book features may also be considered actions.

The actions a are the features that we know in the future and are directly controllable. One can think of the planning book as action features, as inbound receipts and various threshold settings are controllable. There are a set of constraints on the extent to which these values can be changed, which is governed by data in the STO, STR, and transportation lanes data sets. One could also consider expedites, inventory reallocation, and production changes themselves the actions.

In some example embodiments. Table 2 below shows the variables utilized for DPDM:

TABLE 2

| Targets | Value at Risk (VAR) |
|---|---|
| Sensors | Distributed demand |
| | Distributed receipts |
| | Transport time |
| | Inventory quantities |
| | Production quantities |
| Conditions | Date related features |
| | SAP plant |
| | Planned customer demand |
| | Price |
| | In transit stock |
| | Max Coverage |
| | SAP-projected inventory and demand |
| Actions | Planned distributed receipts |
| | Confirmed distributed receipts |
| | Planned distributed demand |
| | Confirmed distributed demand |
| | EOQ |
| | Safety stock thresholds |
| | Planned inventory levels |

It is noted that the variables illustrated in Table 2 are examples and do not describe every possible embodiment. Other embodiments may utilize other parameters, such as historical attainment and stated lead times. The embodiments illustrated in Table 2 should therefore not be interpreted to be exclusive or limiting, but rather illustrative.

We want to be able to recommend an optimal set of actions to minimize the value at risk. We can accomplish this by building a DP model that is able to predict a set of KPIs (in our case, customer demand, inventory levels, and VAR) accurately. Some of the data elements represent controllable response actions (e.g., planned and confirmed distributed receipts).

Once we have a DP model, as illustrated in FIGS. 11 and 12, with good predictive power, we can modify the controllable data (with constraints) to predict the optimal set of actions to minimize VAR.

Figure 26:
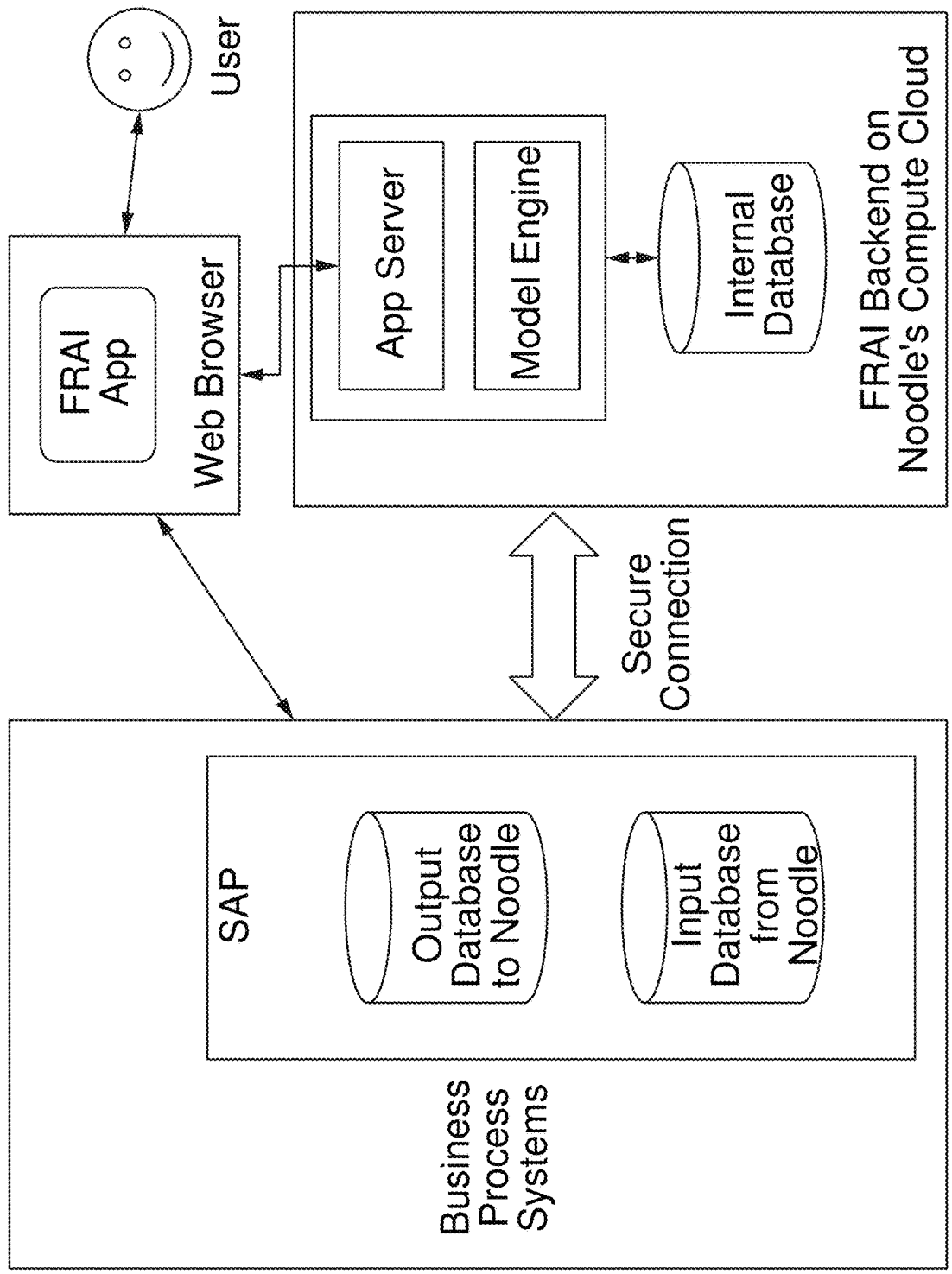

FIG. 26 shows a sample system architecture for FRAI, according to some example embodiments. The business process systems include databases for output and input from the DPDM system (also known as Noodle in this example). A FRAI app is provided to the user for interfacing with the system, and the FRAI app may we executed on a web browser.

The FRAI backend includes an internal database for the DPDM system, an application server that interfaces with the FRAI app, and the DPDM model engine. A secure connection is used for communications between the business process systems and the FRAI backend.

Figure 27:
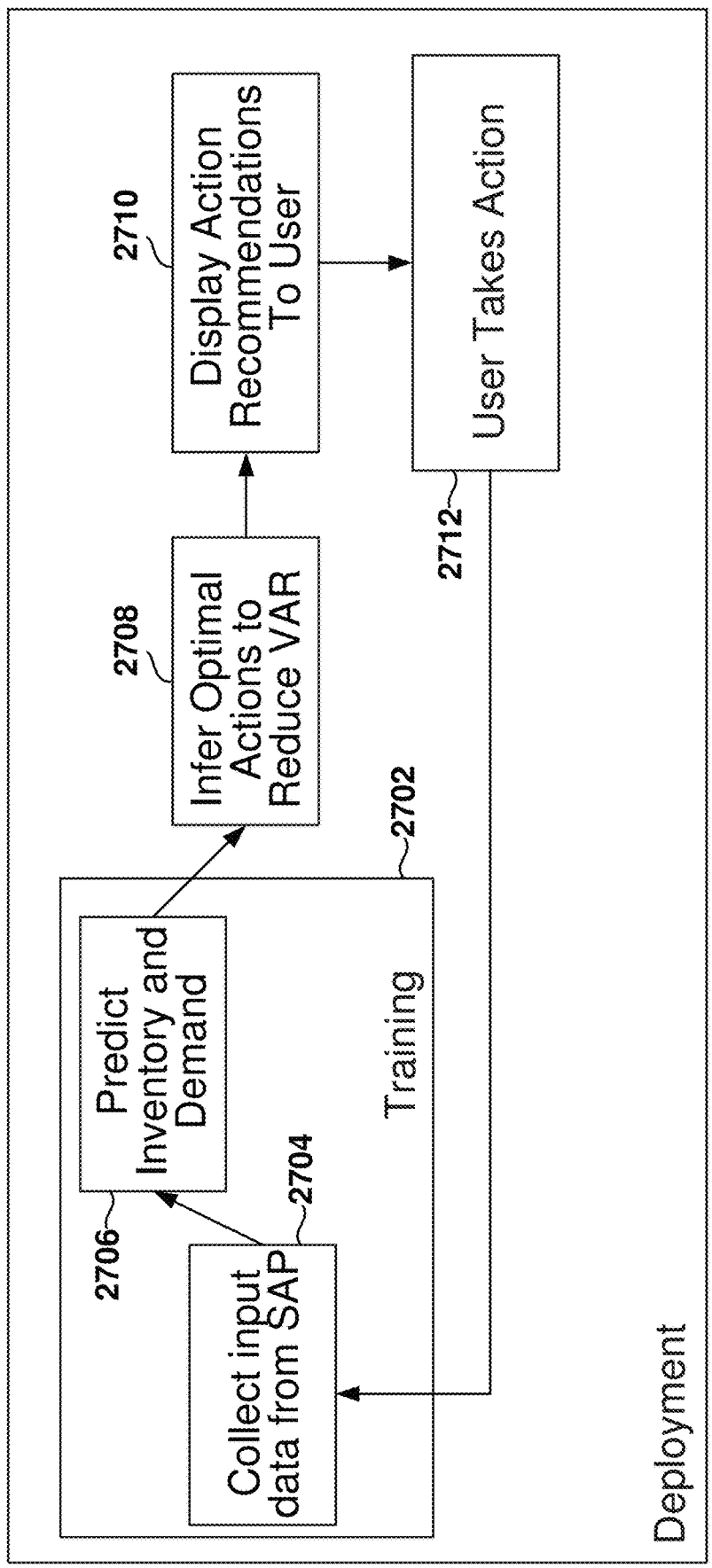

FIG. 27 illustrates the operations of a method for deployment of the demand and inventory prediction and supply planning, according to some example embodiments.

During the training phase 2702, historical data is collected 2704 from the system databases, and the model is trained for predicting inventory and demand 2706.

From the training phase 2702, the method flows to operation 2708 to infer optimal actions to reduce VAR. From operation 2708, the method flows to operation 2710 where the actions recommendations are presented on a display for the user (e.g., in the FRAI app of FIG. 26).

From operation 2710, the method flows to operation 2712 where an action is received from the user. The method may be repeated iteratively over time as additional data is available.

Figure 28:
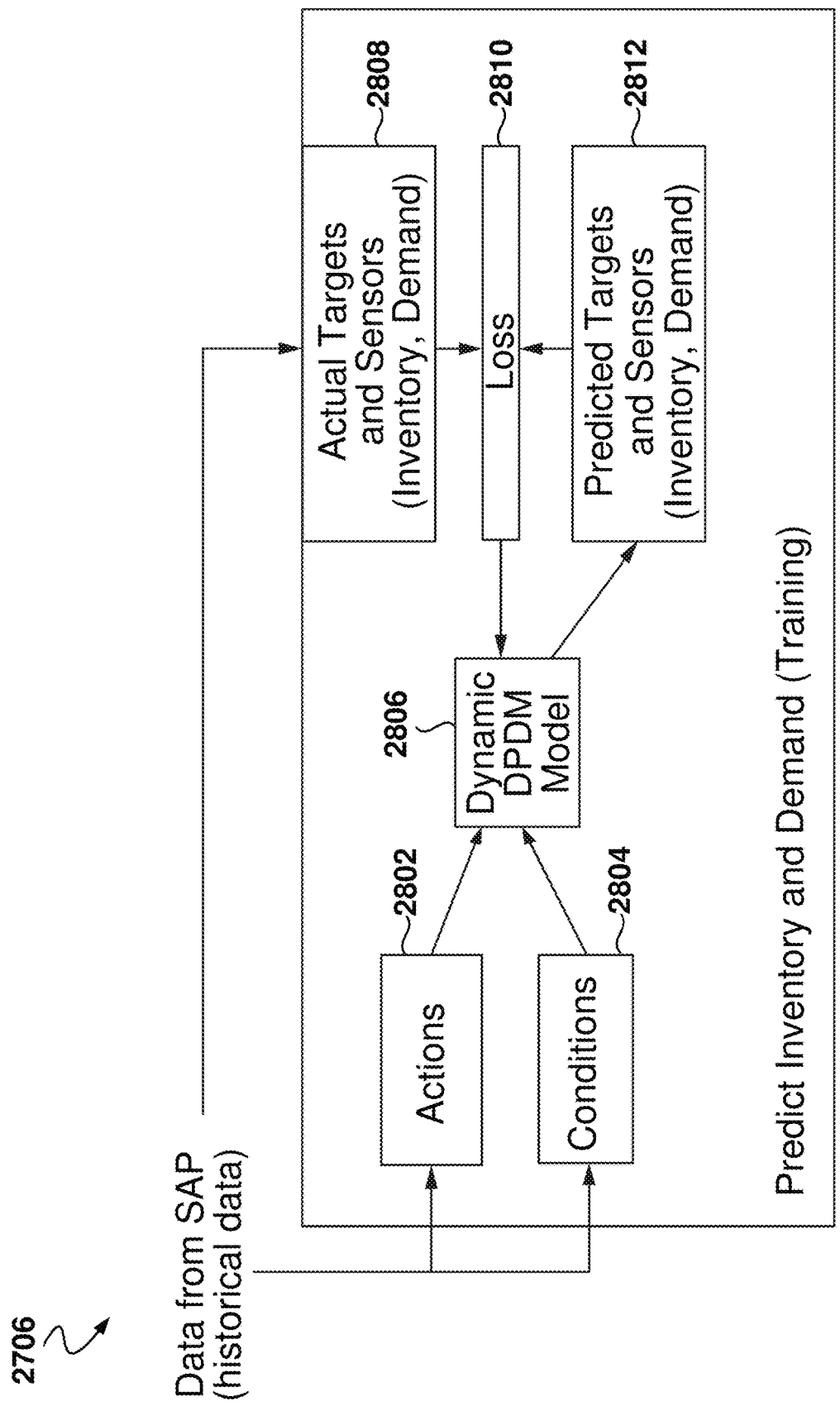

FIG. 28 illustrates the details of operation 2706 of FIG. 27 for predicting inventory and demand for the training phase, according to some example embodiments. The historical data is received from the system databases, which includes actions 2802 conditions 2804, actual targets (e.g., inventory, demand) and sensors 2808, and loss 2810. The DPDM model 2806 calculates the predicted targets (e.g., inventory, demand) and sensors 2812.

Figure 29:
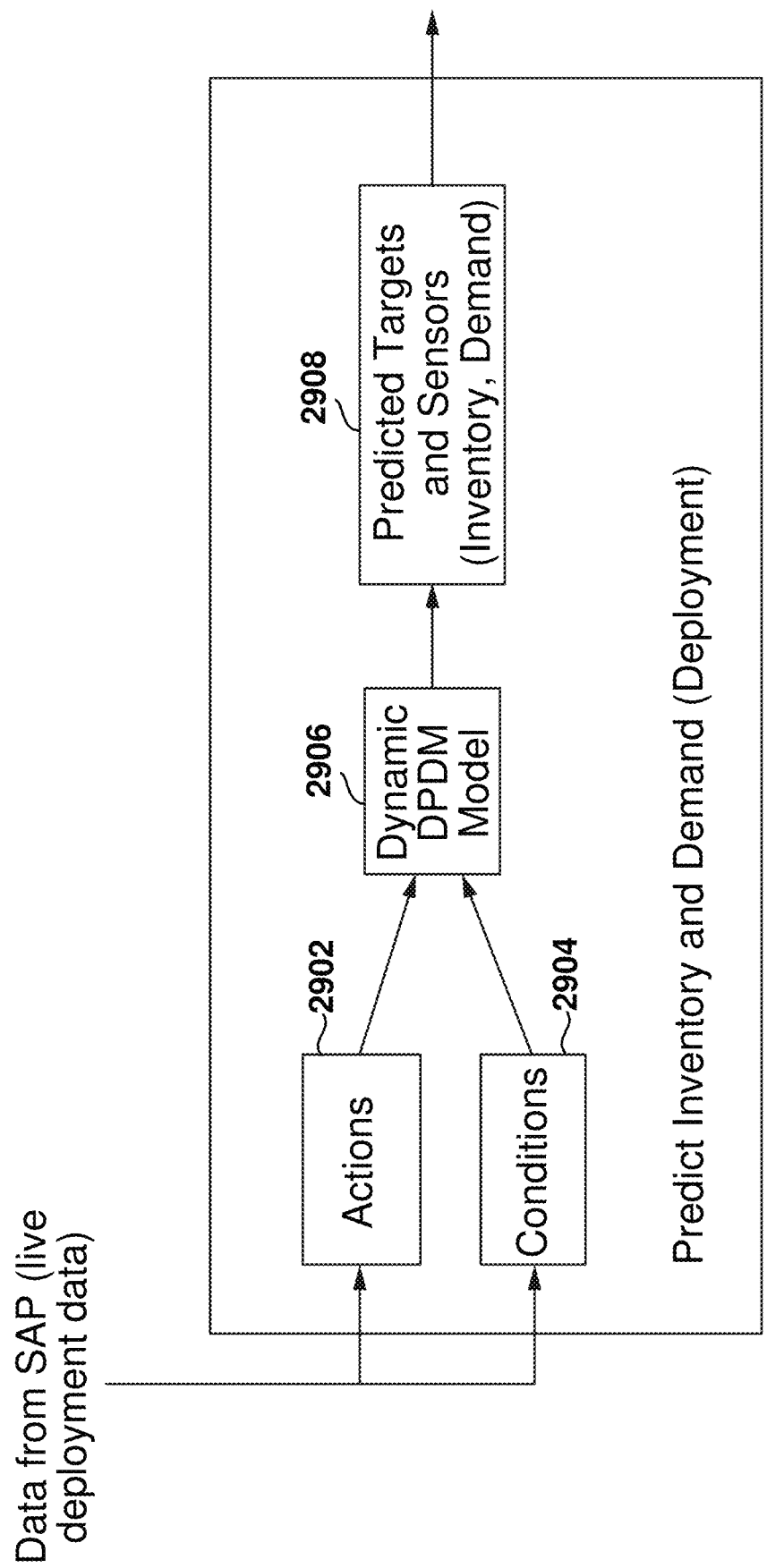

FIG. 29 shows details of an operation to predict inventory and demand during the deployment phase, according to some example embodiments. During live operation, the live data is received from the system database, which includes actions 2902 and conditions 2904. The DPDM model 2906 then generates the predicted targets (e.g., inventory, demand) and sensors 2908.

Figure 30:
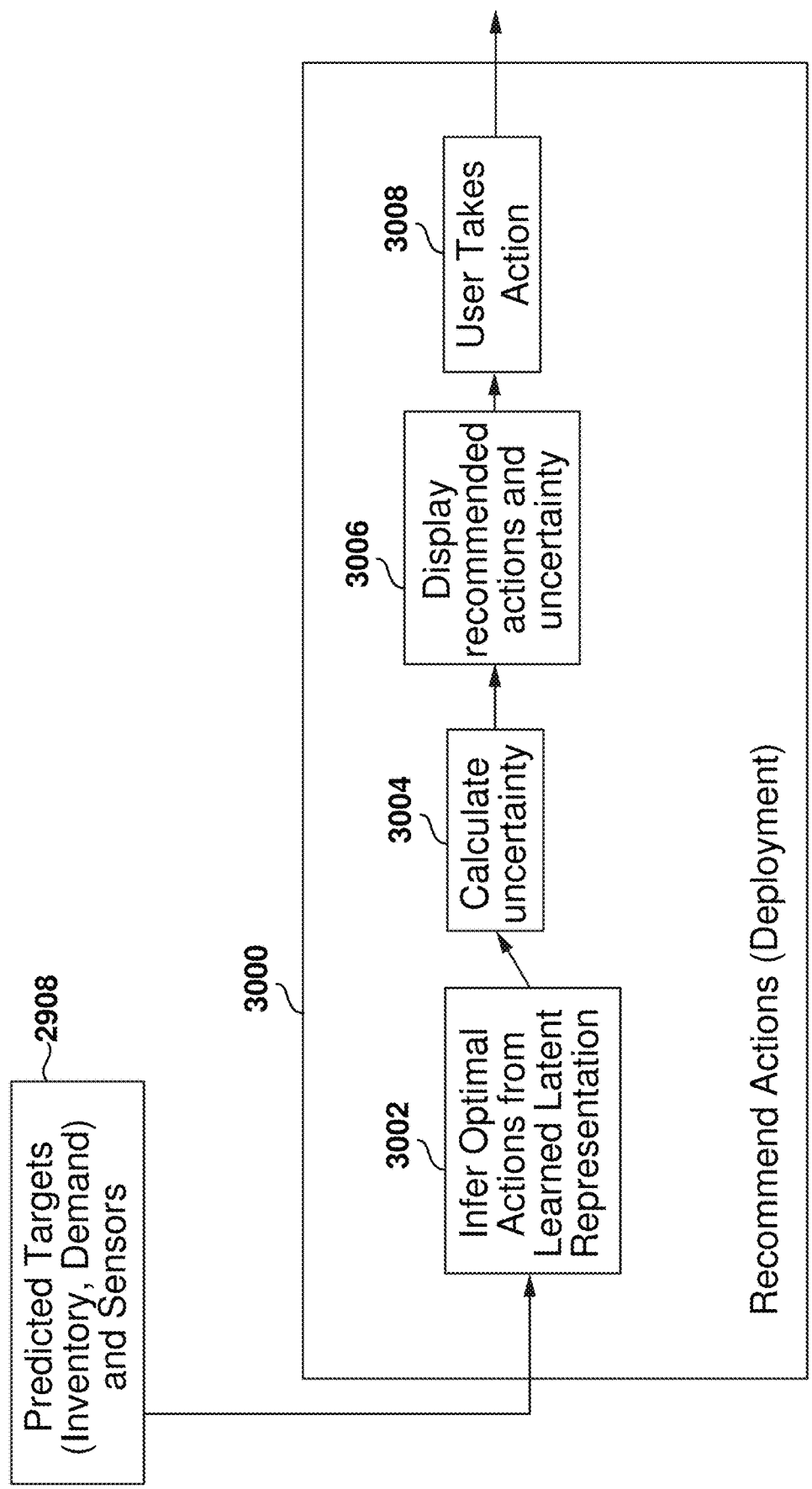

FIG. 30 illustrates the operations following the prediction of targets and sensors, according to some example embodiments. From operation 2908, the method flows to operation 3000, including operation 3002 to infer the optimal actions from the learned latent representation.

From operation 3002, the method flows to operation 3004 to calculate the uncertainty level. Further, from operation 3004, the method flows to operation 3006 where the recommended actions and uncertainty levels are displayed on a user interface. From operation 3006, the method flows to operation 3008 where the user action is received and processed.

Traditional methods rely on using historical KPI measurements to make predictions and they are not anchored on actions. However, DPDM explicitly models actions (controllable inputs) for prediction and recommendations. Further, DPDM provides native ability to model cause and effect and support scenario simulation. Also, inherent to DPDM is a feedback loop that continuously measures the efficacy of action and updates policy accordingly.

Figure 31:
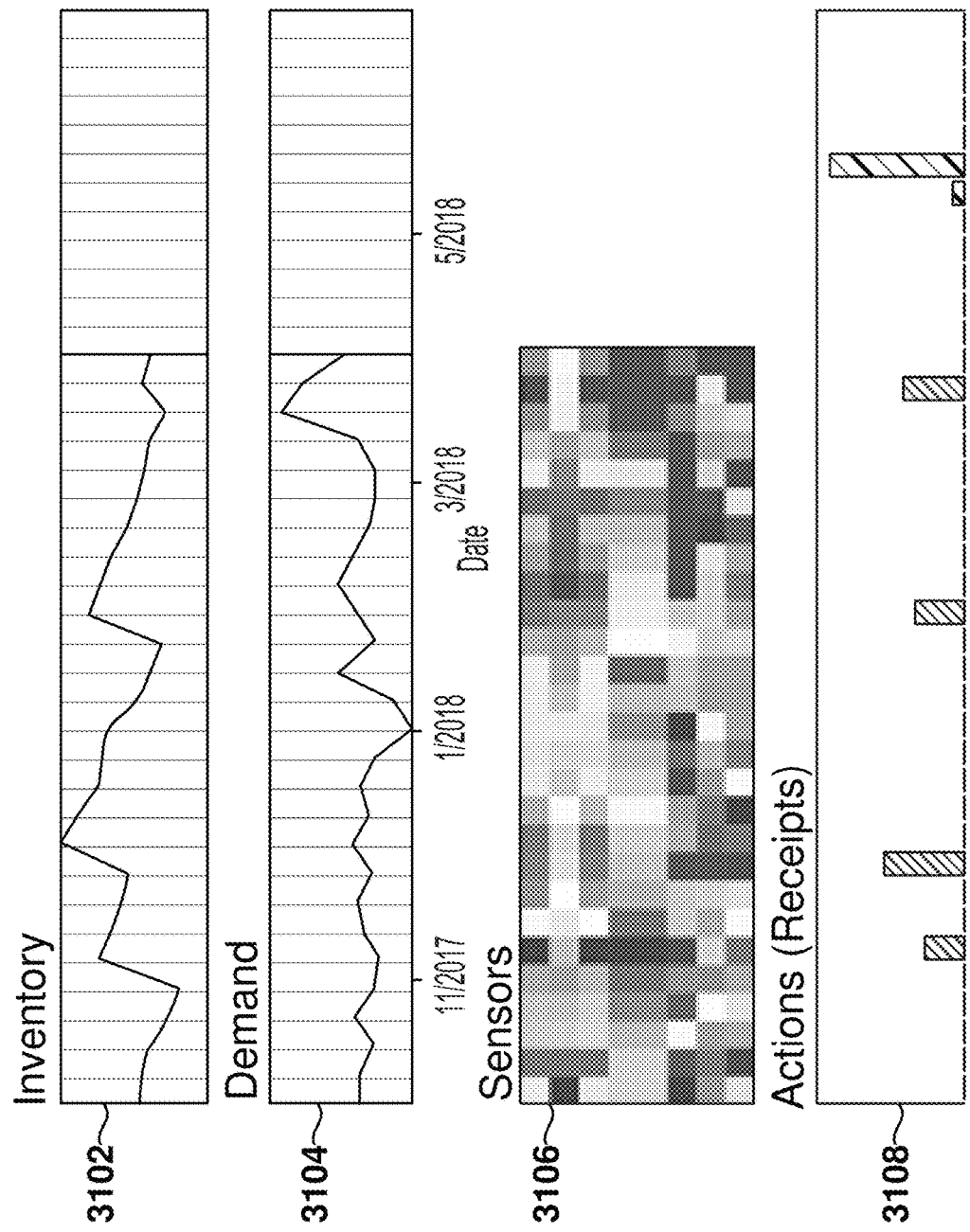

FIG. 31 shows the data provided to the DP model prior to the predictions. The actions 3108, which are aggregated historically (first 4 bars) and the planned/confirmed receipts (last two bars), are provided for the entire time sequence. Values for the targets (inventory levels 3102 and customer demand 3104) and sensors 3106 (distributed demand, distributed receipts, transport time, and other non-actionable variables) are provided for the past sequence.

Figure 32:
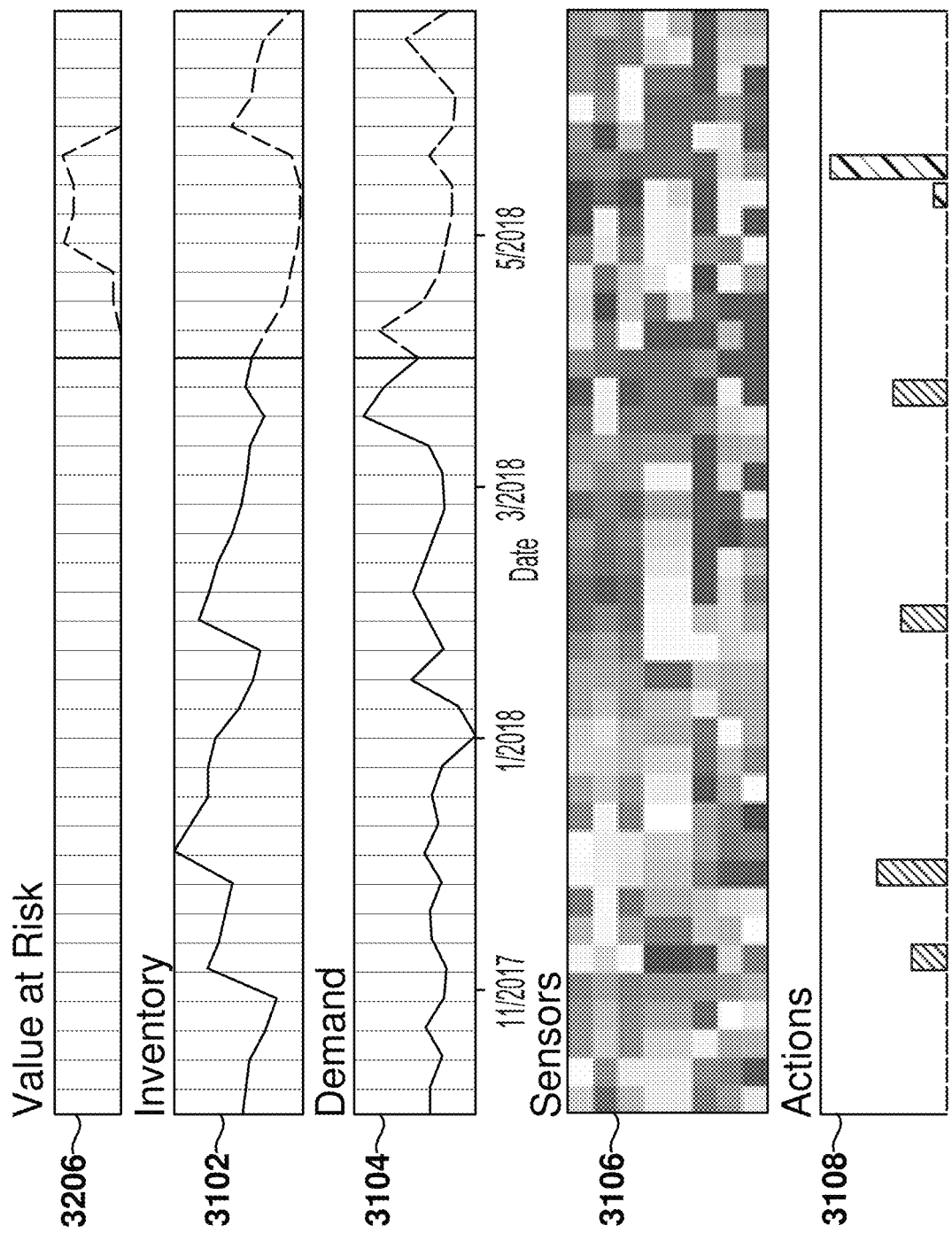

FIG. 32 illustrates how the trained DP model predicts the future sequence given its future actions. An additional target variable VAR 3206 is shown which is used as a measure for the DM model.

Given the trained DP model, it is possible to arbitrarily change the actions and predict what the future values will be for our targets and sensors. Three scenarios are illustrated below where the actions have been modified to generate a smaller VAR.

Figure 33:
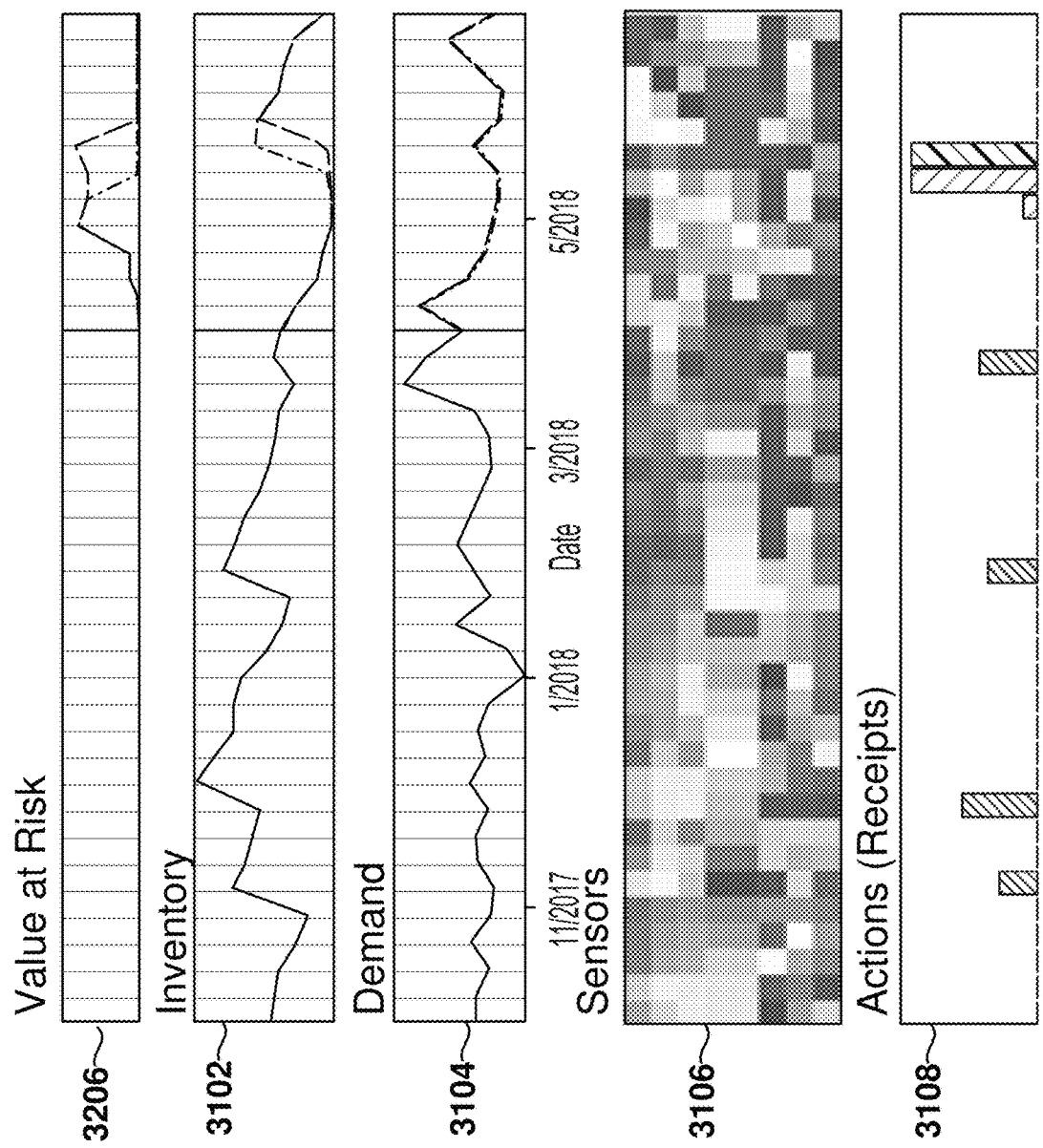

FIG. 33 illustrates taking an expedited shipment a week earlier than the planned shipment. In this situation, the receipts are advanced by one week (through expediting shipments, e.g., air vs ground transport) and the target and sensor values as a result of the modified actions can be predicted, as shown in the continuous lines of the prediction sequence (the dotted lines correspond to the original plan without the expedited shipment).

Figure 34:
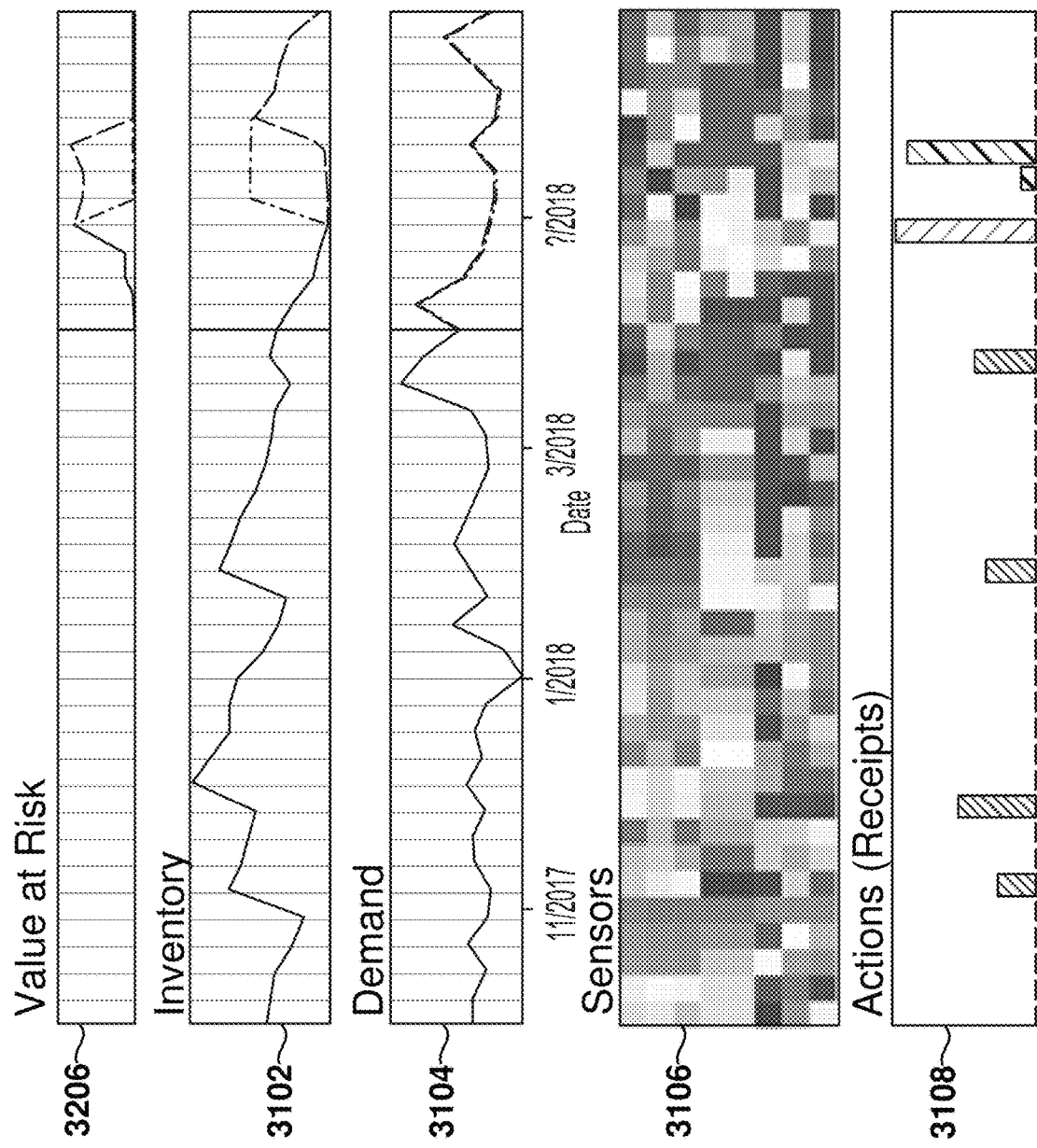

FIG. 34 illustrates taking an expedited shipment two weeks earlier than planned, according to some example embodiments. In this situation, it is assumed multiple shipments can be grouped into a single shipment and expedited further (in this example 2-3 weeks), and the predictions of the VAR 3206 show a drastic improvement as a result.

Figure 35:
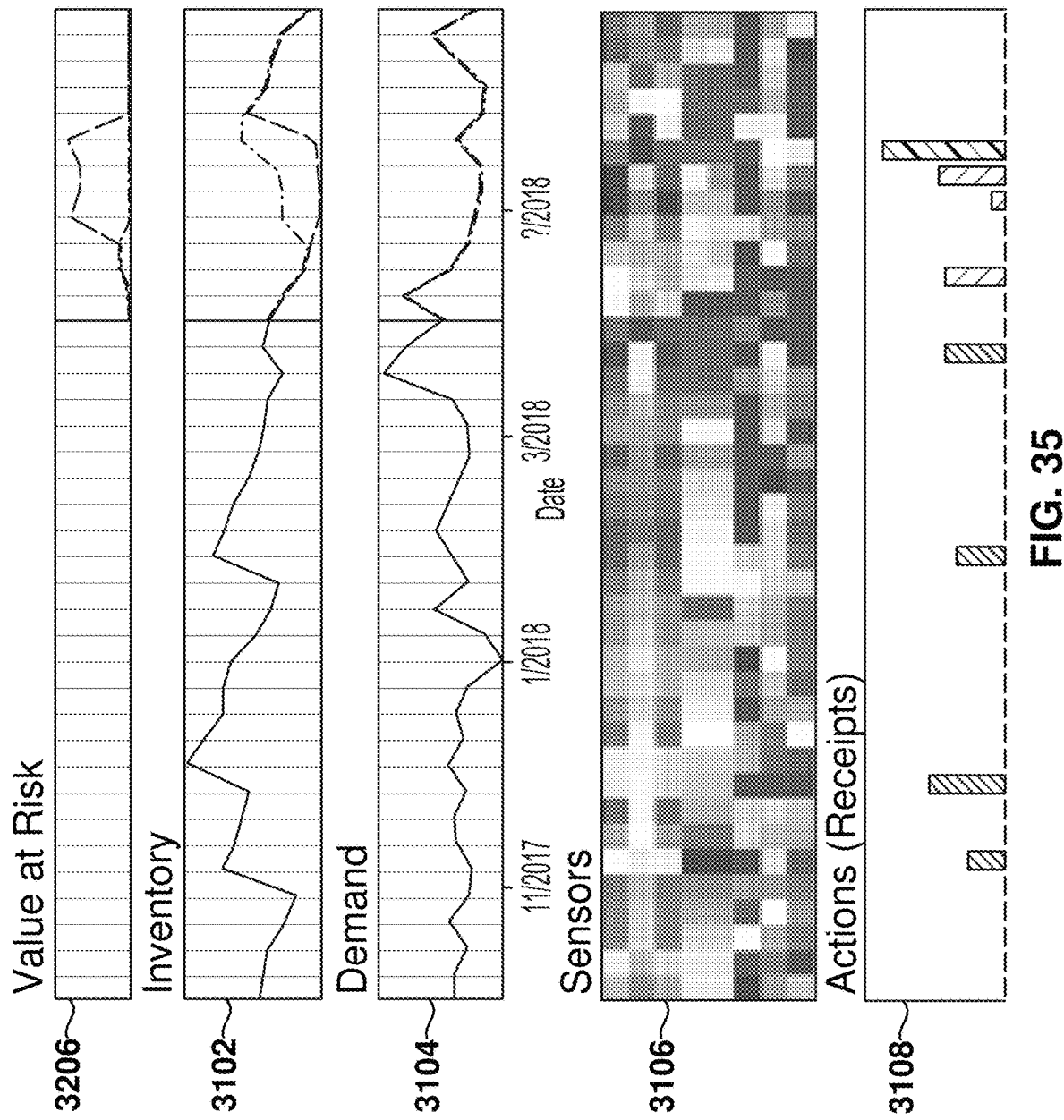

FIG. 35 illustrates taking a partial shipment earlier. The results showed that shipping partial amounts in advance, either through rebalancing of inventory over DCs or by advancing production, it is possible to reduce VAR even further.

As shown in these situations above, the DM controller will be able to optimize for a specific target variable (VAR) given real-world constraints (such as expedite, inventory reallocation, or production adjustments).

Figure 36:
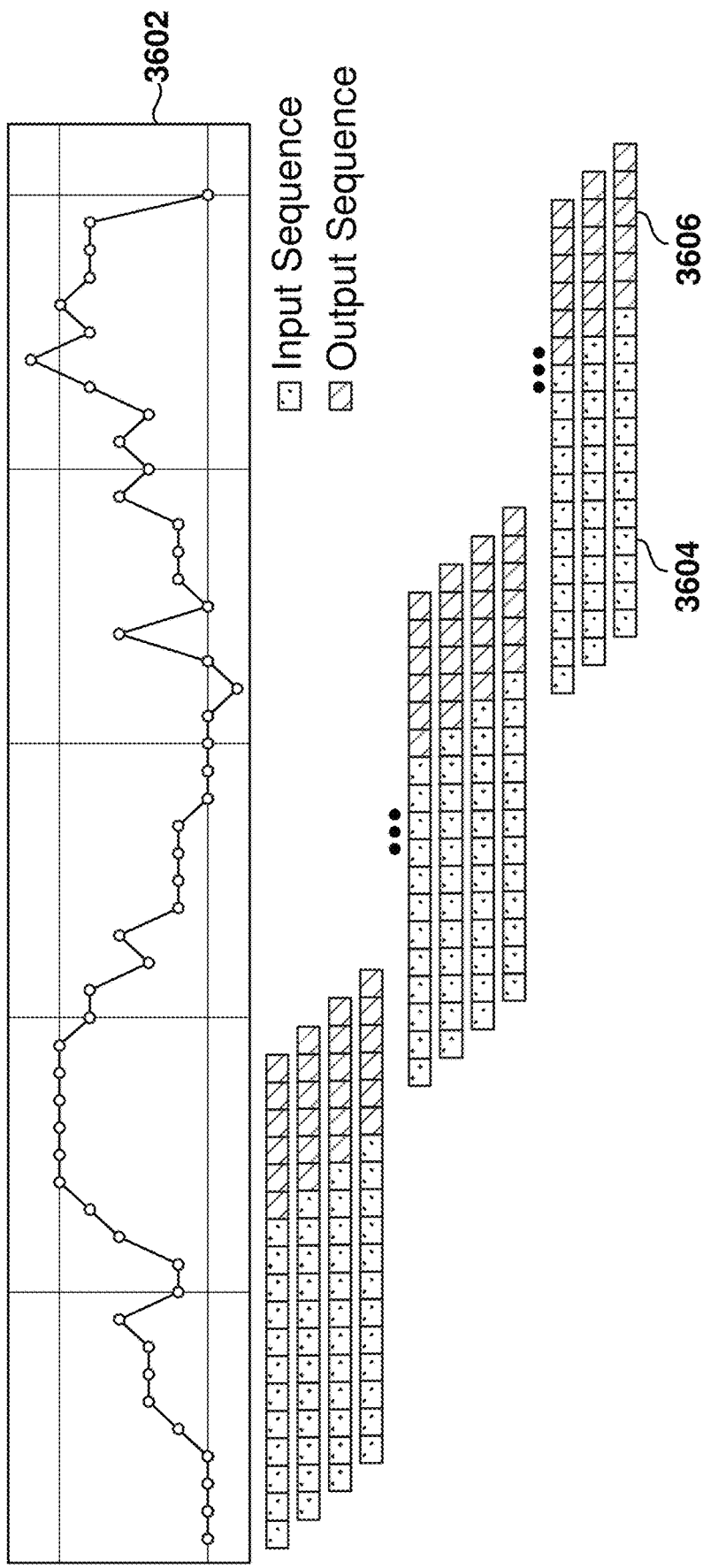
FIGS. 36-38B illustrate a use case for energy production and battery control, according to some example embodiments.
Figure 37:
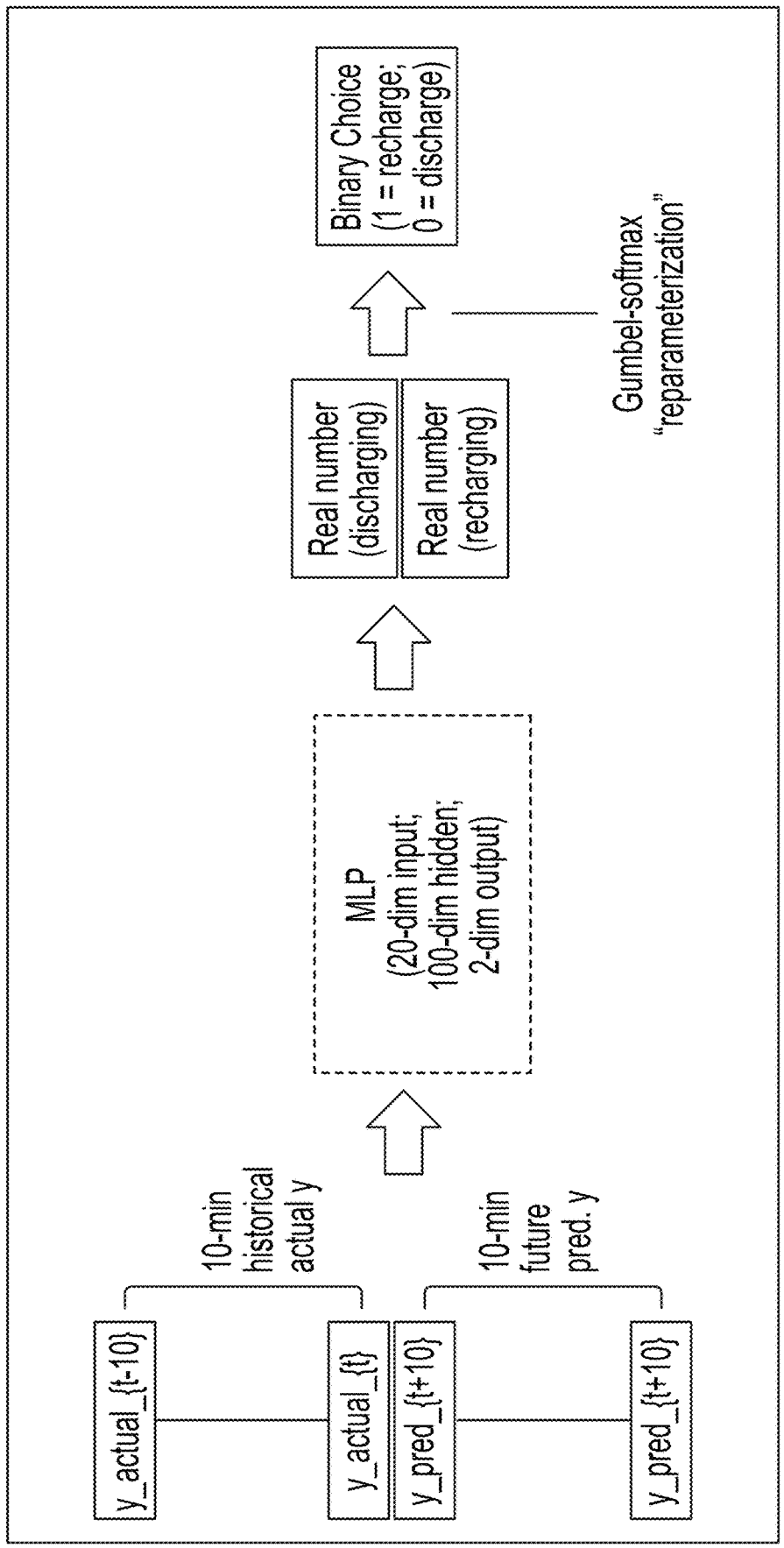

FIGS. 36-38 illustrate a use case for energy production and battery control, according to some example embodiments. We combine Deep Learning and Bayesian Inference to simulate the state of a dynamic process over a future time horizon (e.g., simulating 1-minute energy usage of a steel furnace over a future time horizon of 60 minutes). Then, we use Reinforcement Learning (RL) to recommend optimal actions to improve a KPI over that future horizon (e.g., controlling when a battery is recharging and discharging to avoid costly "peak energy" usage).

Steelmaking is an energy-intensive business, as it involves furnaces and equipment which consume large amounts of energy to melt scrap into molten steel and roll into steel coils. Most of the steel mills enter into special agreements with their energy providers for their electricity needs. In one example, the contract with the energy provider is designed in such a way that the steel mill is billed for both "Peak Demand" and "Energy Used." This presents a potential opportunity to optimize peak electricity usage so that the peak demand for a given month does not go over the contractual amount, which we call "peak shaving" scenarios. This application presents a compelling case on how optimizing energy consumption at steel mills can add value, both financial and environmental.

One technical problem to solve is to allow optimal decision-making and controls over time with the objective of shaving peak-energy usage. This is a highly complex problem to solve as it is a dynamic process that involves a complex system with multiple intercorrelated features. These processes have causal interactions represented as a set of dynamic stochastic variables such as actions, conditions, sensor observations, and target observations. We can apply the DPDM framework of the dynamic process modeling and control.

The steel plant includes a hot area and a cold area. The hot area includes an Electric Arc Furnace (EAF), a Ladle Metallurgical Furnace (LMF), a Continuous Caster (CCS), and a Hot Strip Mill (this). The cold area includes a Pickling Line (PL), a Tandem Cold Mill (TCM), a Galvanized Line (GL), a Batch Annealing Furnace (BAF), and a Skin Pass Mill (SPM).

EAF alone accounts for about 50% of the total energy consumption in the steel mill. This application focuses on getting energy predictions from EAF plants and recommending optimal battery actions to shave peak usage.

The datasets considered include the following:

Energy consumption (E)—Energy consumed by heat for EAF (one-minute level);

Scheduling (P)—Program sequence schedule, where the planned start times of programs for the EAF (heat-level);

Input materials (M)—Planned scrap combination, burner gas, burner oxygen quantities to be used for the heats in P (heat-level);

Target slab/coil specifications (C)—width, thickness, weight, plant details, steel grade, product type (heat-level);

Operator and shift details (O) (heat-level); and

Battery Actions (B) (1-minute level).

In one example, since there is no historical battery data, we set all battery actions to be "recharge" initially and then learn an optimal policy for using battery power in our simulation environment.

This application generates features (actions, conditions, sensors, and targets) from these components to optimize product quality. Table 3 below shows the features used for some embodiments:

TABLE 3

| Dataset | Variable | Type |
| --- | --- | --- |
| E | 1-minute Energy Consumed | Target (y) |
| E | Number of minutes since "Heat" start | Sensor (x) |
| E | Number of minutes since "Melt" start | Sensor (x) |
| M | Lime (catalyst) | Condition (c) |
| M | HBI Scrap | Condition (c) |
| M | Pig Iron Scrap | Condition (c) |
| C | Coil Thickness | Condition (c) |
| O | Outside Temperature (previous 2-day avg) | Condition (c) |
| O | Outside Precipitation (previous 3-day avg) | Condition (c) |
| B | Battery discharge/recharge | Action (c) |

FIG. 36 illustrates the sequence-two-sequence data preprocessing, according to some example embodiments. After joining the one-minute-level data (E, B) with the heat-level data (M, C, O), we have a continuous set of 1-minute observations with their associated 1-minute features and heat-level features. Once we have the observations that are going to be considered, we then focus on the features.

For each of the variables used, the information is prepared in a sequence of rolling arrays. Each array has a size equal to the number of past observations used plus the number of future observations that are going to be predicted. These numbers are selected considering both heuristics and the final objective of producing the best predictions possible.

FIG. 36 shows the plot 3602 of a random variable, considering that the past observations used per window 3604 are 12 and that the number of steps to be predicted 3606 is 6. Other embodiments may utilize different window sizes, such as in the range from 2 to 100.

Before using these sequences in the model, there is some preprocessing. One of the steps is to normalize the data because making mistakes here can hamper the performance of the model. This can be done across whole time series, but it may be better to implement it locally.

To perform this normalization, in some example embodiments, we took the median of every input sequence 3604 and used that value to divide both input and output sequences. Notice that this is done for every window separately. By doing this all sequences are leveled around 1 and each one of them is independent of each other. This technique allows the model to focus more on the general dynamics and trends of the plant and less on the level of each of the features, which will help us have better and more generalizable simulations.

Moreover, we develop a strategy to handle data quality issues specific to our deep learning models. In particular, we handle outlier detection and removal of sequences with any outliers, and missing data detection and removal and removal of sequences with any missing data.

The model used is the one illustrated, at least, in FIGS. 3, 11, and 12. In many enterprise processes such as energy prediction, the agent is not allowed to learn and optimize its decision-making or control policy through a lot of trials in the real environment. Generating the real-world experience data from executing numerous actions and conditions is very time-consuming, expensive and even dangerous when the input ranges happen not to be properly set. For this reason, it is very desirable to build a predictive simulation model using the historical process data that companies have accumulated. Then, simulated experiences for hypothetical actions and conditions enable the agent to make optimal decisions.

FIG. 37 illustrates the overall modeling strategy, according to some example embodiments. There are two steps in the modeling strategy: first, train the DP model, and second, train the DM model (using the trained DP model).

In particular, the DP Model learns to take historical sequences as input and generates state predictions over a future time horizon. For each batch of data, we calculate two sources of loss:

1) Mean Squared Error (MSE) between the predicted state (x,y) and the actual state (x,y) for each timestep along the future time horizon (which ensures getting better at predicting the future state; and 2) the KL Divergence loss between the prior and the posterior (which ensures we do not deviate too far from our prior beliefs). We combine these two objectives into a single loss function, which we optimize through backpropagation for each batch of data. We go through all of the data in the training set and also acquire performance on a separate validation set, and repeatedly go through the training data for 10 epochs. This optimization process gives us well-constrained, regularized predictions of the future state (x,y).

We checkpoint each of the candidate models across a variety of hyperparameter settings (e.g., learning rate, batch size, dropout ratio, etc.), and use the performance of our model on the validation set to select our best performing DP Model, which we can use to successfully predict the future state.

The DM model uses the following operations:

Define a DM controller

MLP with single hidden layer (input size=20; hidden size=100; output size=2)

Get actual x and y for the input sequence (e.g., 120 mins)

Get predicted x and y for the output sequence (e.g., 60 mins; using trained DDM)
Train the controller
    For each time-step in the output sequence
        State=[10-min historical actual y, 10-min future predicted v]
        Actions=controller(state) #outputs 2-dim real-valued vector
        Actions=gumbel-softmax(actions) #outputs 1-dim binary choice (discharge battery or recharge battery)
        Physics-based-logic
        Calculate loss for current time-step
    Backpropagate the loss over entire output sequence Once we have a trained DP Model, we can begin the second step: train a DM Model (using the trained DP Model). We load the trained DP Model, and feed it a historical input sequence as input, and it produces predictions of the future state (x,y) over a future time horizon (e.g., sixty one-minute intervals=60 min.).

We define the DM Model as an MLP with 20-inputs (ten-minute historical actual Y, ten-minute future predicted Y), which outputs a 2-dimensional output, representing each of our action choices: "recharging" or "discharging" the battery. In some example embodiments, we apply a "gumbel-softmax" approach to take the continuous values from our controller and convert them to discrete choices.

The objective of the DM Model is to recommend discrete choices ("recharging" or "discharging" the battery at any timestep) to minimize some objective, which in one example is a 15-minute cumulative energy usage exceeding a "peak" threshold (30000 KWh). We also have some physics-based knowledge about the battery: 1) the capacity of the battery (35000 KWh); and 2) how much our battery can recharge and discharge each minute (500 KWh).

In other words, when we decide to "recharge" the battery at any timestep, we take 500 KWh from the grid and put it into the battery; conversely, when we decide to "discharge" the battery at any timestep, we take 500 KWh from the battery and "shave" the energy from our prediction. We have named the process of accounting for the battery's physical properties: "physics-based logic".

The physics-based logic includes simple logic defining what discharging and recharging means. Discharging means that if the battery has capacity (e.g., battery level >0 kW) then we perform the following operations: subtract a maximum of 500 kW from the battery, and subtract 500 kW from the predicted y. In other words, we use the battery power instead of the grid power.

Recharging means that if the battery is not full (e.g., the battery level <35000 kW), then: add a maximum of 500 KW to the battery and add 500 kW to the predicted y. In summary, use grid power instead of battery power.

There are two loss objectives: generate energy savings and ensure that the battery has enough capacity. To generate energy savings, consider that the threshold is 30,000 kW, the goal is that the modified "shaved" predictions for y should be below the threshold, and the savings are equal to the amount the "unshaved" actual values for y that exceed the threshold.

In summary, the DP Model can predict the future state over the next 60 minutes, and the DM Model can recommend actions at each step (e.g., "discharging" or "recharging" the battery) to ensure that the "shaved" 15-minute cumulative energy usage does not exceed the peak threshold. We define our loss in terms of the amount of energy that exceeds the peak threshold, which we can optimize, as we did before, through backpropagation.

Figure 38A:
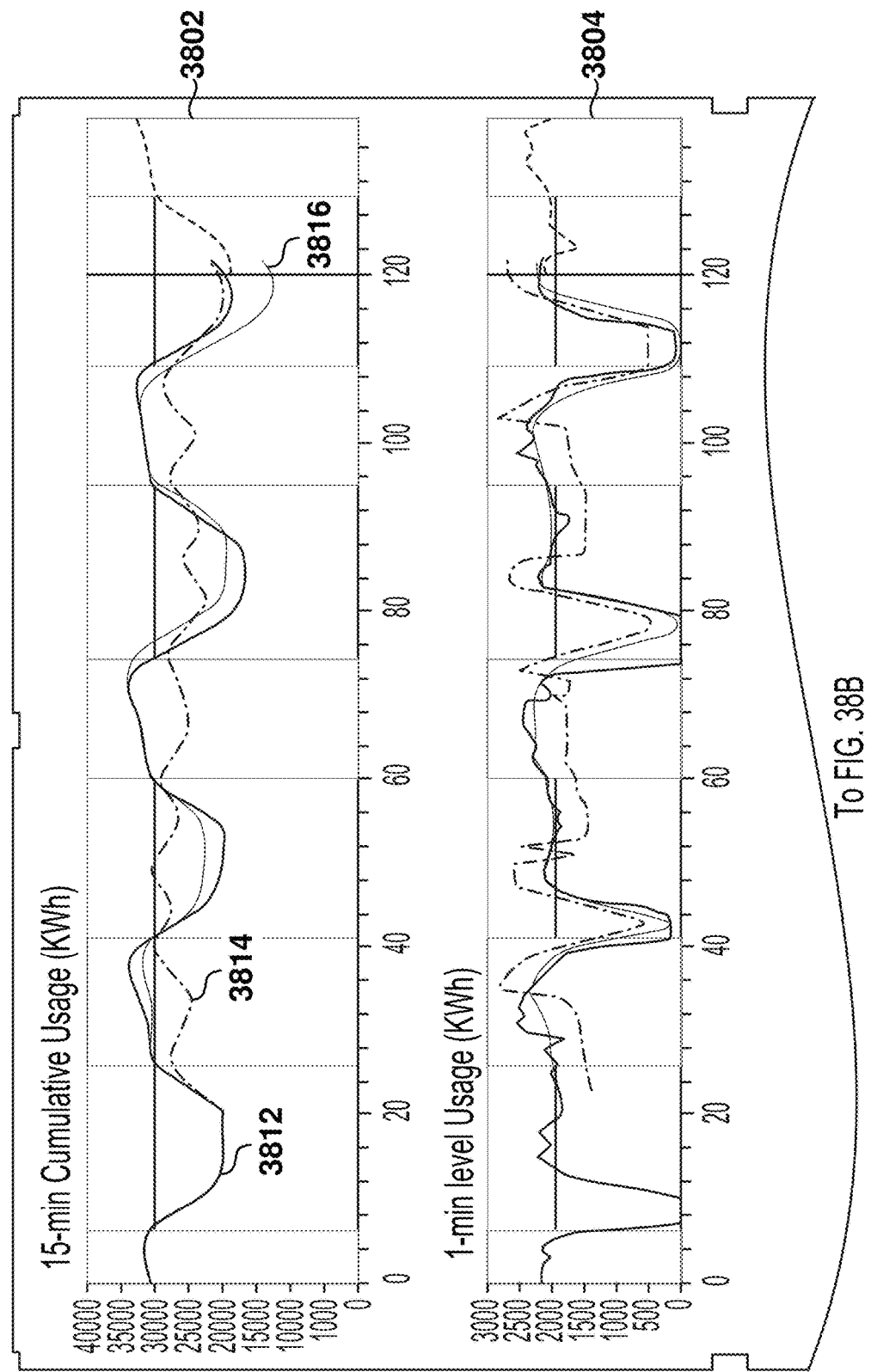
Figure 38B:
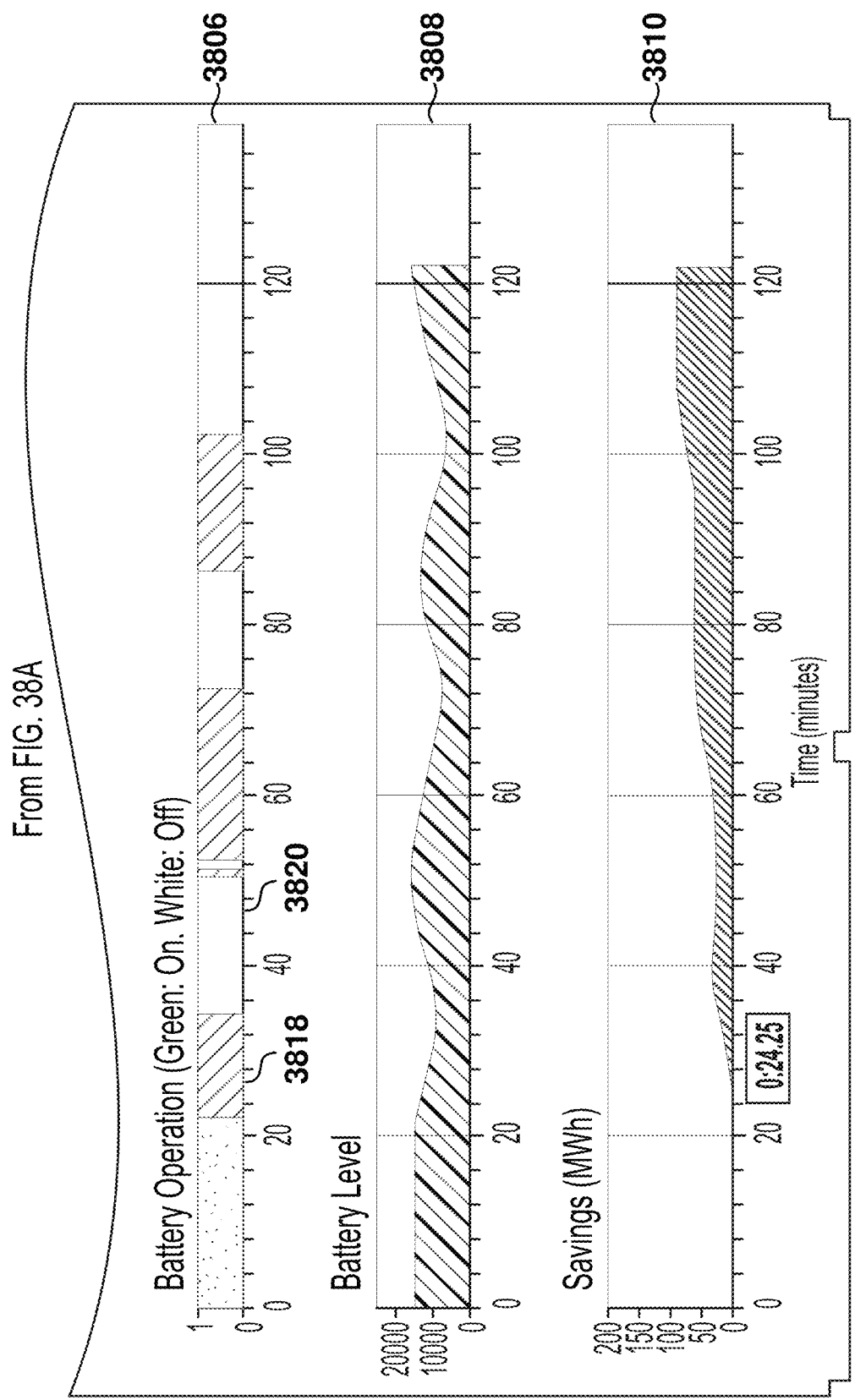

FIGS. 38A-38B illustrate some of the results, according to one example, showing the avoidance of peak-usage periods. Chart 3802 shows the 15-minute cumulative usage over time and includes line 3812 for the original usage without battery operation, line 3816 for the predicted (unshaved) usage, and line 3814 shows the energy usage when utilizing batteries.

Chart 3804 shows the one-minute level usage, and chart 3806 shows the battery operation with on periods 3818 and off periods 3820. When the battery is on, the battery is providing energy to the heats. Further, chart 3808 illustrates the battery level, and chart 3810 illustrate the savings when utilizing the recommended battery usage.

FIGS. 39-44 illustrate a use case for product quality AI (PQAI) for open-loop control, according to some example embodiments. One objective is to predict quality properties of manufactured parts and recommend actions that can optimize quality.

DPDM framework predicts quality target variables based on a high-accuracy plant simulation model leveraging historical action, condition, sensor and target data. The system enables the user to causally simulate the quality distribution for different actions (e.g., process settings) and conditions (e.g., product types). The system also recommends optimal actions to improve the quality distribution that are closer to the defined target and with a lower standard deviation.

DPDM is useful for open-loop, batch quality improvement, such as PQAI. The inputs include historical raw material composition and batch/unit-level process parameters (static variables aggregated from time series) vs. the measured quality parameters.

The outputs include batch-level recommendations for raw material composition and process parameters to improve quality distribution of future batches.

DPDM in open loop is applicable to situations where quality cannot be measured and fed back in real-time, or when the plant cannot tolerate oscillating settings (e.g., mold width at a steel caster).

In general manufacturing processes, manufacturers are expected to produce parts that meet certain quality specifications. For instance, steel manufacturers are expected to produce rolled coils of steel that meet certain yield, tensile, and elongation (YTE) properties for their customers. These YTE properties characterize the quality of the steel produced. If the coils do not meet these requirements, the manufacturer will not be able to sell the coils to their customers because the customer will be unable to use the coils in their applications (e.g., construction). This means losses for the steel manufacturer.

Typically, manufacturers achieve these specifications through closed-loop, deterministic systems, where an input is received in an automated process (e.g., a yield setpoint) and certain parts of the production process (e.g., temperature setpoints to achieve the yield) are deterministically adjusted. These systems are not responsive to stochastic changes in the production process and can often yield significant errors in quality properties.

Others have attempted to use typical machine learning approaches, which predict some targets (y) from features (e.g., predicting the target "yield" from features). The features may include variables that are set in advance and actionable (a), conditions that are set in advance and not actionable (c), and sensors which are not set in advance and not actionable (x). Typical machine learning approaches treat x, a, and c as equal; therefore, they cannot distinguish the causality between a and y.

Causality is important in the context of steel-making because the steel manufacturer is often interested in knowing how to select open-loop actions that optimize their YTE properties. Moreover, these typical machine learning approaches do not incorporate estimates of uncertainty into their predictions, so it is impossible for the manufacturer to assess how sure they can be in the actions recommended.

The DPDM approach addresses these issues by differentiating the features into a, c, and x by specifying a causally-valid model such that the steel manufacturer is informed on how changing certain open-loop actionable features (a) will causally change YTE properties (v). Moreover, we capture uncertainty by incorporating latent variable layers, such that steel manufacturers can know how certain they can be that changing an actionable feature (a) will affect YTE properties (y).

As discussed earlier, the steel plant includes the hot area and the cold area. The hot area includes HSM, and the cold area includes PL, TCM, GL, BAF, and SPM. DPDM generates features (a, c, x, and y) from these components to optimize Product Quality.

The data sets considered include scheduling (p), actual measurements (m), and target slab and coil specifications (c). Scheduling includes the coil sequence schedule with set points for properties in the hot area and the cold area. The actual measurements include the coil observed measurements for properties in the hot area and the cold area. Further, the target slab/coil specifications include width, thickness, weight, plant details, steel grade, product type, yield, tensile strength, and elongation.

Figure 39:
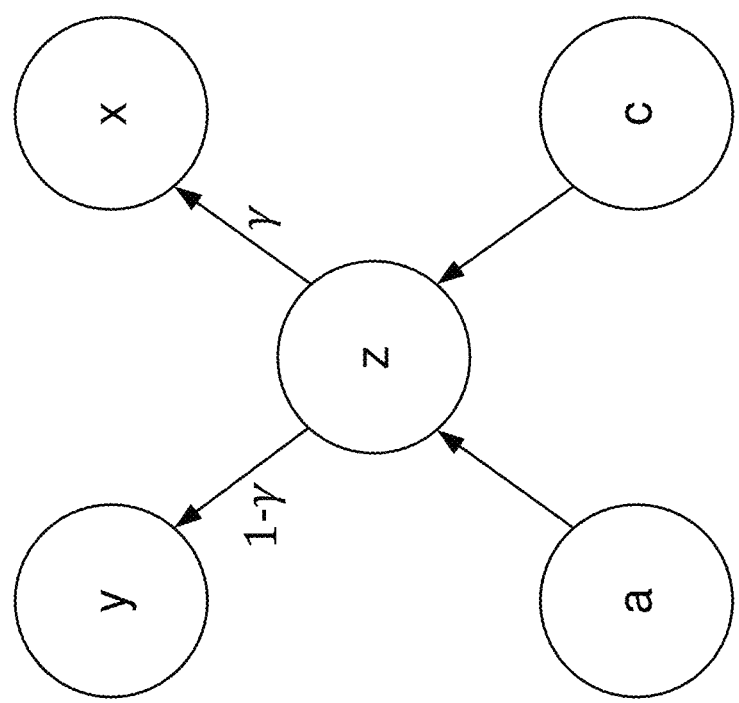
FIGS. 39-44 illustrate a use case for product quality AI (PQAI) for open-loop control, according to some example embodiments.

FIG. 39 illustrates the open loop version of DPDM or the "Static DPDM", according to some example embodiments. Static DPDM means that there is only one state in the sequence. Static DPDM can achieve causally-valid predictions and decisions in open-loop control situations.

The Static DPDM provides a theoretically grounded solution to build a causally-valid model in the open-loop decision situation for sample observations involving action inputs, condition inputs, sensor outputs and target outputs.

For example, suppose that an AI system optimizes the mechanical qualities (target output variables) of produced coils in a steel mill by controlling action input variables such as set-point coiling temperatures for coils in each product category condition (e.g., different grades, hot/cold rolled). There are also sensor output variables such as actual-measured coiling temperatures and different zone temperatures over the process line. The "static" regression setup for predicting the mechanical qualities might mistakenly use as features the aggregated values of all sensor output variables and action input variables. That is, it does not properly distinguish sensor output variables from action and condition input variables, using all of those variables as features to be fit and associated with the target variables.

Even for a regression model with high fitness under this setup, this is not a causally actionable model due to the use of sensor output variables as features. First, sensor output variables are not available at the time of the target prediction, unless these are separately predicted earlier. Second, sensor output variables tend to be multi-collinear or correlated with other inputs such as action variables, so it's likely that the regression incorporating both sensor outputs and action inputs would underweight action variables that are actually causal.

Static DPDM is a deep probabilistic latent variable model that generates (or predicts) both sensor and target outputs based on action and condition inputs. Based on the deep generative modeling approach, we compress multi-collinear variables into probabilistic latent variables (Bayesian prior and posterior states). The prior state is represented based on only action and condition inputs, whereas the posterior state is on all inputs and outputs. Also, probabilistic latent variables capture the model uncertainty when the given inputs are not sufficient to estimate the underlying process state and predict the outputs (e.g., some input/output variables are missing in a partially-observed environment, the input/output data are not enough, and/or there are inherent stochastic process noises affecting outputs).

Predictively generating not only the target outputs but also all sensor outputs enables the latent representation to exploit the causal relationship between inputs (conditions and actions) and all outputs of sensors and targets.

In the model training phase, sensor outputs serve as additional labeled data to be predicted besides target outputs. The prior latent state function is trained taking only actions and conditions into account, in addition to the posterior latent state function based on all actions, conditions, sensors and targets. The prior and posterior latent states are constrained to be similar. That is, the prior latent state distribution for given actions and conditions is similar to the average of posterior latent state distributions of sample observations with those actions and conditions. This guides the prior latent state (i.e., the process state estimated before observing actual outputs) to contain the key compressed information for predicting outputs for any given action and condition combinations in the model testing phase.

The features are then separated into categorical and continues variables, which get pre-processed separately. The continuous variables get scaled using a Min Max Scaler, so all the input features are on the same scale from 0 to 1. This is valuable for learning deep networks because it ensures that the gradients of the network do not increment features unevenly based on their scaling.

Further, the categorical variables get processed using a label encoder, which takes categories and converts them to ordered numerical representations (e.g., if a column contained "Apple" and "Oranges", they would be converted to numerical representations "0" and "1"). This ensures the categorical features are prepared for the embedding layers in the neural network.

We want to predict target outputs (v) for sensor outputs (x), action inputs (d), and condition inputs (c). An incorrect way to build a causally-actionable model, to simulate the effect of changed actions under different conditions, would be to build the regression function as y=function (a, c, x), because x (sensor outputs) have not been measured yet when predicting y.

The following criterion is maximized to estimate the probability models of $p_{\theta_x}(x|z)$, $p_{\theta_y}(y|z)$, $p_\phi(z|x,y,a,c)$, $p_\psi(z|a,c)$ for the training data of $(x,y,a,c)$ samples.

$$J_{\gamma VIB} = \mathbb{E}_{p(x,y,a,c)}[\mathbb{E}_{p_\phi(z|x,y,a,c)}[\gamma \log p_{\theta_x}(x|z)+(1-\gamma)\log p_{\theta_y}(y|z)]-\beta KL[p_\phi(z|x,y,a,c)\|p_\psi(z|a,c)-\beta KL[p_\phi(z|\hat{x},\hat{y},a,c)\|p_\phi(z|x,y,a,c)]]],$$ where $\gamma$ and $\beta$ are hyper-parameters.

During a prediction, for any given a and c, the following operations are performed:

Estimate the latent state prior $z^{prior} \sim p_\psi(z|a,c)$;

Estimate the prior estimates of x and y based on $z^{prior}$, where $x^{prior} \sim p_{\theta_x}(x|z^{prior})$, and predict $y^{prior}$ $p_{\theta_y}(y|z^{prior})$;

Estimate the latent state posterior $z^{post} \sim p_\phi(p(z|x^{prior}, y^{prior},a,c)$; and Predict x and y based on $z^{post}$, where $\hat{x} \sim p_{\theta_x}(x|z^{post})$, and predict $\hat{y} \sim p_{\theta_y}(y|z^{post})$.

The modeling strategy includes building DPDM that takes in the following inputs:

Actions (a): Actionable, Planned values from Hot/Cold Mill from Dataset-P; and

Conditions (c): Planned values from Hot/Cold Mill from Dataset-P, in addition to Planned properties from Dataset-C (e.g., Steel Grade).

Further, DPDM generates the following outputs:

Targets (y): Yield, Tensile Strength, and Elongation from Dataset-C; and

Measurements (x): Actual values from Hot/Cold Mill from Dataset-M.

The models are optimized in terms of their ability to predict targets and measurements based on the mean absolute error (MAE) and the mean absolute percentage error (MAPE). The best candidate predictive model is used to build a series of intervention and counterfactual tests (e.g., "do" something else with the actions, and observe what happens to the targets) to recommend optimal actions.

Figure 40A:
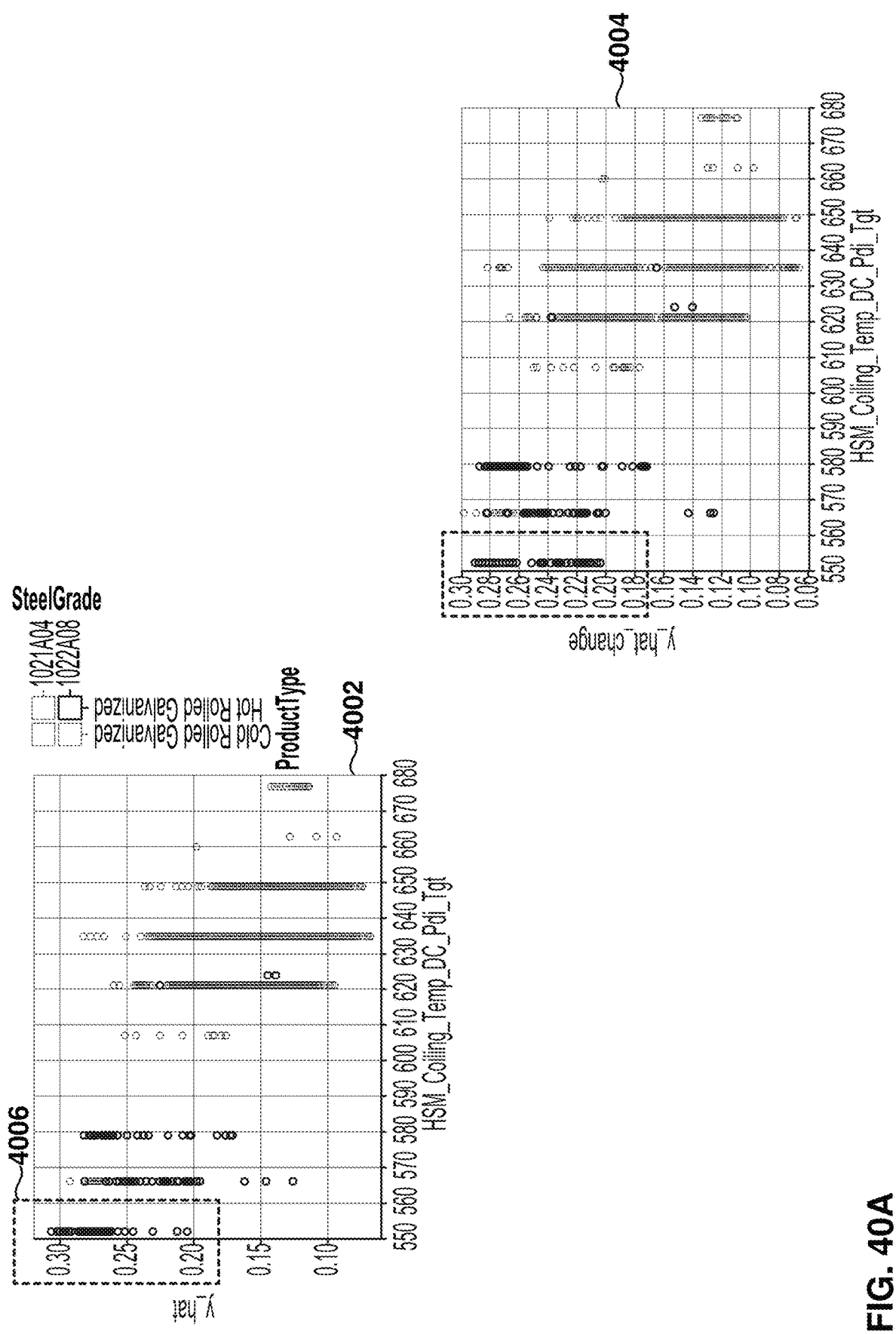

FIG. 40A illustrates some of the results, according to some example embodiments. Charts 4002 and 4004 show the yield error prediction according to coiling temperatures. For the highlighted "constraint" 4006, (Steel Grade x Product Type), low "Coiling Temperatures" results in higher ŷ (e.g., yield error prediction).

We set the group with low PDI "Coiling Temperatures" (i.e., 550) to higher values within a "safe" range (i.e., 580), and reduced the Yield Error predictions from 0.14 to 0.10. This illustrates using one action for development; DPDM model is capable of incorporating multi-dimensional actions and exploring combinations that have not yet been explored.

Figure 40B:
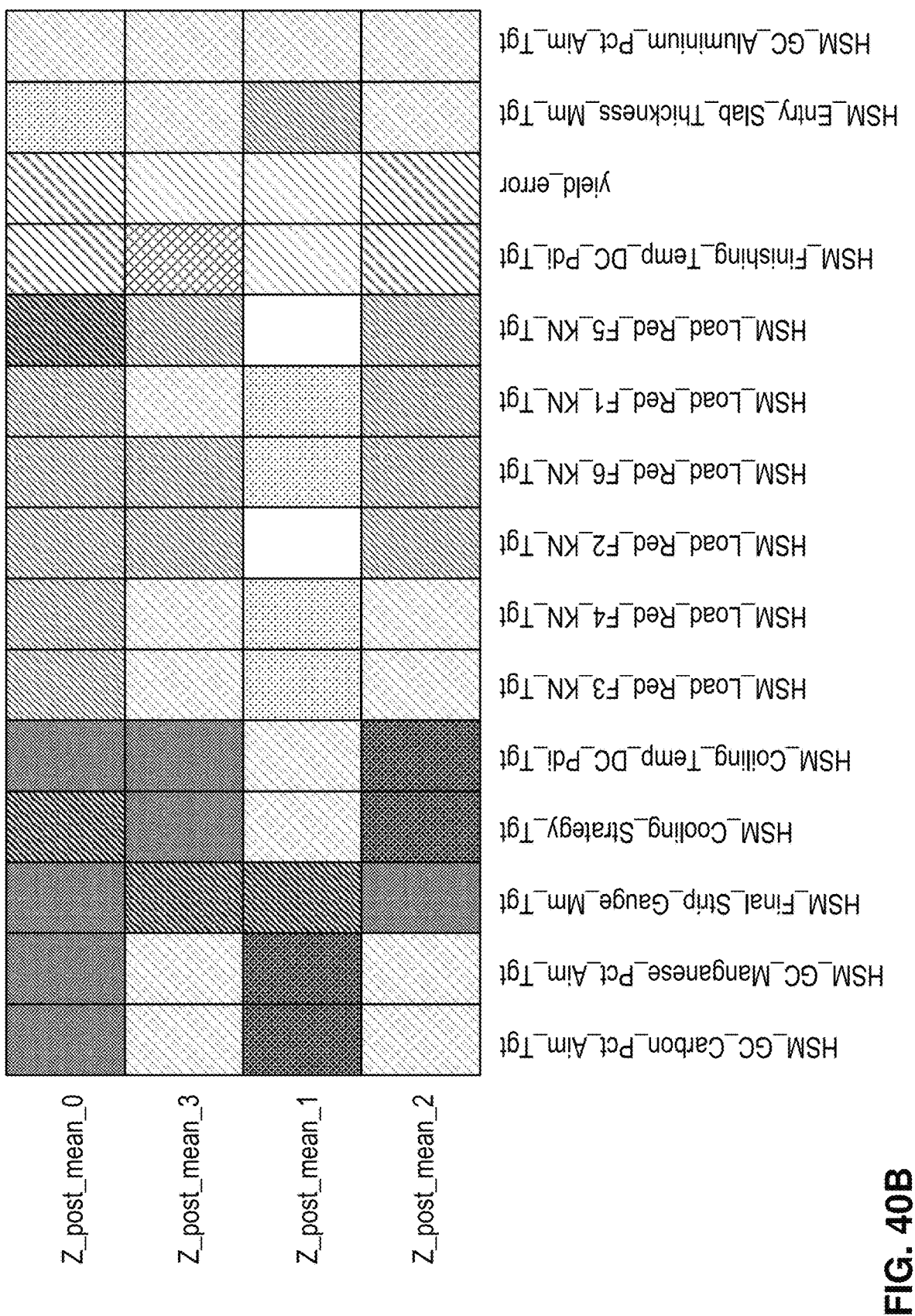

FIG. 40B is a correlation heatmap showing the causal correlations between the latent states (Z0, Z3, Z1, Z2 from top to bottom) and the original variables (conditions, actions, sensors and target (=yield_error)) from the Static DPDM. Latent variables compress the original variables in causally actionable way.

First, Z2 (bottom row) captures key correlated actions (strip gauge setpoint, coiling temp setpoint, cooling strategy) related to the target variable. These features have negative causal relationship with the target variable (=yield_error) through Z2. By changing these features in counterfactual what-if simulation, we can expect changes to our eventual target.

Second, Z1 (second to last row) captures many of the correlated chemistry properties, so if we would like to simulate what some of our data points would look like if they had different chemical properties, we could simply modify this Z1 dimension (what-if simulation analysis).

Figure 41A:
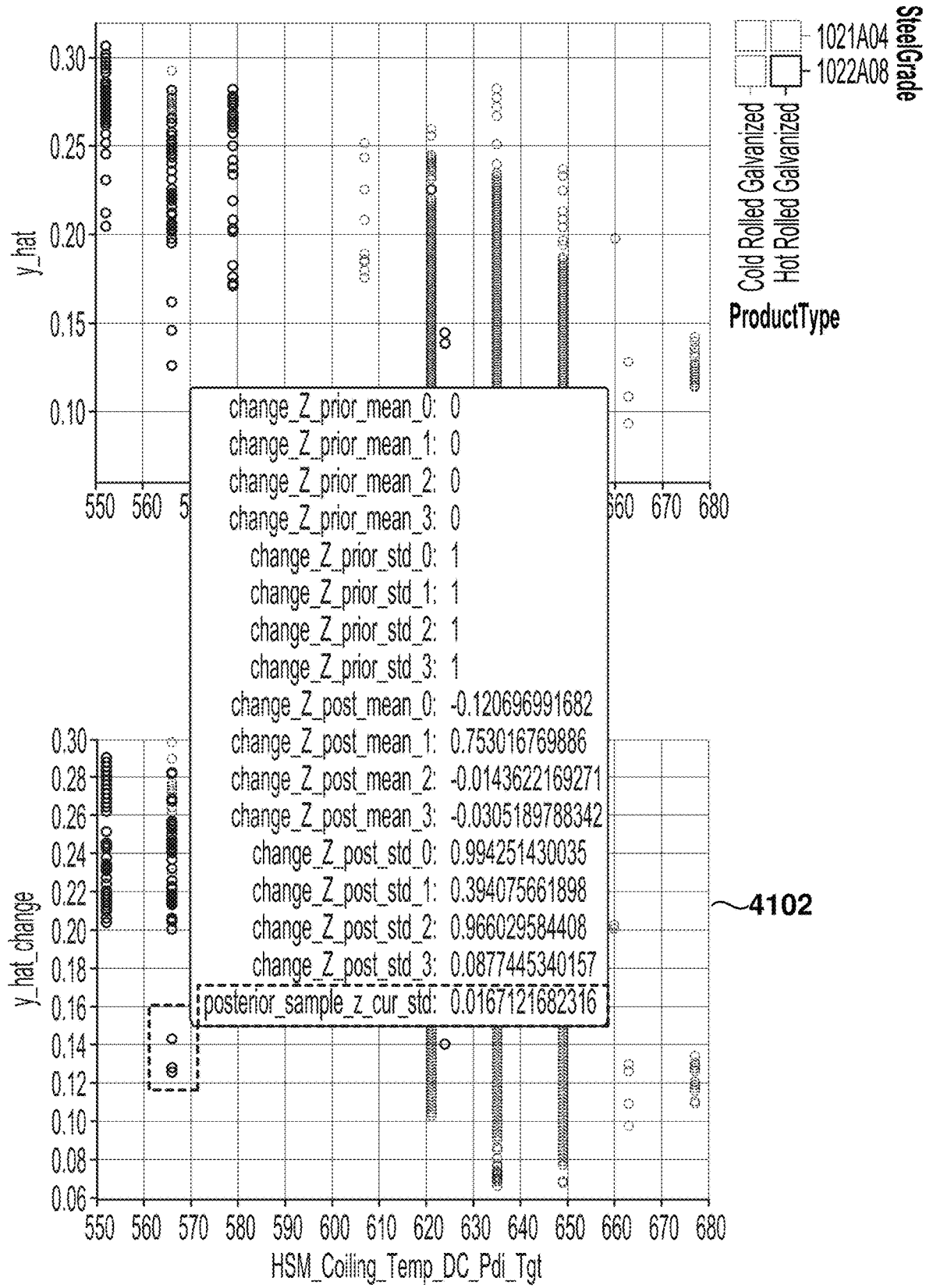
Figure 41B:
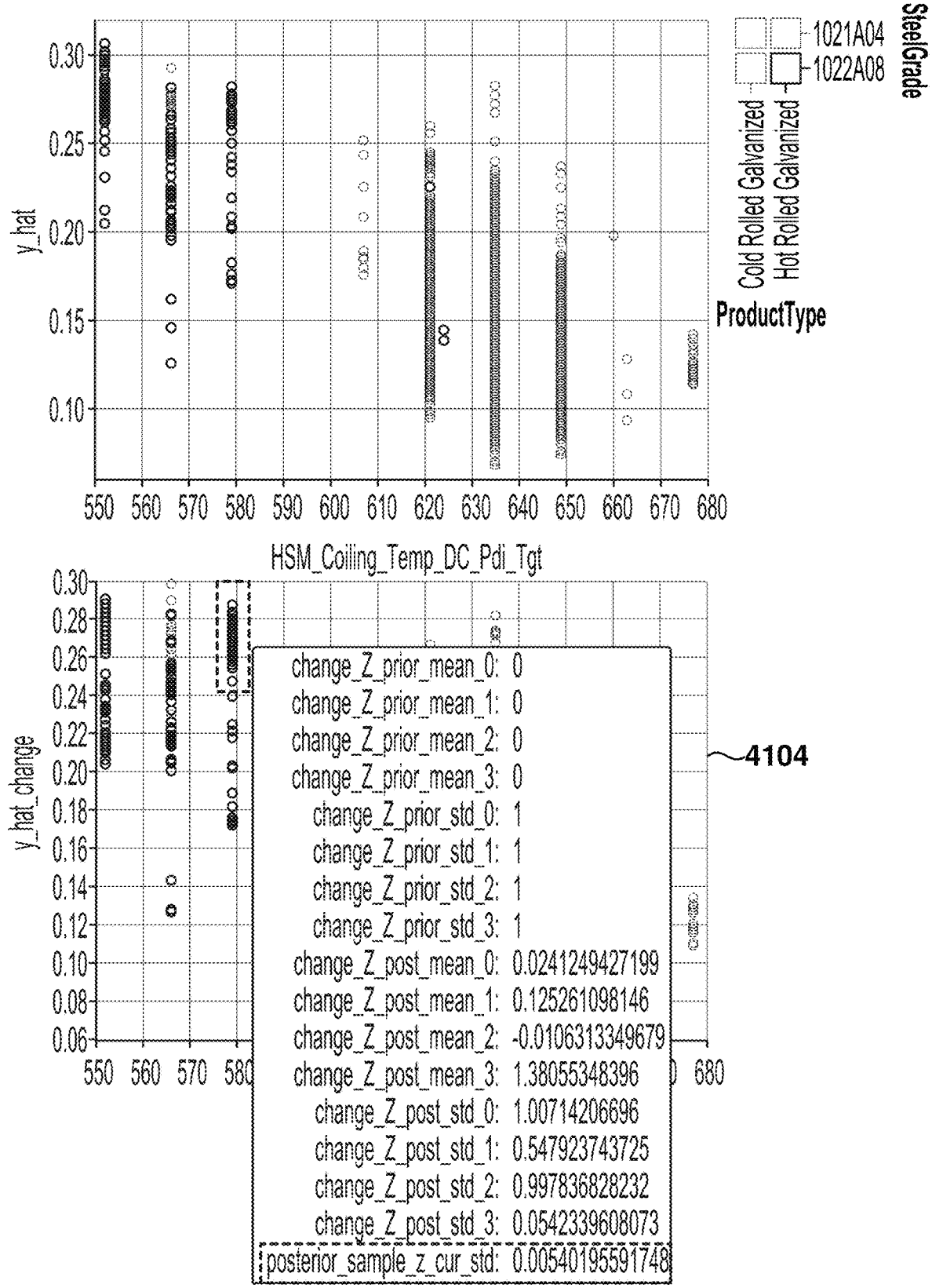

FIGS. 41A-41B illustrate the user interface for uncertainty estimates, according to some example embodiments. Chart 4102 shows more uncertain (or higher standard deviation) when the number of samples in a similar situation is small. Chart 4104 shows less uncertain (or lower standard deviation) when the number of samples in a similar situation is large.

Figure 42:
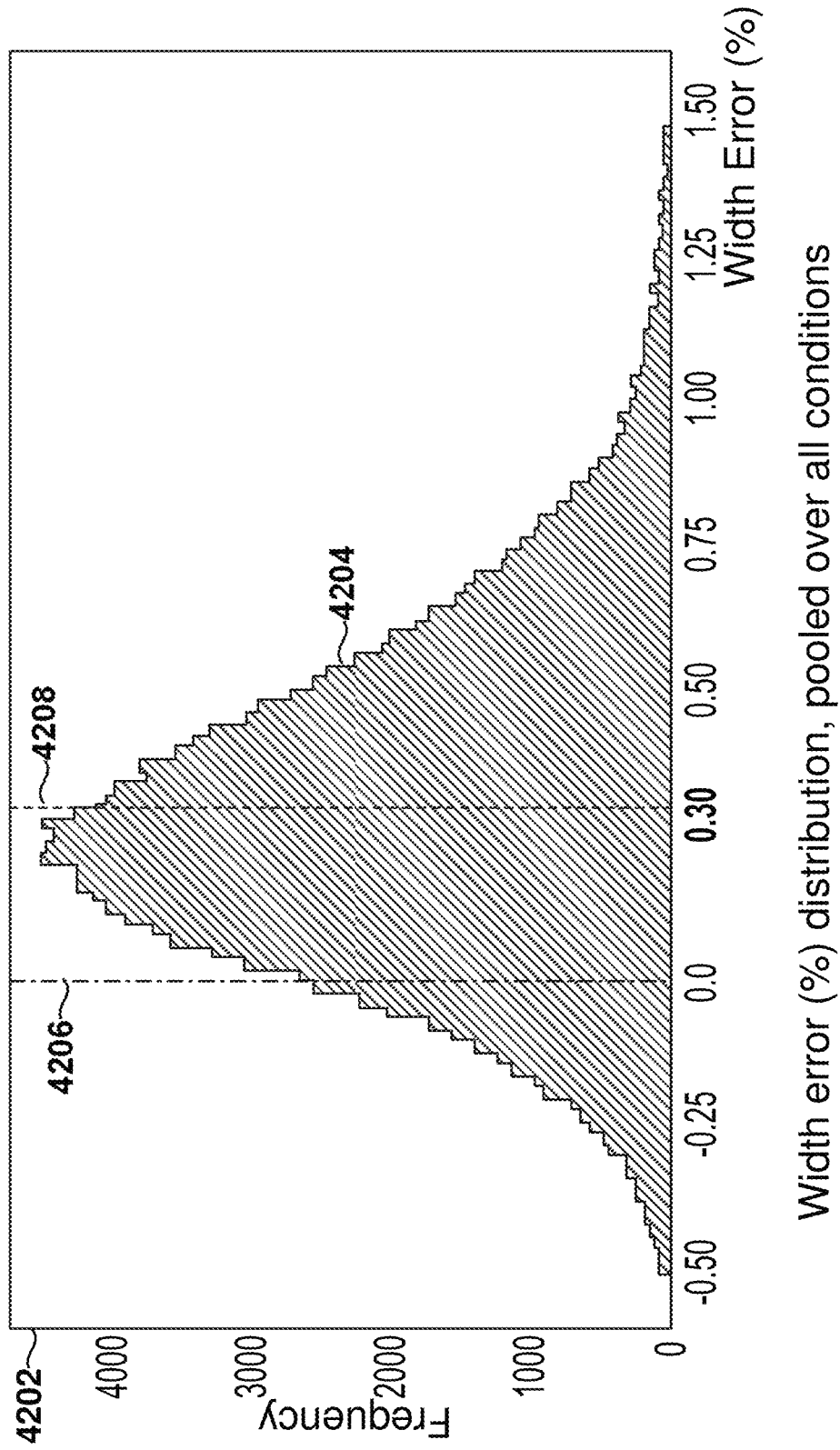

FIG. 42 is a chart 4202 showing the width error percentage distribution 4204, pooled over all the conditions, according to some example embodiments. The product conditions include aimed width, aimed thickness, aimed finishing temperature, and grade.

A steel manufacturer wants to make the precise control of the produced coil width by using the best ranges of the control inputs such as Top-of-Copper width and spray water flows for different coil product conditions. The product conditions are given by the various combinations of aimed width 4206, aimed thickness, aimed finishing temperature, and grade. To achieve this goal, we can predict the produced coil width for different control input values in various production conditions.

Then, we can use this predictive simulation model to recommend the best input ranges for producing the aimed coil width. For a given product condition, the width error is equal to the actual width minus the aimed, and the result divided by the aimed width of all coils. The chart shows the aimed width 4206 and the current median width 4208. The width error distribution pooled over all conditions shows the mean positive error 4208. The goal is to make the mean error getting closer to zero and reduce the variance of the width error distribution.

Figure 43A:
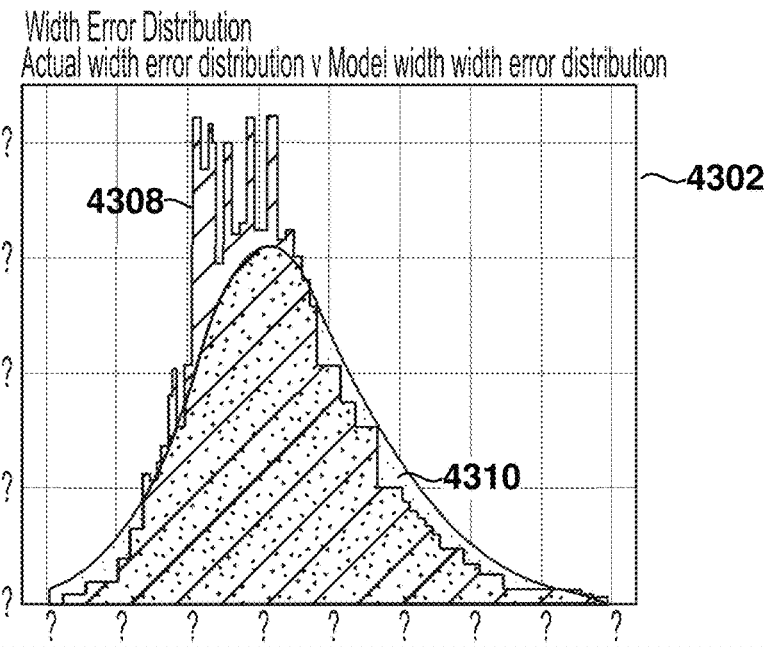
Figure 43B:
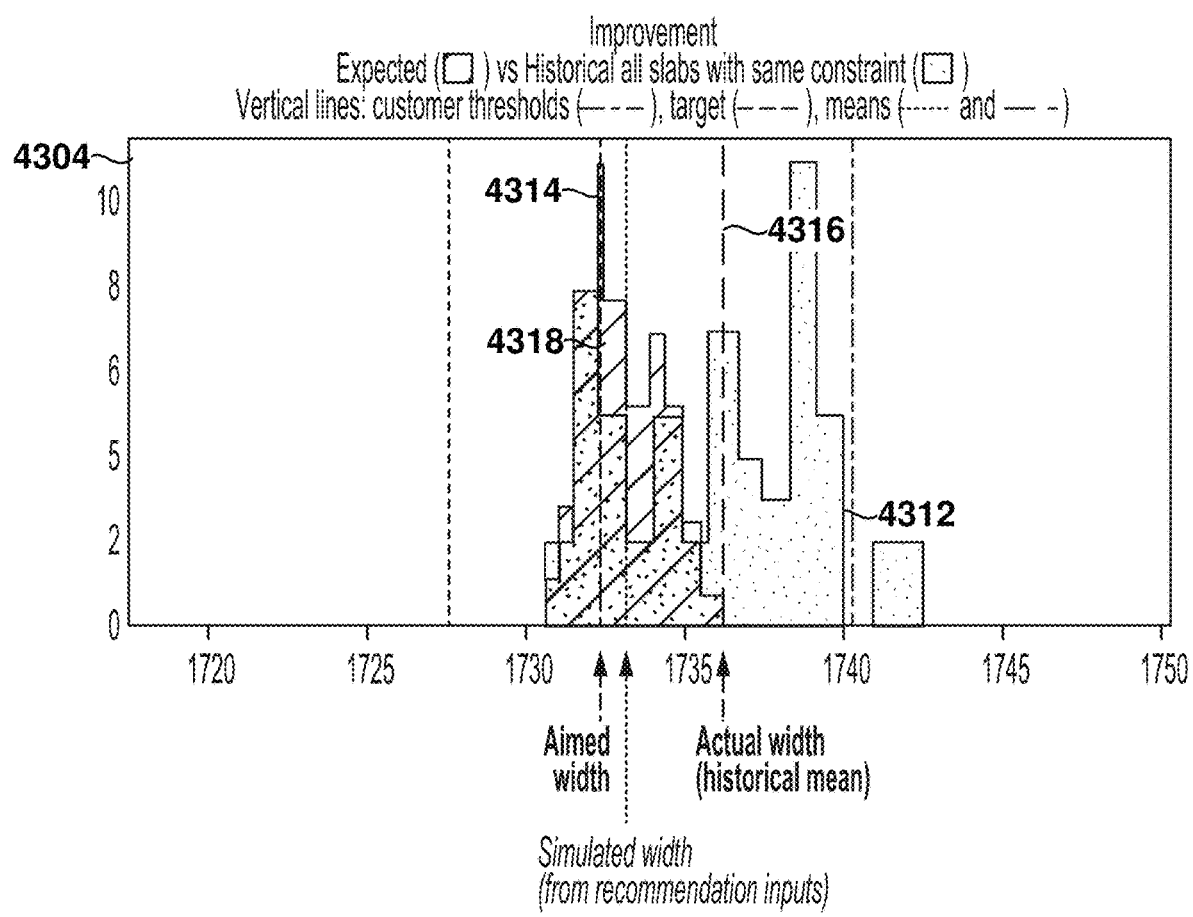

FIG. 43 shows results of the use of DPDM for width control, according to some example embodiments. DPDM recommends the best input ranges to achieve the aimed width objective.

Chart 4302 shows the predicted width error distribution 4308 based on the counterfactual simulations for the historical samples with the recommended inputs, which is expected to produce a lower mean width error closer to 0 and lower variance, compared to the actual width error distribution 4310.

Chart 4304 shows, for a specific condition, the simulated width distribution. Area 4312 is the historical actual width, and vertical line 4314 is the aimed width. Line 4316 shows the actual historical mean width. Line 4318 shows the simulated width from the recommendation inputs. The simulated width distribution 4318 produces a much closer mean to the aimed width 4314 than the historical actual width. It also has a much smaller variance than the historical actual variance.

Table 4306 shows a comparison of the actual width and the model width for the mean and standard deviation. Table 4306 also shows the improvement of the width with the model recommendations.

Figure 44:
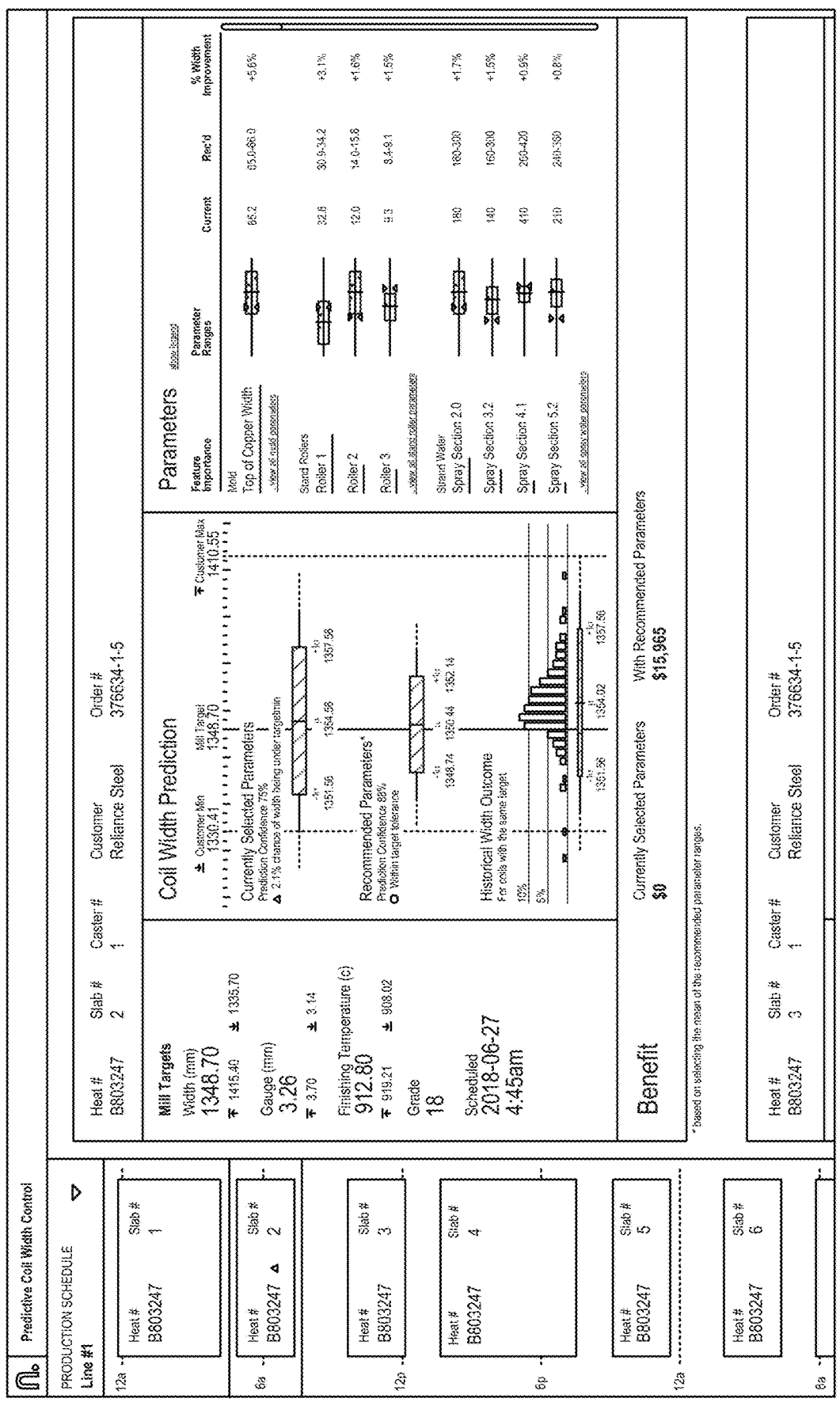

FIG. 44 shows a user interface for setting modelling parameters and observing the results, including the comparison of the actual with the predicted values of the parameters.

Figure 45A:
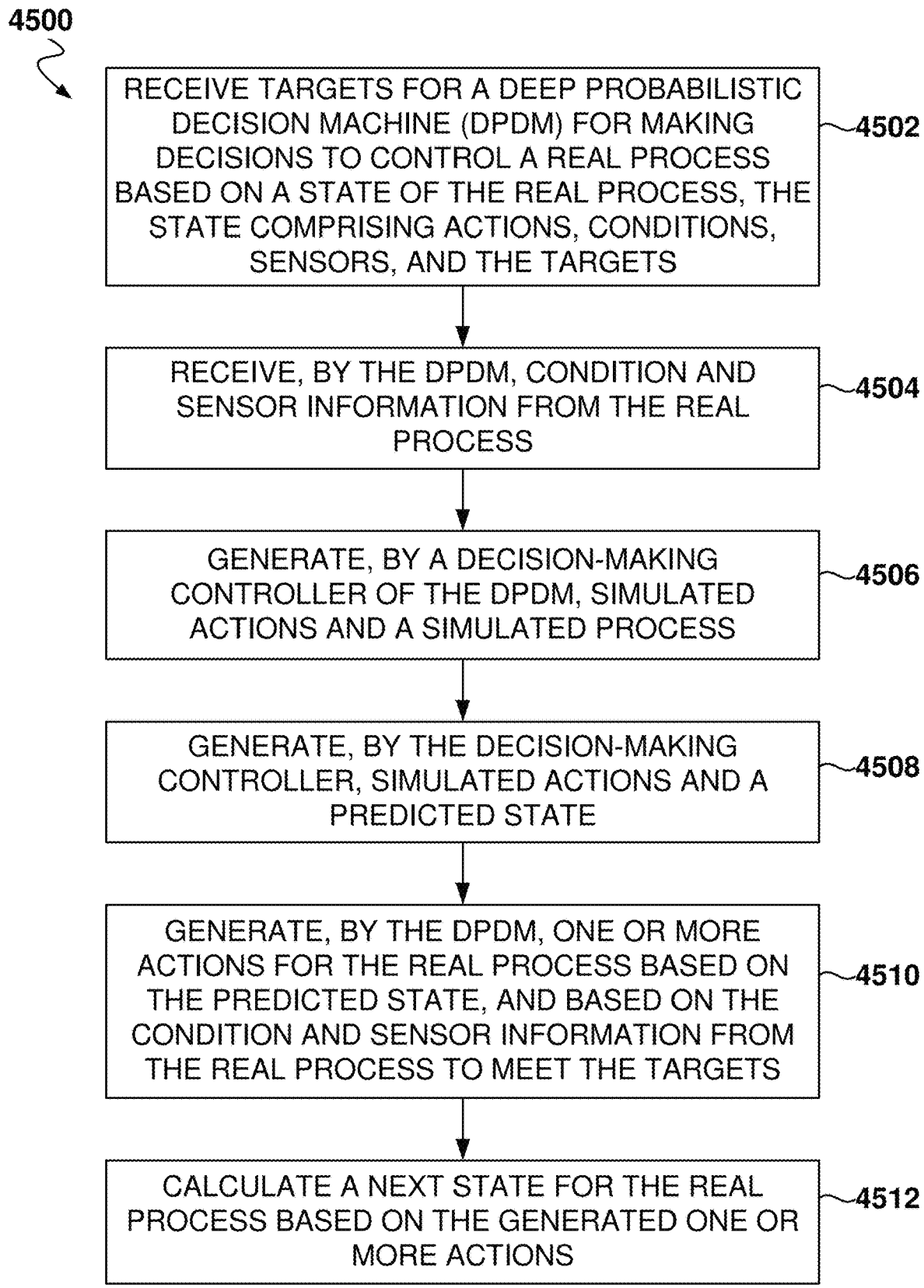
FIGS. 45A-45B are flowcharts of methods for controlling real-life processes using DPDM, according to some example embodiments.

FIG. 45A is a flowchart of a method 4500 for controlling real-life processes using DPDM, according to some example embodiments. While the various operations in this flowchart are presented and described sequentially, one of ordinary skill will appreciate that some or all of the operations may be executed in a different order, be combined or omitted, or be executed in parallel.

Operation 4502 is for receiving targets for a DPDM for making decisions to control a real process based on a state of the real process. The state comprises actions, conditions, sensors, and the targets.

From operation 4502, the flows to operation 4504 where the DPDM receives condition and sensor information from the real process.

At operation 4506, a decision-making controller of the DPDM generates simulated actions and a simulated process.

From operation 4506, the method 4500 flows to operation 4508 where the decision-making controller generates simulated actions and a predicted state.

At operation 4510, the DPDM generates one or more actions for the real process based on the predicted state and based on the condition and sensor information from the real process to meet the targets.

From operation 4510, the method 4500 flows to operation 4512 for calculating a next state for the real process based on the generated one or more actions.

In one example, the actions are controllable inputs for the real process, wherein the conditions are uncontrollable inputs for the real process, wherein the sensors provide observable measurements of the real process, wherein the targets are observable utilities for the real process to be predicted and optimized.

In one example, the method 4500 further comprises receiving, by the simulated process, sensor and target observations from the real process; and updating the simulated process based on the received sensor and target observations.

In one example, the method 4500 further comprises predicting a sequence of states of the real process following a current state based on previous values of actions, conditions, sensors, and targets.

In one example, generating on or more actions of the real process includes maximizing a cumulative utility derived from target outputs over the sequence of states of the real process.

In one example, the state includes a latent state to be learned by a DPDM model, the latent state comprising a probabilistic state and a deterministic state, the probabilistic state representing stochastic and partially observable processes and the deterministic state representing patterns and features from observations.

In one example, the probabilistic state and the deterministic state interact with a reinforcement layer that generate the one or more actions.

In one example, the latent state includes a prior state before observing true measurements and a posterior state after observing the true measurements, wherein the prior state predicts sensors and targets before actual observations, wherein the posterior state accounts for the true measurements to generate the one or more actions for the real process.

In one example, the real process is for making an article of manufacture; the actions including controlling revolutions-per-minute (RPM) setpoints for rotating machines and temperature setpoints for heating equipment; the conditions including one or more of line locations, scheduled crew sequence, aimed dimensions of products changing over batches, and date of process runs; the sensors including actual measured RPMs and temperature changes over time; and the targets including actual produced dimensions of the article of manufacture.

In one example, the real process is for controlling energy consumption in a manufacturing process with rechargeable batteries; the actions including setting battery discharging during peak usage to reduce direct energy usage from an electricity supplier and battery recharging during periods with electricity cost below an average electricity cost; the sensors including elapsed duration times of activities of the manufacturing process, and timing of events that include one or more of heat start, meltdown start and load and tap; the conditions including one or more of raw material, steel grade, and temperature; and the targets including consumed energy per unit of time and a predefined peak-usage per period.

Another general aspect is for a system that includes a memory comprising instructions and one or more computer processors. The instructions, when executed by the one or more computer processors, cause the one or more computer processors to perform operations comprising: receiving targets for a deep probabilistic decision machine (DPDM) for making decisions to control a real process based on a state of the real process, the state comprising actions, conditions, sensors, and the targets; receiving, by the DPDM, condition and sensor information from the real process; generating, by a decision-making controller of the DPDM, simulated actions and a simulated process; generating, by the decision-making controller, simulated actions and a predicted state; generating, by the DPDM, one or more actions for the real process based on the predicted state and based on the condition and sensor information from the real process to meet the targets; and calculating a next state for the real process based on the generated one or more actions.

In yet another general aspect, a machine-readable storage medium (e.g., a non-transitory storage medium) includes instructions that, when executed by a machine, cause the machine to perform operations comprising: receiving targets for a deep probabilistic decision machine (DPDM) for making decisions to control a real process based on a state of the real process, the state comprising actions, conditions, sensors, and the targets; receiving, by the DPDM, condition and sensor information from the real process; generating, by a decision-making controller of the DPDM, simulated actions and a simulated process; generating, by the decision-making controller, simulated actions and a predicted state; generating, by the DPDM, one or more actions for the real process based on the predicted state and based on the condition and sensor information from the real process to meet the targets; and calculating a next state for the real process based on the generated one or more actions.

Figure 45B:
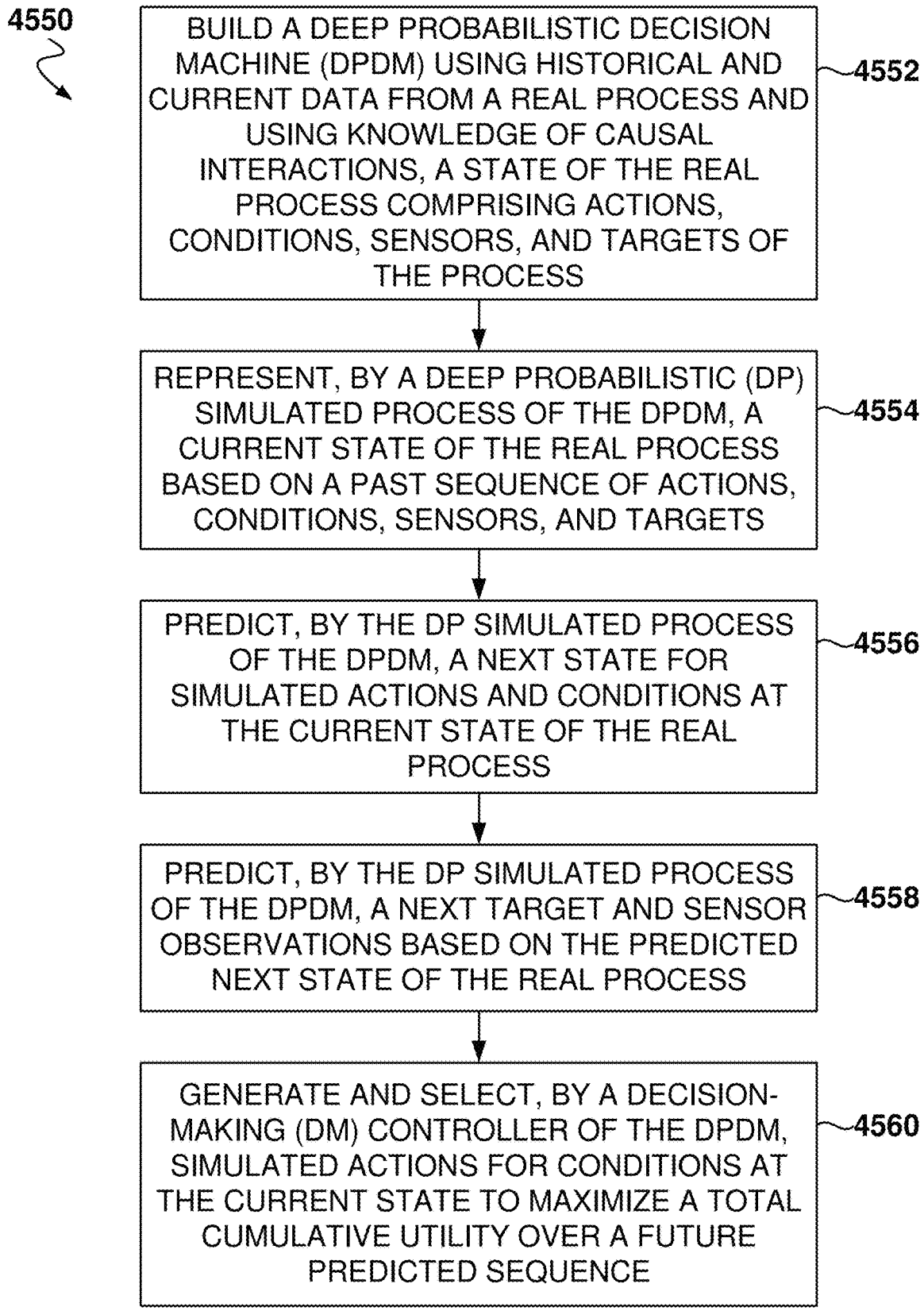

FIG. 45B is a flowchart of a method 4500 for controlling real-life processes using DPDM, according to some example embodiments. Operation 4552 is for building a deep probabilistic decision machine (DPDM) using historical and current data from a real process and using knowledge of causal interactions, a state of the real process comprising actions, conditions, sensors, and targets of the process.

From operation 4552, the method 4500 flows to operation 4554 for representing, by a deep probabilistic (DP) simulated process of the DPDM, a current state of the real process based on a past sequence of actions, conditions, sensors, and targets.

From operation 4554, the method 4500 flows to operation 4556 for predicting, by the DP simulated process of the DPDM, a next target and sensor observations based on the predicted next state of the real process.

From operation 4556, the method 4500 flows to operation 4558 for predicting, by the DP simulated process of the DPDM, a next state for simulated actions and conditions at the current state of the real process.

From operation 4558, the method 4500 flows to operation 4560 for generating and selecting, by a decision-making (DM) controller of the DPDM, simulated actions for conditions at the current state to maximize a total cumulative utility over a future predicted sequence.

Figure 46:
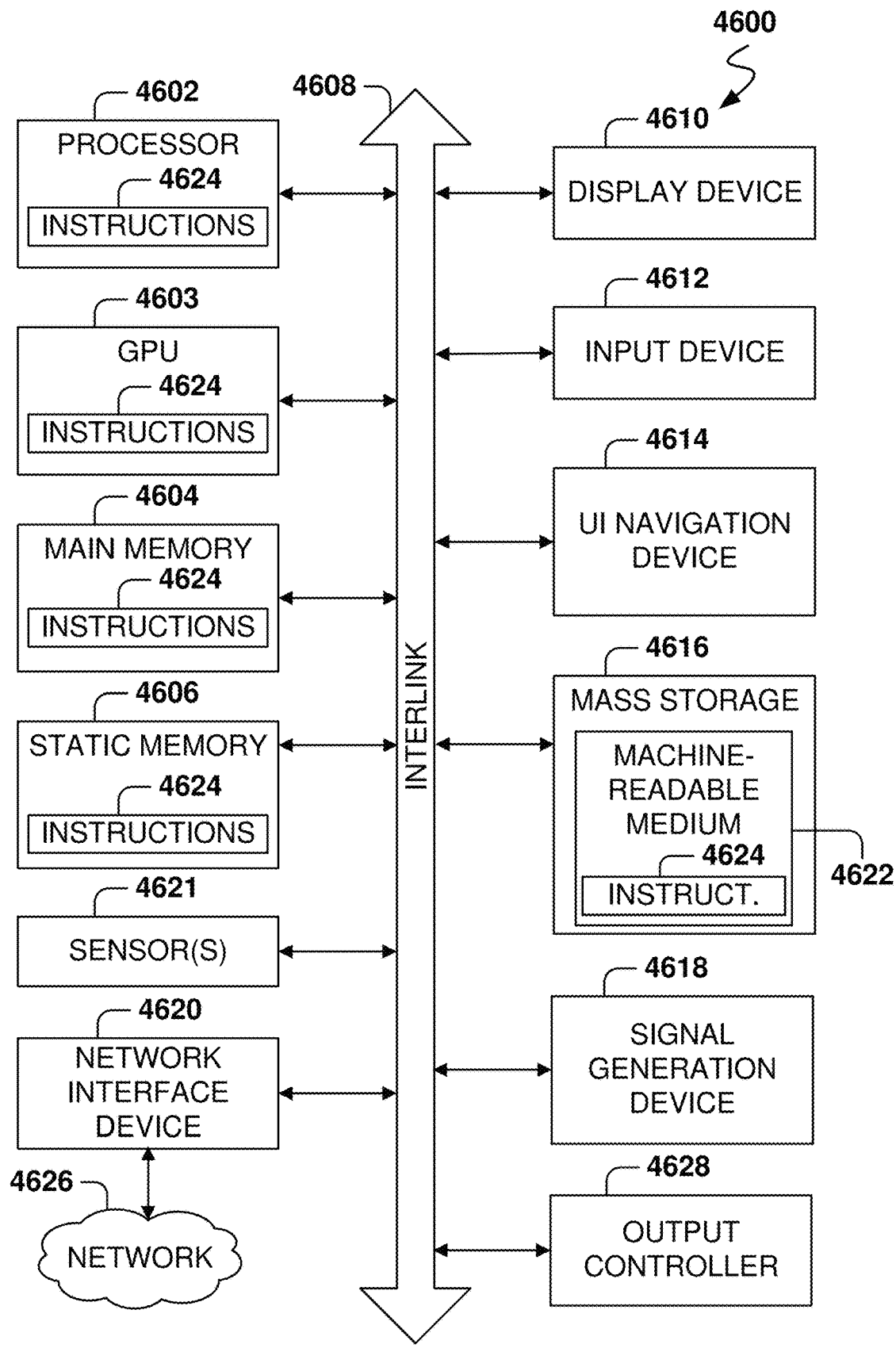
FIG. 46 is a block diagram illustrating an example of a machine upon or by which one or more example process embodiments described herein may be implemented or controlled.

FIG. 46 is a block diagram illustrating an example of a machine 4600 upon or by which one or more example process embodiments described herein may be implemented or controlled. In alternative embodiments, the machine 4600 may operate as a standalone device or may be connected (e.g., networked) to other machines. In a networked deployment, the machine 4600 may operate in the capacity of a server machine, a client machine, or both in server-client network environments. In an example, the machine 4600 may act as a peer machine in a peer-to-peer (P2P) (or other distributed) network environment. Further, while only a single machine 4600 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 4600 may include a hardware processor 4602 (e.g., a central processing unit (CPU), a hardware processor core, or any combination thereof), a graphics processing unit (GPU) 4603, a main memory 4604, and a static memory 4606, some or all of which may communicate with each other via an interlink (e.g., bus) 4608. The machine 4600 may further include a display device 4610, an alphanumeric input device 4612 (e.g., a keyboard), and a user interface (UI) navigation device 4614 (e.g., a mouse). In an example, the display device 4610, alphanumeric input device 4612, and UI navigation device 4614 may be a touch screen display. The machine 4600 may additionally include a mass storage device (e.g., drive unit) 4616, a signal generation device 4618 (e.g., a speaker), a network interface device 4620, and one or more sensors 4621, such as a Global Positioning System (GPS) sensor, compass, accelerometer, or another sensor. The machine 4600 may include an output controller 4628, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 4616 may include a machine-readable medium 4622 on which is stored one or more sets of data structures or instructions 4624 (e.g., software) embodying or utilized by any one or more of the techniques or functions described herein. The instructions 4624 may also reside, completely or at least partially, within the main memory 4604, within the static memory 4606, within the hardware processor 4602, or within the GPU 4603 during execution thereof by the machine 4600. In an example, one or any combination of the hardware processor 4602, the GPU 4603, the main memory 4604, the static memory 4606, or the mass storage device 4616 may constitute machine-readable media.

While the machine-readable medium 4622 is illustrated as a single medium, the term "machine-readable medium" may include a single medium, or multiple media, (e.g., a centralized or distributed database, and/or associated caches and servers) configured to store the one or more instructions 4624.

The term "machine-readable medium" may include any medium that is capable of storing, encoding, or carrying instructions 4624 for execution by the machine 4600 and that cause the machine 4600 to perform any one or more of the techniques of the present disclosure, or that is capable of storing, encoding, or carrying data structures used by or associated with such instructions 4624. Non-limiting machine-readable medium examples may include solid-state memories, and optical and magnetic media. In an example, a massed machine-readable medium comprises a machine-readable medium 4622 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 4624 may further be transmitted or received over a communications network 4626 using a transmission medium via the network interface device 4620.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   building a deep probabilistic decision machine (DPDM) using historical and current data from a real process and using knowledge of causal interactions, a state of the real process comprising actions, conditions, sensors, and targets of the process;
   representing, by a deep probabilistic (DP) simulated process of the DPDM, a current state of the real process based on a past sequence of actions, conditions, sensors, and targets;
   predicting, by the DP simulated process of the DPDM, a next state for simulated actions and conditions at the current state of the real process;
   predicting, by the DP simulated process of the DPDM, a next target and sensor observations based on the predicted next state of the real process; and
   generating and selecting, by a decision-making (DM) controller of the DPDM, simulated actions for conditions at the current state to maximize a total cumulative utility over a future predicted sequence;
   wherein the real process is for demand prediction and supply chain management for stock-keeping units (SKUs) at sales and distribution centers in respective regions of a supply chain; the actions including price and promotions influencing demand, expedite shipments, inventory rebalancing, and production changes influencing supply; the targets including a value at risk (VAR) based on lost sales, inventory holding costs, expedite costs, obsolescence costs, contractual penalties, and sales order volume over time.

2. The method as recited in claim 1, wherein the actions are controllable inputs to be planed under constraints for the real process, wherein the conditions are uncontrollable inputs determined by a context of the real process and previous selected actions, wherein the sensors provide observable measurements of the real process to be predicted, wherein the targets are observable utilities for the real process to be predicted and optimized.

3. The method as recited in claim 1, further comprising:
   receiving, by the DP simulated process of the DPDM, condition information from the real process;
   receiving, by the simulated process, sensor and target observations from the real process; and
   updating the simulated process based on the received sensor and target observations.

4. The method as recited in claim 1, further comprising generating, by the DP simulated process of the DPDM, sequences of the predicted states, sensors, and targets of the real process for simulated or counterfactual actions based on conditions over future time steps following the current state of the real process, wherein the generating enables a latent state representation to capture and exploit a causal relationship between conditions and actions, sensors and targets.

5. The method as recited in claim 4, wherein generating on or more actions of the real process includes maximizing a cumulative utility derived from target outputs over the sequence of states of the real process.

6. The method as recited in claim 1, wherein the state includes a latent state to be learned by a DPDM model, the latent state comprising a probabilistic state and a deterministic state, the probabilistic state representing stochastic and partially observable processes in a Bayesian probabilistic learning layer and the deterministic state representing key patterns and features from observations in a deep learning layer.

7. The method as recited in claim 6, wherein the probabilistic state and the deterministic state interact with a reinforcement learning layer that generates the one or more actions.

8. The method as recited in claim 6, wherein the latent state includes a prior state before observing true measurements and a posterior state after observing the true measurements, wherein the prior state predicts sensors and targets before actual observations, wherein the posterior state accounts for the true measurements to generate the one or more actions for the real process, wherein the predicted prior and posterior state distributions used in model testing are trained to be similar to a true posterior state distributions in terms of the Kullback-Leibler (KL) divergence over the predicted sequence to avoid the predicted error propagation in the multistep-ahead predictions.

9. The method as recited in claim 1, wherein the real process is for making an article of manufacture; the actions including controlling revolutions-per-minute (RPM) setpoints for rotating machines and temperature setpoints for heating equipment; the conditions including one or more of line locations, scheduled crew sequence, aimed dimensions of products changing over batches, and date of process runs; the sensors including actual measured RPMs and temperature changes over time; and the targets including actual produced dimensions of the article of manufacture.

10. The method as recited in claim 1, wherein an open-loop version of DPDM achieves causally-valid predictions and decisions in open-loop control situations, wherein adjusting one or more open-loop actions causally simulates a change in target outputs, wherein an uncertainty in causal simulation is represented in the latent state, wherein the real process is for controlling product properties of coils, the actions including set points for properties in a hot area and a cold area, the conditions including aimed specification of properties, the sensors including coil observed measurements of properties in the hot area and the told area, the targets including one or more selected from a group consisting of width, thickness, weight, plant details, steel grade, product type, yield, tensile strength, and elongation.

11. A method, comprising:
    building a deep probabilistic decision machine (DPDM) using historical and current data from a real process and using knowledge of causal interactions, a state of the real process comprising actions, conditions, sensors, and targets of the process;
    representing, by a deep probabilistic (DP) simulated process of the DPDM, a current state of the real process based on a past sequence of actions, conditions, sensors, and targets;
    predicting, by the DP simulated process of the DPDM, a next state for simulated actions and conditions at the current state of the real process;
    predicting, by the DP simulated process of the DPDM, a next target and sensor observations based on the predicted next state of the real process; and generating and selecting, by a decision-making (DM) controller of the DPDM, simulated actions for conditions at the current state to maximize a total cumulative utility over a future predicted sequence;

wherein the real process is for controlling energy consumption in a manufacturing process with rechargeable batteries; the actions including setting battery discharging during peak usage to reduce direct energy usage from an electricity supplier and battery recharging during periods with electricity cost below an average electricity cost; the conditions including one or more of raw material, steel grade, and temperature; and the targets including consumed energy per unit of time and a predefined peak-usage per period.

12. A system comprising:

a memory comprising instructions; and one or more computer processors, wherein the instructions, when executed by the one or more computer processors, cause the system to perform operations comprising:

building a deep probabilistic decision machine (DPDM) using historical and current data from a real process and using knowledge of causal interactions, a state of the real process comprising actions, conditions, sensors, and targets of the process;

representing, by a deep probabilistic (DP) simulated process of the DPDM, a current state of the real process based on a past sequence of actions, conditions, sensors, and targets;

predicting, by the DP simulated process of the DPDM, a next state for simulated actions and conditions at the current state of the real process;

predicting, by the DP simulated process of the DPDM, a next target and sensor observations based on the predicted next state of the real process; and generating and selecting, by a decision-making (DM) controller of the DPDM, simulated actions for conditions at the current state to maximize a total cumulative utility over a future predicted sequence;

wherein the real process is for demand prediction and supply chain management for stock-keeping units (SKUs) at sales and distribution centers in respective regions of a supply chain; the actions including price and promotions influencing demand, expedite shipments, inventory rebalancing, and production changes influencing supply; the targets including a value at risk (VAR) based on lost sales, inventory holding costs, expedite costs, obsolescence costs, contractual penalties, and sales order volume over time.

13. The system as recited in claim 12, wherein the actions are controllable inputs to be planed under constraints for the real process, wherein the conditions are uncontrollable inputs determined by a context of the real process and previous selected actions, wherein the sensors provide observable measurements of the real process to be predicted, wherein the targets are observable utilities for the real process to be predicted and optimized.

14. The system as recited in claim 12, wherein the instructions further cause the one or more computer processors to perform operations comprising:

receiving, by the DP simulated process of the DPDM, sensor and target observations from the real process; and updating the simulated process based on the received sensor and target observations.

15. The system as recited in claim 12, wherein the instructions further cause the one or more computer processors to perform operations comprising:

generating, by the DP simulated process of the DPDM, sequences of the predicted states, sensors, and targets of the real process for simulated or counterfactual actions based on conditions over future time steps following the current state of the real process, wherein the generating enables a latent state representation to capture and exploit a causal relationship between conditions and actions, sensors and targets.

16. The system as recited in claim 15, wherein generating on or more actions of the real process includes maximizing a cumulative utility derived from target outputs over the sequence of states of the real process.

* * * * *